US009967320B2

(12) United States Patent
Brune et al.

(10) Patent No.: US 9,967,320 B2
(45) Date of Patent: May 8, 2018

(54) METHODS, SYSTEMS, AND MEDIA FOR CONTROLLING INFORMATION USED TO PRESENT CONTENT ON A PUBLIC DISPLAY DEVICE

(71) Applicant: Google LLC, Mountain View, CA (US)

(72) Inventors: Kevin Brune, Davis, CA (US); Eric H C Liu, Redwood City, CA (US)

(73) Assignee: Google LLC, Mountain View, CA (US)

(*) Notice: Subject to any disclaimer, the term of this patent is extended or adjusted under 35 U.S.C. 154(b) by 73 days.

(21) Appl. No.: 14/575,630

(22) Filed: Dec. 18, 2014

(65) Prior Publication Data
US 2016/0182613 A1 Jun. 23, 2016

(51) Int. Cl.
H04L 29/08 (2006.01)
H04W 4/00 (2009.01)
(Continued)

(52) U.S. Cl.
CPC ............ *H04L 67/10* (2013.01); *G06F 1/1698* (2013.01); *G06F 3/04886* (2013.01); *H04M 1/7253* (2013.01); *H04N 21/41415* (2013.01); *H04W 4/80* (2018.02); *G06F 2203/04803* (2013.01); *H04L 67/18* (2013.01);
(Continued)

(58) Field of Classification Search
CPC ........ H04L 67/10; H04L 67/18; H04W 4/008; H04W 4/02; G06F 3/04886; H04N 21/41415; H04N 2013/0461
See application file for complete search history.

(56) References Cited

U.S. PATENT DOCUMENTS 6,571,279 B1    5/2003    Herz et al.
7,191,338 B2    3/2007    Stern et al.
(Continued)

FOREIGN PATENT DOCUMENTS

EP    1158821    11/2001
EP    2704085    3/2014
(Continued)

OTHER PUBLICATIONS

Debevc et al., "Adaptive Bar Implementation and Ergonomics", In Informatica, vol. 18, No. 3, Oct. 1, 1994, pp. 357-366.
(Continued)

Primary Examiner — Abdullahi E Salad
(74) Attorney, Agent, or Firm — Byrne Poh LLP

(57) ABSTRACT

Methods, systems, and media for controlling information utilized to present content using a public display device are provided. In some implementations a method for presenting content on a public display device is provided, the method comprising: (a) initiating communication with one or more display devices; (b) selecting a display device; (c) establishing a communication channel with the selected display device; (d) receiving information related to an area of a screen allocated for use by the user device; (e) identifying content that is to be presented using the selected display device; (f) generating formatted content based on the area of the screen allocated for use by the user device; (g) transmitting the formatted content to the display device using the communication channel; and repeating at least (e) to (g) until (h) determining that presentation of content using the selected display device is to be inhibited.

21 Claims, 29 Drawing Sheets

(51) Int. Cl.
*H04N 21/414* (2011.01)
*G06F 3/0488* (2013.01)
*G06F 1/16* (2006.01)
*H04M 1/725* (2006.01)
*H04N 13/04* (2006.01)
*H04W 4/02* (2018.01)

(52) U.S. Cl.
CPC .... *H04M 1/72552* (2013.01); *H04M 2250/06* (2013.01); *H04M 2250/22* (2013.01); *H04N 13/0438* (2013.01); *H04N 2013/0461* (2013.01); *H04W 4/02* (2013.01)

(56) References Cited

U.S. PATENT DOCUMENTS

| | | | |
|---|---|---|---|
| 7,920,849 B2 | 4/2011 | Pop | |
| 8,073,460 B1 | 12/2011 | Scofield et al. | |
| 8,126,774 B2 | 2/2012 | Hendrickson | |
| 8,239,764 B2* | 8/2012 | Pong | H04N 5/44543 715/273 |
| 8,356,251 B2 | 1/2013 | Strober | |
| 8,411,655 B2 | 4/2013 | Khare et al. | |
| 8,462,949 B2 | 6/2013 | Anderson et al. | |
| 8,507,755 B2* | 8/2013 | De Block | C12N 15/8246 435/320.1 |
| 8,516,393 B2 | 8/2013 | Davis | |
| 8,655,891 B2 | 2/2014 | Ramer et al. | |
| 2002/0008626 A1 | 1/2002 | Water et al. | |
| 2009/0267867 A1* | 10/2009 | Gonia | G06F 3/1454 345/1.1 |
| 2011/0035282 A1 | 2/2011 | Spatscheck et al. | |
| 2011/0205435 A1 | 8/2011 | Lee et al. | |
| 2011/0283334 A1 | 11/2011 | Choi et al. | |
| 2012/0206319 A1* | 8/2012 | Lucero | H04N 21/4788 345/1.3 |
| 2012/0221657 A1* | 8/2012 | Zeevi | G06F 9/54 709/206 |
| 2012/0272145 A1 | 10/2012 | Ryan et al. | |
| 2013/0103446 A1 | 4/2013 | Bragdon et al. | |
| 2013/0103943 A1* | 4/2013 | Hirsch | G09C 5/00 713/168 |
| 2013/0113993 A1 | 5/2013 | Dagit, III | |
| 2013/0117121 A1 | 5/2013 | Raman et al. | |
| 2013/0143651 A1 | 6/2013 | Harrison et al. | |
| 2013/0169755 A1* | 7/2013 | Choo | H04N 13/0497 348/46 |
| 2013/0268357 A1 | 10/2013 | Heath | |
| 2013/0304817 A1 | 11/2013 | Hu et al. | |
| 2014/0067549 A1* | 3/2014 | Park | G06Q 30/0241 705/14.68 |
| 2014/0085179 A1 | 3/2014 | Krig et al. | |
| 2014/0164940 A1 | 6/2014 | Fisher | |
| 2014/0195972 A1 | 7/2014 | Lee et al. | |
| 2014/0335897 A1 | 11/2014 | Clem et al. | |
| 2015/0089438 A1 | 3/2015 | Wu et al. | |

FOREIGN PATENT DOCUMENTS

| | | |
|---|---|---|
| EP | 2747393 | 6/2014 |
| WO | WO/2002/029665 | 4/2002 |
| WO | WO/2002/071285 | 9/2002 |
| WO | WO/2012/080790 | 6/2012 |

OTHER PUBLICATIONS

Holleis et al., "Advertising with NFC", In Proceedings of Workshop on Pervasive Advertising and Shopping, in Conjunction with the 8th International Conference on Pervasive Computing, Helsinki, FI, May 17-20, 2010.
International Search Report & Written Opinion of the International Search Authority dated Jan. 17, 2016 in International Patent Application No. PCT/US2015/059773.
International Search Report & Written Opinion of the International Search Authority dated Feb. 19, 2016 in International Patent Application No. PCT/US2015/059769.
International Search Report & Written Opinion of the International Search Authority dated Feb. 8, 2016 in International Patent Application No. PCT/US2015/059783.
International Search Report & Written Opinion of the International Search Authority dated Apr. 11, 2016 in International Patent Application No. PCT/US2015/059779.
Office Action dated Feb. 10, 2017 in U.S. Appl. No. 14/575,603.
Office Action dated Feb. 10, 2017 in U.S. Appl. No. 14/575,655.
Office Action dated Dec. 1, 2016 in U.S. Appl. No. 14/575,601.
Office Action dated May 18, 2017 in U.S. Appl. No. 14/575,803.
International Preliminary Report on Patentability dated Jun. 20, 2017 in International Patent Application No. PCT/US2015/059773.
International Preliminary Report on Patentability dated Jun. 20, 2017 in International Patent Application No. PCT/US2015/059783.
International Preliminary Report on Patentability dated Jun. 20, 2017 in International Patent Application No. PCT/US2015/059769.
International Preliminary Report on Patentability dated Jun. 20, 2017 in International Patent Application No. PCT/US2015/059779.
Office Action dated Jun. 9, 2017 in U.S. Appl. No. 14/575,655.
Notice of Allowance dated Aug. 7, 2017 in U.S. Appl. No. 14/575,688.
Notice of Allowance dated Oct. 23, 2017 in U.S. Appl. No. 14/638,705.
Second Examination Report dated Nov. 29, 2017 in UK Patent Application No. 1621677.2.
Examination Report dated Feb. 22, 2018 in GB patent Application No. 1621677.2.

* cited by examiner

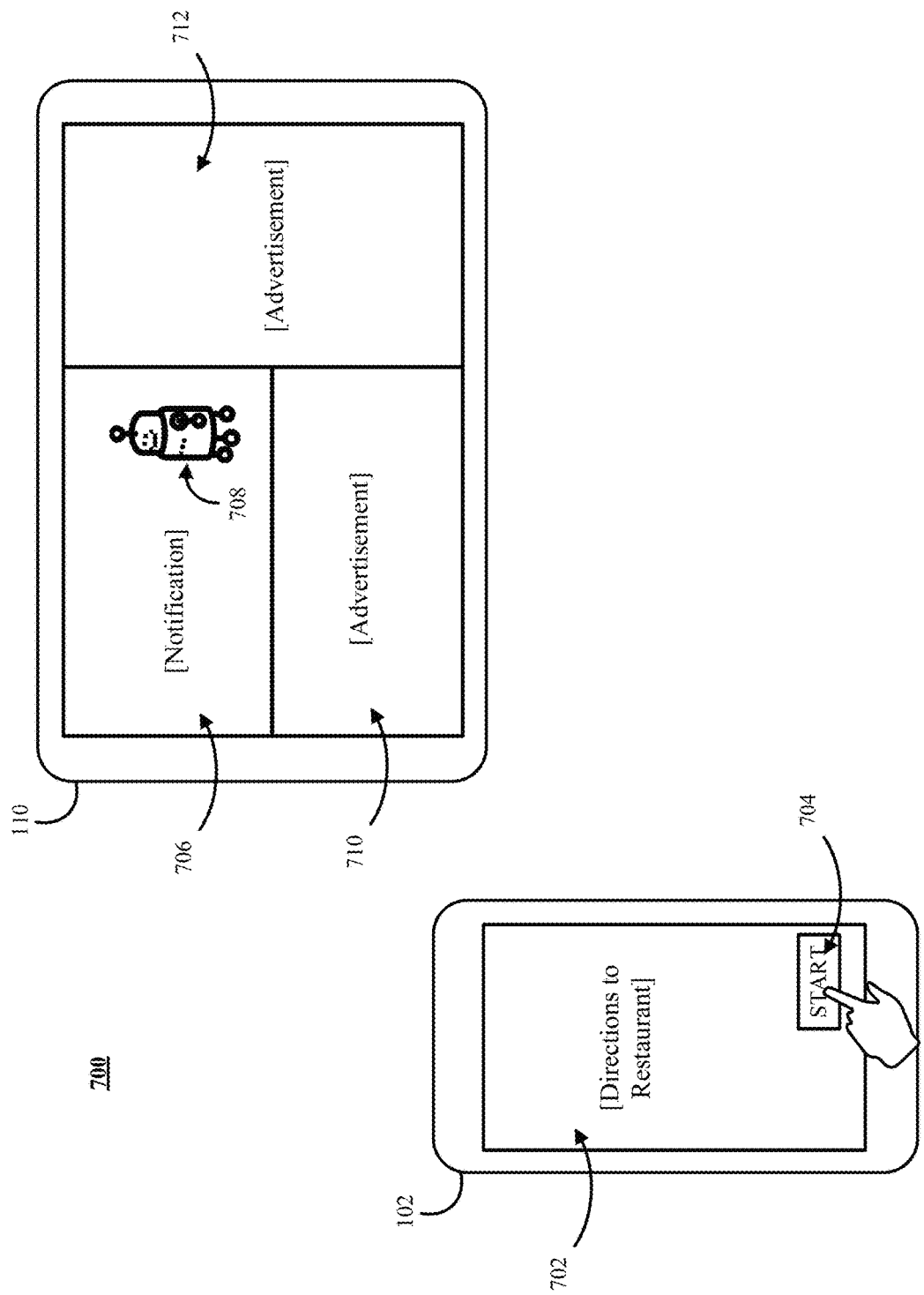

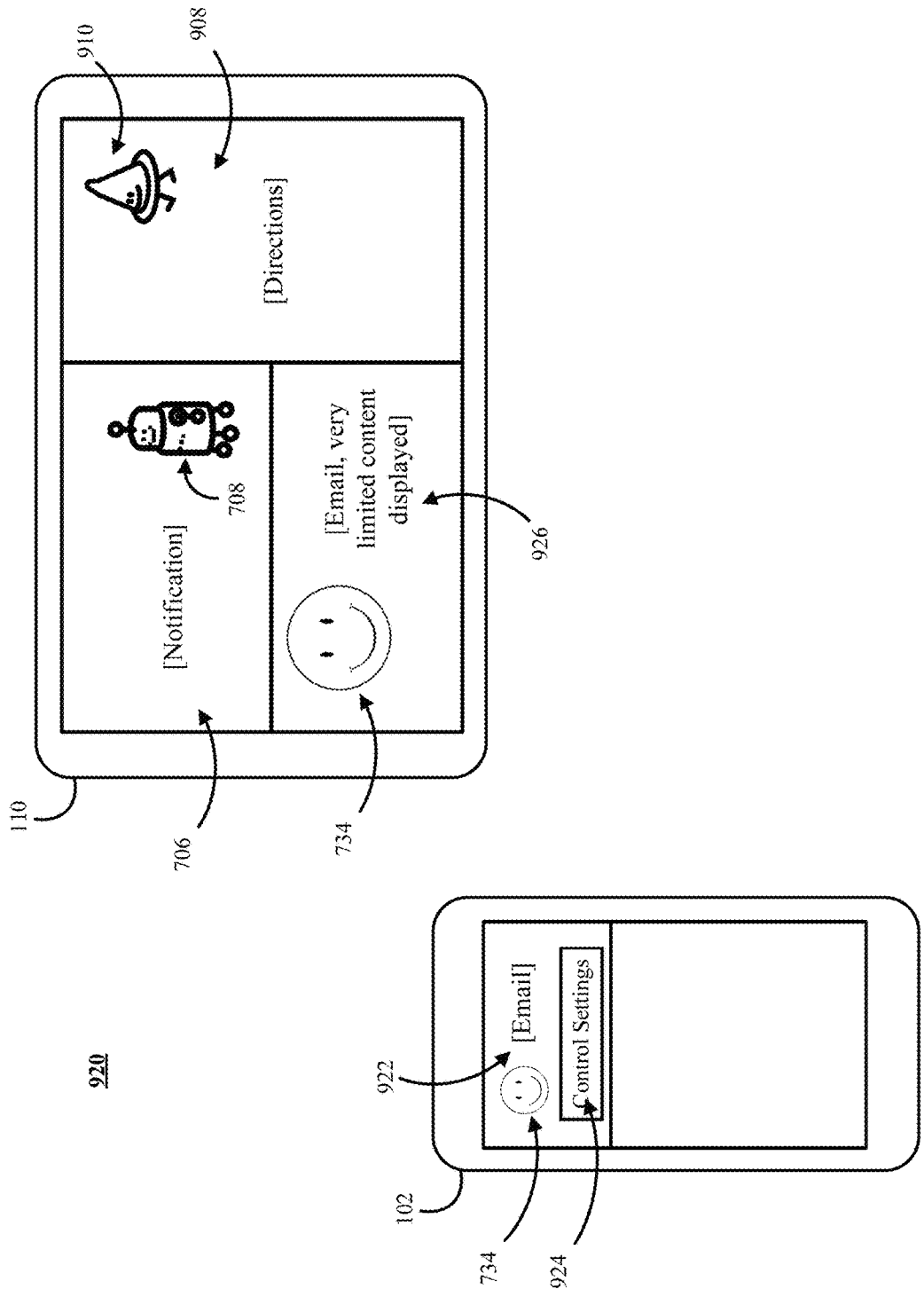

METHODS, SYSTEMS, AND MEDIA FOR CONTROLLING INFORMATION USED TO PRESENT CONTENT ON A PUBLIC DISPLAY DEVICE

CROSS-REFERENCE TO RELATED APPLICATION

This application is related to U.S. patent application Ser. No. 14/575,688, entitled "METHODS, SYSTEMS, AND MEDIA FOR PRESENTING REQUESTED CONTENT ON PUBLIC DISPLAY DEVICES", U.S. patent application Ser. No. 14/575,655, entitled "METHODS, SYSTEMS, AND MEDIA FOR PRESENTING ADVERTISEMENTS RELEVANT TO NEARBY USERS ON A PUBLIC DISPLAY DEVICE", and U.S. patent application Ser. No. 14/575,603, entitled "METHODS, SYSTEMS, AND MEDIA FOR LAUNCHING A MOBILE APPLICATION USING A PUBLIC DISPLAY DEVICE", all of which were filed on even date herewith and incorporated by reference herein in their entireties.

TECHNICAL FIELD

The disclosed subject matter relates to methods, systems, and media for controlling information used to present content on a public display device.

BACKGROUND

In order to use a public computing device to access information from the Internet, such as in a library, airport terminal or a hotel lobby, the user must often enter personal information such as account information. Many users worry that such account information as well as content accessed and/or downloaded by the user will be available to subsequent users of the public computing device, and thus these users may be reluctant to use the public computing device. Devices such as smartphones, tablet computers and wearable computers (over which a user has physical control) allow the user to securely access information from the Internet, but may not offer the same size of screen and/or input options of a larger format device.

Accordingly, it is desirable to provide methods, systems, and media for controlling information used to present content on a public display device.

SUMMARY

In accordance with various implementations of the disclosed subject matter, methods, systems, and media for controlling information used to present content on a public display device are provided.

In accordance with some implementations of the disclosed subject matter, a method for presenting content on a public display device is provided, the method comprising: (a) initiating, using a hardware processor of a user device, communication with one or more display devices; (b) selecting a display device of the one or more display devices; (c) establishing a communication channel with the selected display device; (d) receiving information related to an area of a screen of the selected display device that is allocated for use by the user device; (e) identifying content that is to be presented using the selected display device; (f) generating formatted content from the content that is to be presented based on the area of the screen allocated for use by the user device; (g) transmitting the formatted content to the display device using the communication channel; and repeating at least (e) to (g) until (h) determining that presentation of content using the selected display device is to be inhibited.

In accordance with some implementations of the disclosed subject matter, a system for presenting content on a public display device is provided, the system comprising: a user device comprising a hardware processor that is programmed to: (a) initiate communication with one or more display devices; (b) select a display device of the one or more display devices; (c) establish a communication channel with the selected display device; (d) receive information related to an area of a screen of the selected display device that is allocated for use by the user device; (e) identify content that is to be presented using the selected display device; (f) generate formatted content from the content that is to be presented based on the area of the screen allocated for use by the user device; (g) transmit the formatted content to the display device using the communication channel; and repeat at least (e) to (g) until (h) determining that presentation of content using the selected display device is to be inhibited.

In accordance with some implementations of the disclosed subject matter, a non-transitory computer-readable medium containing computer executable instructions that, when executed by a processor, cause the processor to perform a method for presenting content on a public display device is provided, the method comprising: (a) initiating communication with one or more display devices; (b) selecting a display device of the one or more display devices; (c) establishing a communication channel with the selected display device; (d) receiving information related to an area of a screen of the selected display device that is allocated for use by the user device; (e) identifying content that is to be presented using the selected display device; (f) generating formatted content from the content that is to be presented based on the area of the screen allocated for use by the user device; (g) transmitting the formatted content to the display device using the communication channel; and repeating at least (e) to (g) until (h) determining that presentation of content using the selected display device is to be inhibited.

In accordance with some implementations of the disclosed subject matter, a system for presenting content on a public display device is provided, the system comprising: means for initiating communication with one or more display devices; means for selecting a display device of the one or more display devices; means for establishing a communication channel with the selected display device; means for receiving information related to an area of a screen of the selected display device that is allocated for use by the user device; means for identifying content that is to be presented using the selected display device; means for generating formatted content from the content that is to be presented based on the area of the screen allocated for use by the user device; means for transmitting the formatted content to the display device using the communication channel; and means for determining that presentation of content using the selected display device is to be inhibited.

In some implementations, the means for establishing the communication channel with the selected display device comprises means for establishing a Bluetooth connection with the selected display device.

In some implementations, the means for establishing the communication channel with the selected display device comprises means for establishing a Wi-Fi connection with the selected display device without establishing a Wi-Fi connection with an intermediary device.

In some implementations, the means for determining that presentation of content using the selected public display device comprises means for determining that the communication channel has been disconnected.

In some implementations, the system further comprises: means for receiving, from the selected display device, information related to presentation of the formatted content by the selected public display device; and means for performing an action based on the information related to presentation of the formatted by the selected display device.

In some implementations, the information related to presentation of the formatted content includes information related to a frequency at which frames including the formatted content are to be presented by the selected display device and synchronization information, and the means for performing an action sets active shutter glasses to the frequency based on the synchronization information.

In some implementations, the information related to presentation of the formatted content includes information related to a viewing area in which the formatted content is viewable, and the means for performing an action comprises means for causing information to be presented to a user of the user device informing the user of a location of the viewing area.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 7A-7D show examples of a user interface for causing content to be presented by a public display device and presentation of content by a public display device in accordance with some implementations of the disclosed subject matter.

FIGS. 9A-9F show examples of a user interface for setting control settings and content presented by a public display device in accordance with the control settings in accordance with some implementations of the disclosed subject matter.

DETAILED DESCRIPTION

Figure 1:
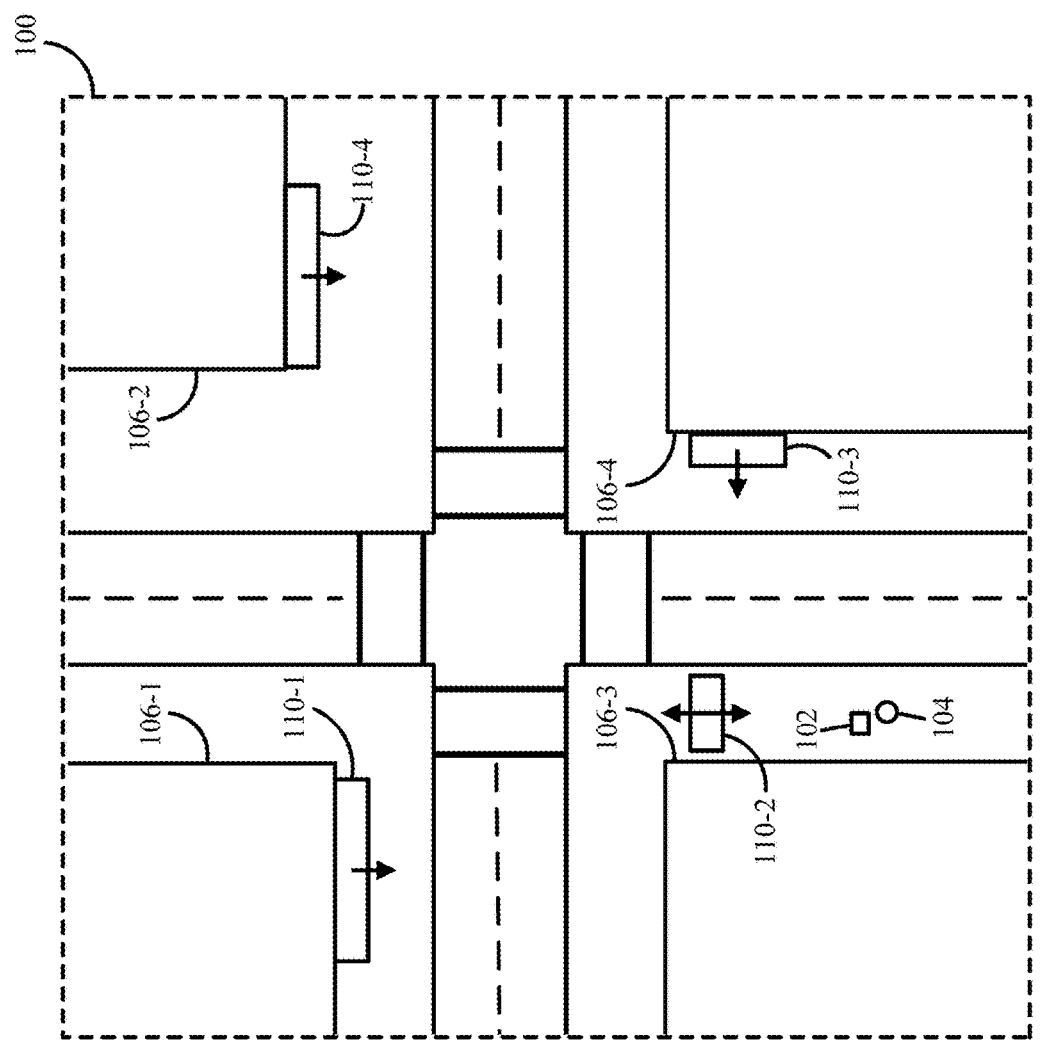
FIG. 1 shows an example of a portion of a system for presenting requested content on public display devices in accordance with some implementations of the disclosed subject matter.

In accordance with various implementations, mechanisms (which can include methods, systems, and/or media) for presenting requested content on public display devices are provided.

In some implementations, these mechanisms can facilitate the presentation of content associated with a particular user and/or user device by a display that the user can readily view. For example, in some implementations, presentation of content by a public display device can be initiated from the user device. As described herein, any suitable content associated with the user and/or user device can be presented by a public display device. For example, the user can request that walking directions to a particular retail store be presented using public screens from a navigation application installed on and being executed by the user's smartphone.

In some implementations, the mechanisms described herein can select one or more public display devices on which to present the requested content using any suitable technique or combination of techniques. For example, using information about the location of the user device and/or the one or more public display devices, the mechanisms described herein can determine which display is most likely to be viewable to the user. In a more particular example, if the user requested, via a smartphone, walking directions to a retail store, the mechanisms can select a nearest public display device to the smartphone that is on the way to the retail store.

As another example, using information about the content to be presented, the mechanisms described herein can determine which nearby display is appropriate to present the type of content that is to be presented. In a more particular example, if the content to be presented includes personal information, the mechanisms described herein can select a display that is more secluded or in a more private location with respect to other nearby display devices.

In some implementations, the mechanisms described herein can cause the content to be presented by a selected public display device. The mechanisms can use any suitable technique or combination of techniques to cause a particular display device to present the requested content. For example, having selected a display device on which to present the requested content, the mechanisms described herein can communicate an address corresponding to the requested content to the selected display device. In a more particular example, in the case where the user requested, via a smartphone, walking directions to a retail store, the mechanisms can generate and/or identify an address associated with the directions and communicate the address to a selected public display device. This public display device can then, in some implementations, use the address to retrieve and present the walking directions.

In situations in which the mechanisms described herein record personal information about users, or can make use of personal information, the users are provided with an opportunity to control whether programs or features of the mechanisms described herein record user information (e.g., information about user actions stored on a user device, information about user actions stored on a remote device such as a server, information about content presented by display device, etc.), and/or to control whether and/or how much personal information is presented and/or shared. In addition, certain data can be treated in one or more ways before it is stored or used, so that personal information is removed. For example, a user's identity can be treated so that no personal information can be determined for the user, or a user's geographic location can be generalized where location information is obtained (such as to a city block, a city, ZIP code, or state level), so that a particular location of a user cannot be determined. Thus, the user can have control over how information is recorded about the user and used by a content server.

Turning to FIG. 1, an example of a portion of a system for presenting requested content on public display devices is shown in accordance with some implementations of the disclosed subject matter. As shown in FIG. 1, the system can include a user device 102 associated with a user 104. In some implementations, user 104 can be located within a portion 100 of an environment that includes one or more display devices 110-1 to 110-4 on which content can be presented.

In some implementations, one or more of display devices 110-1 to 110-4 in environment 100 can be a public display device on which content associated with a user, such as user 104, can be presented in response to a request from a device, such as user device 102. In some implementations, such a public display device can occupy a space that might otherwise be used to convey information to the public such as a billboard, a store window, a bus or subway sign, a display space for presenting a map of a local area, etc. Additionally, in some implementations, as described below in connection with FIG. 4, a display device 110 that is a public display device can be programmed to accept only certain types of content for presentation. For example, display device 110-1 can be programmed to accept any content that is appropriate for all ages, while display device 110-2 can be programmed to accept only advertisements, directions and weather information as content that is to be presented. In some implementations, such programming can be time-based, such that a particular display device (e.g., display device 110-3) can be programmed to act as a public display device during certain periods of time, and to act as a non-public display device during other periods of time.

In some implementations, each display device 110 that is to act as a public display device can be coupled to a network, such as the Internet, over which it can receive content that is to be presented. For example, as described below in connection with FIG. 4, a display device 110 that is to act as a public display device can receive content that is to be presented from a remote server. Additionally or alternatively, each display device 110 that is to act as a public display device can communicate with one or more other devices, such as user device 102 or another display device 110, without using a non-local network, such as the Internet. For example, display device 110 can communicate with another device using peer-to-peer communication techniques (e.g., using a Bluetooth connection, using one or more wireless ad-hoc connections, and/or using any other suitable technique or combination of techniques). As another example, display device 110 can communicate with another device using an ad-hoc network where one or more intermediate devices (e.g., one or more other display devices and/or user devices) that form a part of the ad-hoc network between user device 102 and a display device 110 that is to be used as a public display device on which to present content. As yet another example, display device 110 and a user device 102 can both be coupled to a local area network over which display device 110 and user device 102 can communicate. In some implementations, display device 110 can include a wireless access point to which a user device 102 can be coupled for communication over a local network and/or a non-local network (e.g., the Internet) to which display device 110 is connected.

In some implementations, each display device 110 can be associated with location information. For example, the location information associated with a display device can be represented by coordinates at which the display device is located. As another example, the location information can be represented as location information relative to another object or feature for which location information is known. As a more particular example, the location of a display device, such as display device 110-1, can be represented as location information relative to a building 106-1 to which display device 110-1 is coupled. In such an example, the location information associated with display device 110-1 can include information indicating that display device 110-1 is coupled to building 106-1 at the southeast corner, where building 106-1 can be identified by an address, coordinates, and/or any other suitable location information.

In some implementations, location information associated with a display device can include height information. For example, location information for display device 110-1, which is coupled to building 106-1, can include a height at which a center (or other reference point or points) of display device 110-1 is positioned above ground level and/or with respect to any other suitable reference point. Similarly, location information for display device 110-2, which is positioned over a sidewalk area, can include a height at which a center (or other reference point or points) of display device 110-2 is positioned above ground level and/or with respect to any other suitable reference point (e.g., the sidewalk on which user 104 is walking).

In some implementations, the location information can be determined using any suitable technique or combination of techniques. For example, a display device (e.g., display device 110-1) can include one or more sensors for determining a location relative to the surface of the earth (e.g., using the Global Positioning System, which is sometimes referred to as GPS) and/or relative to other objects (e.g., one or more wireless access points, one or more devices that includes a wireless transmitter, etc.). As another example, one or more devices remote from a display device can determine location information associated with the display device based on a signal received from the display device. In a more particular example, a remote device can receive a signal transmitted from display device 110-1 and—based on the strength of the received signal, timing information of the received signal, and/or using any other suitable technique or combinations of techniques—can determine a distance from the display device to the remote device and/or a direction in which the display device is located. In some implementations, distance and/or direction information determined by multiple remote devices can be used to determine a more accurate location of a display device by, for example, using known location information associated with the remote devices and multilateration, trilateration and/or any other suitable technique or combination of techniques to determine the location of the display device.

As another example, the location information can be set by an owner and/or operator of the display device as information related to the display device. In such an example, an owner and/or operator can program the location of the display device using software, firmware and/or hardware of the display device. This location information can then be transmitted by the display device to a device that requests the location information associated with the display device.

As yet another example, location information associated with a display device can be stored in memory of a remote device in association with identifying information of the display device. In a more particular example, a database of display device information, including the location information associated with the display device, can be maintained. Such a database can be accessed to retrieve location information associated with a particular display device or devices (e.g., in response to a database query using identifying information of one or more display devices), and/or to retrieve identifying information of display devices near a particular location (e.g., in response to a database query using location information associated with a user device). In some implementations, location information and/or identifying information of display devices can be entered into the database by a user, entered into the database automatically based on communications from a display device or other suitable device, and/or using any other suitable technique or combination of techniques.

In some implementations, each display device can be associated with direction information. Such direction information can, for example, indicate one or more directions in which audio and/or visual information presented by the display device can be perceived. For example, as shown by arrows in FIG. 1, display device 110-1 is directed south, display device 110-2 can include screens that are directed both north and south, display device 110-3 is directed west and display device 110-4 is directed south. In some implementations, such direction information can be determined using any suitable technique or combination of techniques. For example, the direction information can be set by an owner and/or operator of the display device as information about the display device. As another example, one or more sensors of the display device and/or any other suitable device can be used to determine direction information of the display device.

In some implementations, direction information of a display device can be stored locally by the display device (e.g., to be transmitted to a device requesting direction information), stored remotely in a database (e.g., as described above in connection with location information), and/or determined on an as-needed basis when a query for direction information is received (e.g., received by a display device from a server). In some implementations, a direction of a display device can be fixed with relation to its surroundings. For example, display device 110-1 can be fixed facing south based on its mounting to building 106-1. Alternatively, in some implementations, a direction of a display device can be variable, such as in a case where the display device rotates and/or a structure to which the display device is coupled moves or otherwise changes position. In some implementations, a screen of a display device can be curved and different portions of the screen of the display device can be directed in different directions. Note that a screen of a display device can be any surface or other medium that is used by the display device to present content and need not be a physical screen included in or electronically coupled to the display device itself. For example, a screen can include a window or wall onto which an image is projected by the display device.

In some implementations, a viewing area from which a particular screen or portion of a screen of the display device can be viewed can be determined based on location information associated with a display device, direction information associated with the display device, viewing angle information associated with the display device, and/or information about an area surrounding the display device, such as the location of walls, structures, windows, people, etc. For example, this information can be used to map areas from which a typical or average user can perceive information presented by a particular screen of a display device. Such viewing area information can be stored locally by the display device, stored remotely in a database (e.g., as described above in connection with location information), determined on an as-needed basis, and/or can be made available using any other suitable technique or combination of techniques.

In some implementations, user 104 and/or user device 102 can be associated with direction information. Such direction information associated with user 104 and/or user device 102 can be determined explicitly using a sensor associated with user 104, such as a sensor of user device 102. Additionally or alternatively, the position of user 104 and/or user device 102 at different points in time can be used to infer a direction that user 104 and/or user device 102 is facing based on a direction of motion of user 104 and/or user device 102.

In some implementations, a location of user device 102 can be determined using any suitable techniques. For example, user device 102 can include one or more sensors for determining a location relative to the surface of the earth (e.g., using GPS) and/or relative to other objects (e.g., one or more wireless access points, one or more devices that include a wireless transmitter). As another example, a computing device that is remote from a user device can determine location information associated with the user device based on a signal received from the user device. In a more particular example, a remote computing device can receive a signal transmitted from user device 102 and can determine a distance from the user device to the remote device and/or a direction in which the user device is located using any suitable technique or combination of techniques. For example, the remote computing device can determine a distance to the user device based on the strength of the received signal. As another example, the remote computing device can determine a distance to the user device based on timing information of the received signal. In some implementations, distance and/or direction information determined by multiple remote devices can be used to determine location information associated with user device 102 by, for example, using known location information associated with the remote devices and multilateration, trilateration and/or any other suitable technique or combination of techniques to determine the location of user device 102.

As described below in connection with FIG. 4, in some implementations, the mechanisms described herein can select one or more display devices, such as display devices 110-1 to 110-4, on which content associated with user device 102 is to be presented. In selecting the display device or devices, the location information associated with the display devices and the location information associated with a user device (and/or user) can be used to determine which display device or devices are likely to be visible to the user at the time when the content is to be presented. As shown in FIG. 1, based on the relative locations of user device 102 and display devices 110-1 to 110-4, the mechanisms described herein can select the south-facing screen of display device 110-2 as a display device on which to present content associated with user device 102. In some implementations, as user 104 moves through environment 100, the mechanisms can select an additional display device or screen of a display device on which to present the content. For example, as user 104 moves north and draws even with or passes a location of display device 110-2, the mechanisms can select the south-facing screen of display device 110-1 to present the content.

As described below, in some implementations, the mechanisms described herein can cause any suitable information to be presented on a selected display device to indicate to a user associated with the user device (e.g., user 104) that the content being presented is intended for that user. For example, as shown in and described below in connection with FIG. 7C, an avatar associated with user 104 can be presented in association with the content that is to be presented for user 104.

Figure 2:
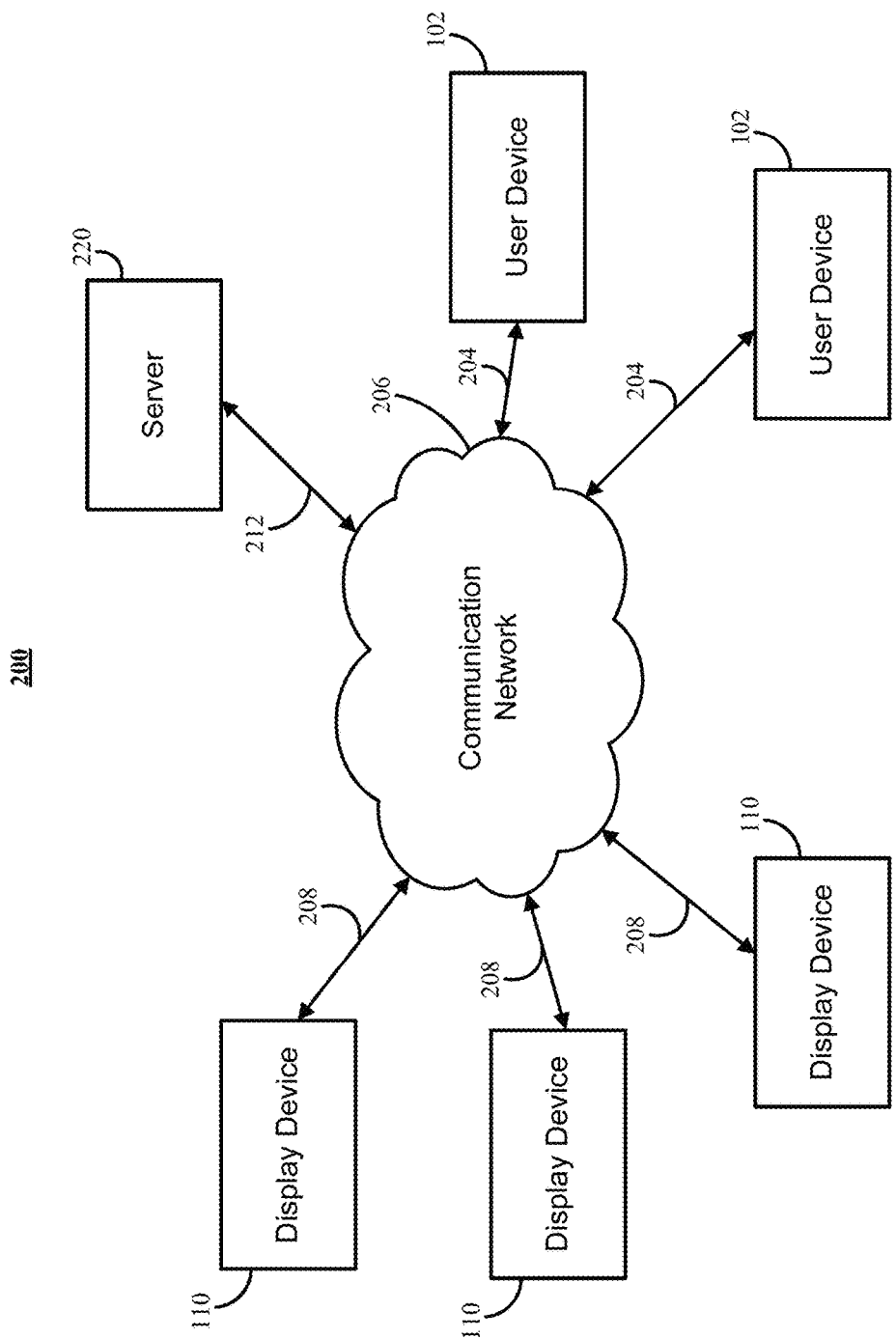
FIG. 2 shows an example of a generalized schematic diagram of a system on which the mechanisms for presenting requested content on public display devices as described herein can be implemented in accordance with some implementations.

FIG. 2 shows an example 200 of a generalized schematic diagram of a system on which the mechanisms for presenting requested content on public display devices as described herein can be implemented in accordance with some implementations. As illustrated, system 200 can include one or more user devices 102. User devices 102 can be local to each other or remote from each other. User devices 102 can be connected by one or more communications links 204 to a communication network 206 that can, in turn, be linked to a server 220 via a communications link 212.

System 200 can include one or more display devices 110. Display devices 110 can be local to each other or remote from each other. Each display device 110 can be connected by one or more communications links 208 to communication network 206 that can, in turn, be linked to server 220 via communications link 212 and/or user device 102 via communications link 204.

System 200 can include one or more servers 220. Server 220 can be any suitable server or servers for providing access to the mechanisms described herein for presenting requested content on public display devices, such as a processor, a computer, a data processing device, or any suitable combination of such devices. For example, the mechanisms for presenting requested content on public display devices can be distributed into multiple backend components and multiple frontend components and/or user interfaces. In a more particular example, backend components (such as mechanisms for receiving requests to present content, selecting a display device on which to present the content, formatting the content for presentation on a selected display device, making the content available to the selected display device, erasing content from a cache and/or memory that is to be erased, causing content stored on another device to be erased, etc.) can be performed on one or more servers 220. In another more particular example, frontend components (such as presentation of content, requesting that content be presented by a public display device, detecting that a user device is near a public display device, transmitting formatted content to a display device, etc.) can be performed on one or more user devices 102 and/or display devices 110.

In some implementations, each of user devices 102, display device 110 and server 220 can be any of a general purpose device, such as a computer, or a special purpose device, such as a client, a server, etc. Any of these general or special purpose devices can include any suitable components such as a hardware processor (which can be a microprocessor, a digital signal processor, a controller, etc.), memory, communication interfaces, display controllers, input devices, etc. For example, user device 102 can be implemented as a smartphone, a tablet computer, a wearable computer, a vehicle computing and/or entertainment system (e.g., as used in a car, a boat, an airplane, or any other suitable vehicle), a laptop computer, a portable game console, any other suitable computing device, or any suitable combination thereof. As another example, display device 110 can be implemented as a television, a projector, a large-scale video screen, multiple screens of various dimensions, a collection of display elements such as light emitting diode modules, a desk-top computer, a set-top box, a digital media receiver, a game console, any other suitable computing device, or any suitable combination thereof.

Communications network 206 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), a peer-to-peer connection, etc. Each of communications links 204, 208, and 212 can be any communications links suitable for communicating data among user devices 102, display devices 110 and server 220, such as network links, dial-up links, wireless links, hard-wired links, any other suitable communications links, or any suitable combination of such links. Note that, in some implementations, multiple servers 220 can be used to provide access to different mechanisms associated with the mechanisms described herein for presenting requested content on public display devices. For example, system 200 can include: a display device selection server 220 that facilitates selection of a public display device on which to present content using the mechanisms described herein; a public display device data server 220 that maintains one or more databases of location information and/or other information related to public display devices; a content delivery server 220 that formats and makes available content to be presented by a public display device; and/or any other suitable servers for performing any suitable functions of the mechanisms described herein.

Figure 3:
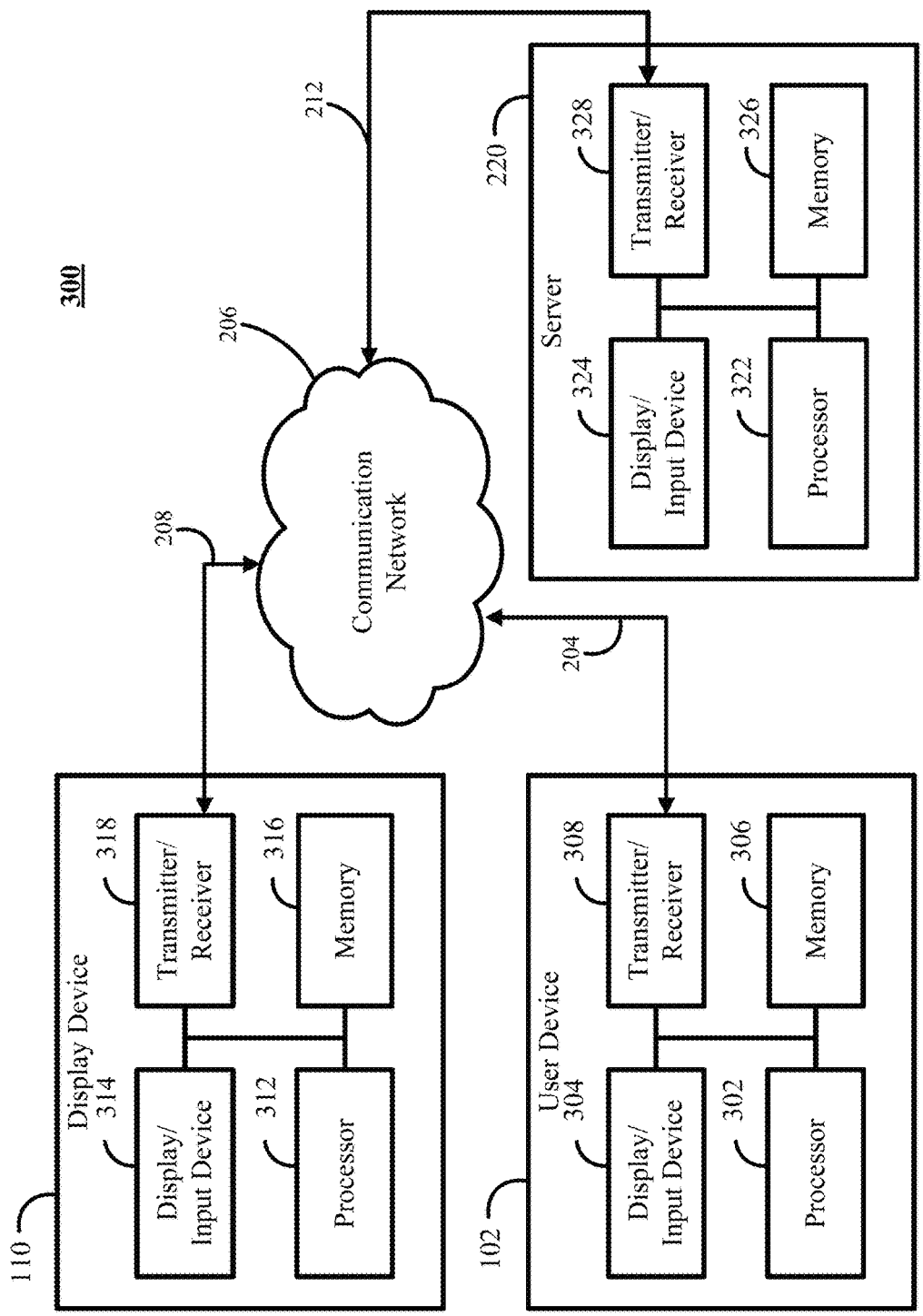
FIG. 3 shows an example of hardware that can be used to implement one or more of the user devices, display devices, and servers depicted in FIG. 2 in accordance with some implementations of the disclosed subject matter.

FIG. 3 shows an example 300 of hardware that can be used to implement one or more of user devices 102, display devices 110 and servers 220 depicted in FIG. 2 in accordance with some implementations of the disclosed subject matter. Referring to FIG. 3, user device 102 can include a hardware processor 302, a display/input device 304, memory 306 and a transmitter/receiver 308, which can be interconnected. In some implementations, memory 306 can include a storage device (such as a computer-readable medium) for storing a user device program for controlling hardware processor 302.

Figure 4:
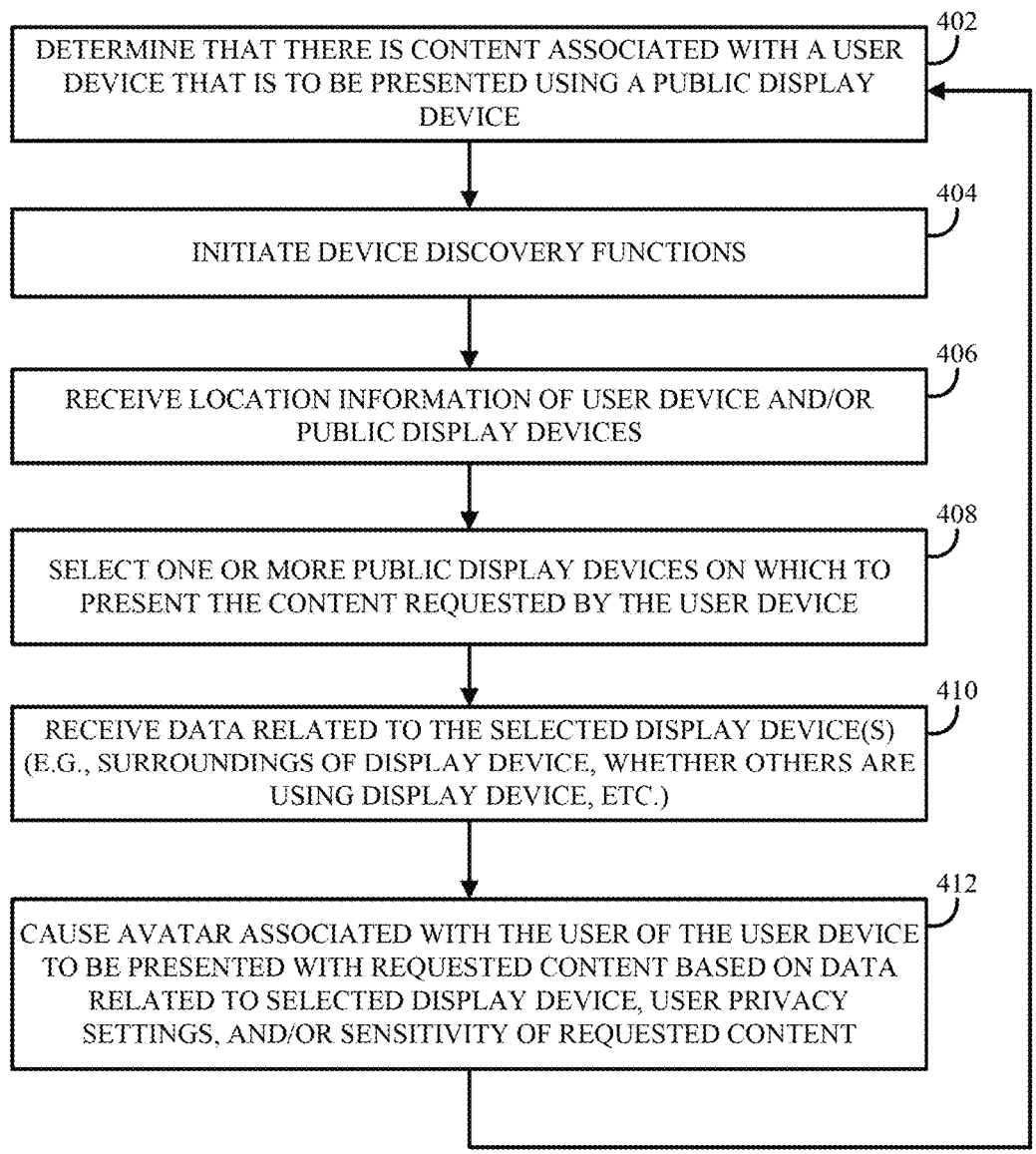
FIG. 4 shows an example of a process for presenting requested content on public display devices in accordance with some implementations of the disclosed subject matter.
Figure 7B:
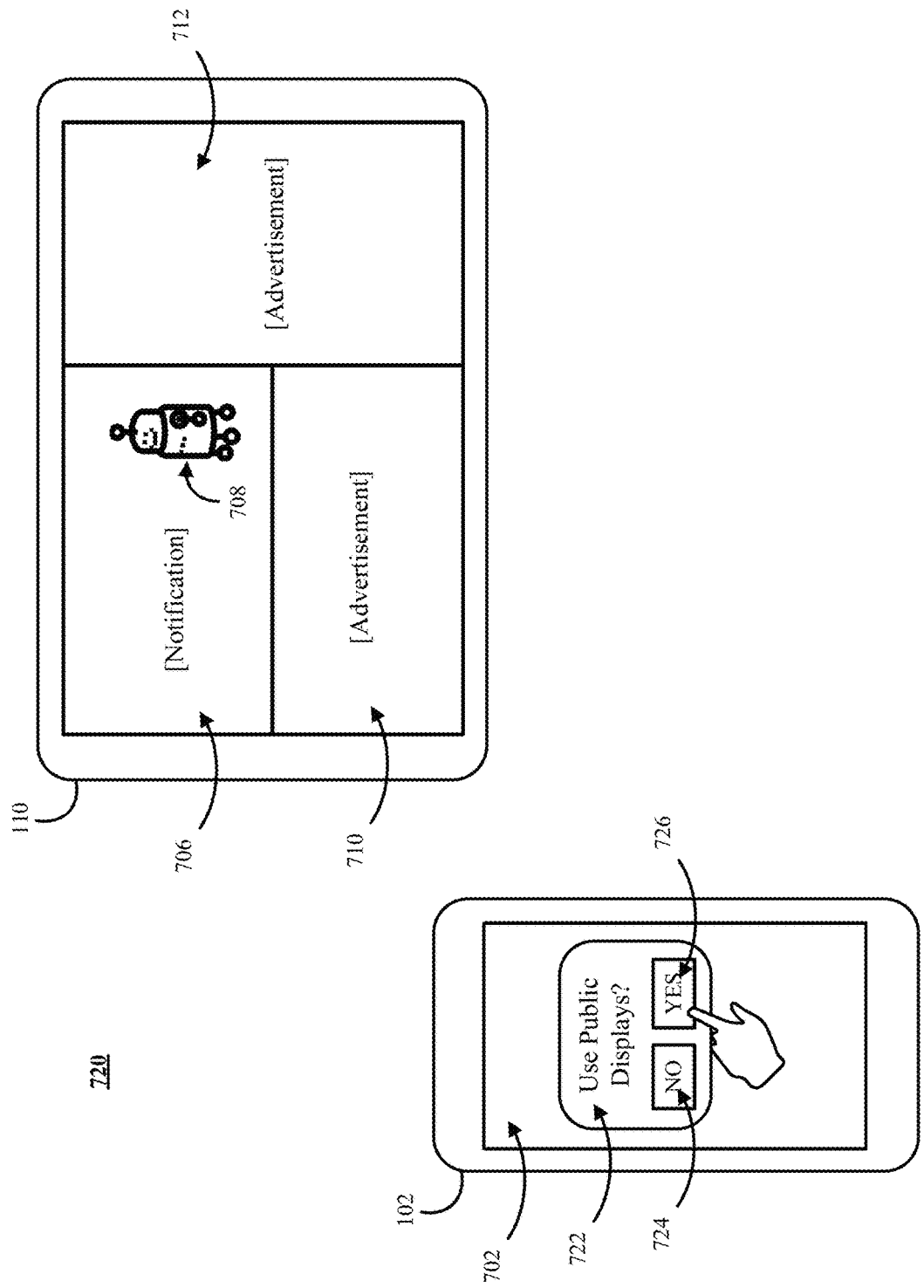
Figure 7C:
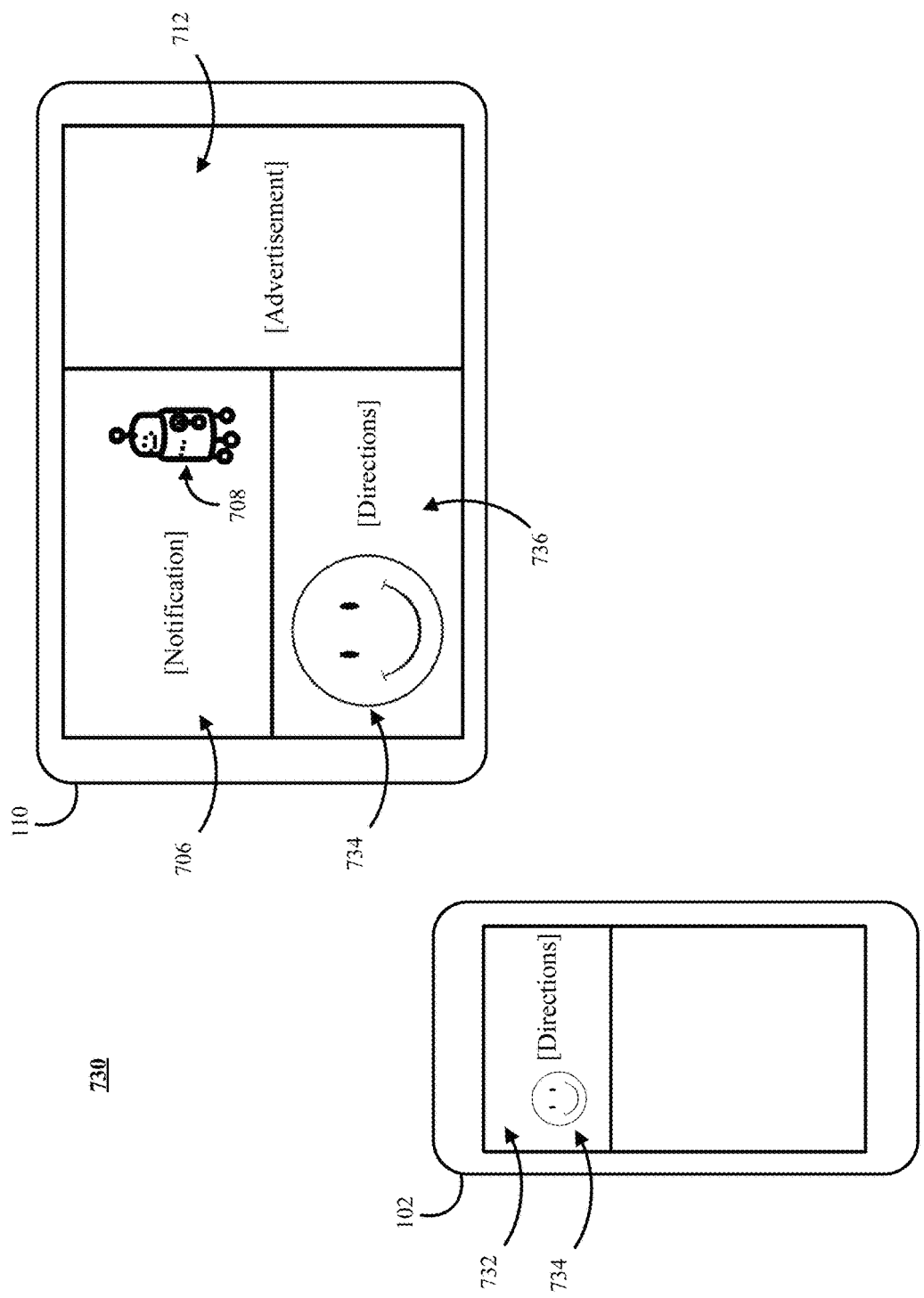
Figure 7D:
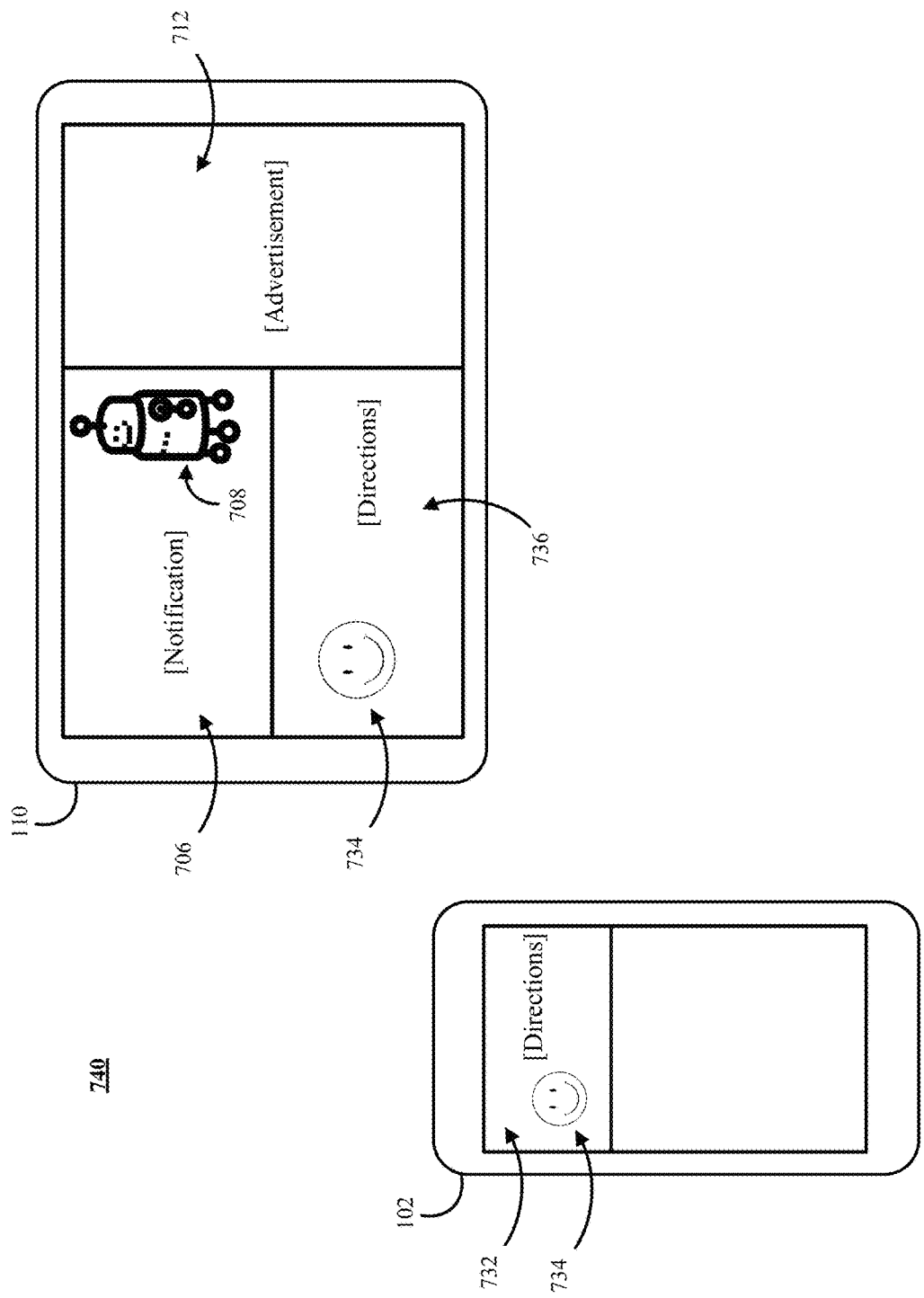
Figure 8:
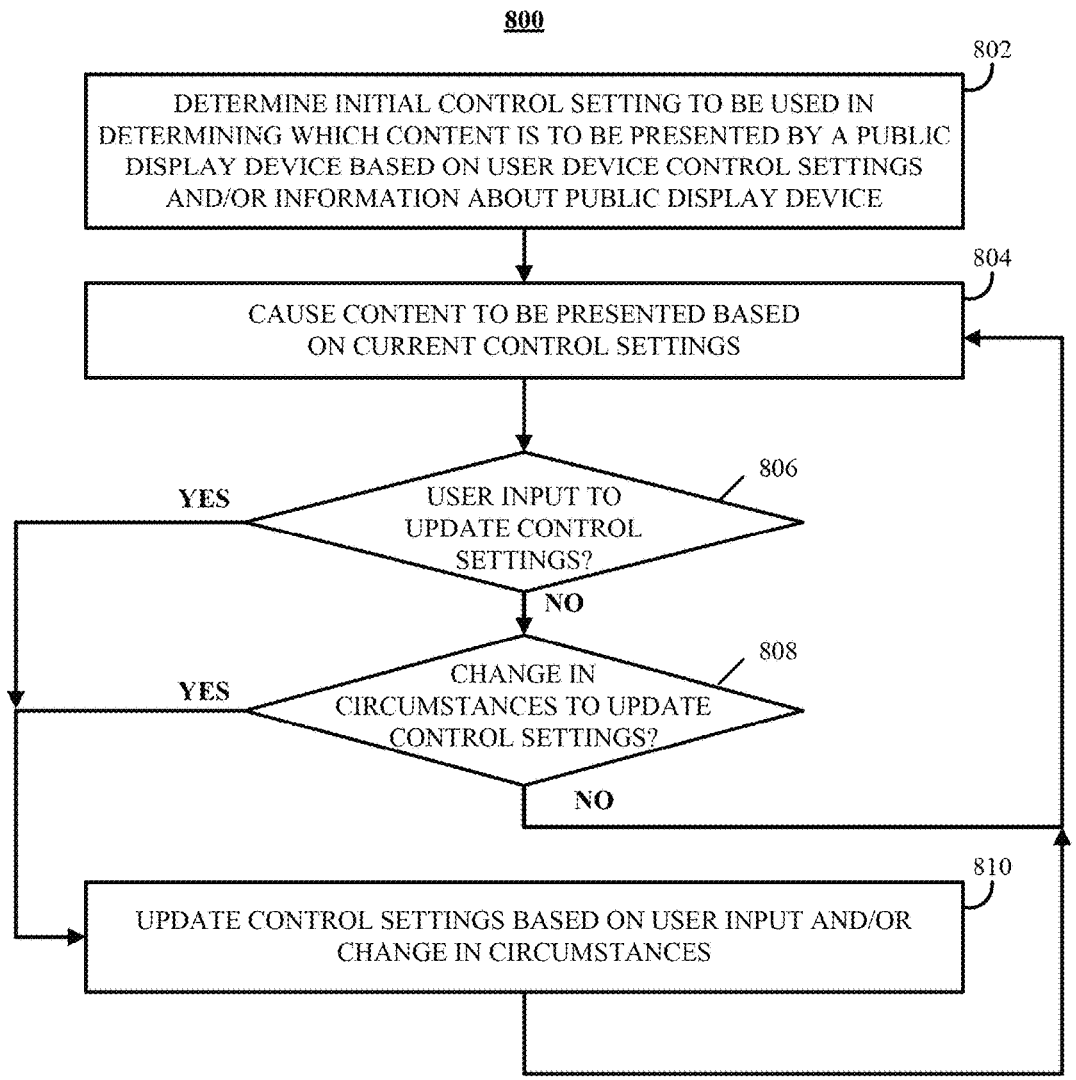
FIG. 8 shows an example of a process for determining which content is to be presented on public display devices based on control settings in accordance with some implementations of the disclosed subject matter.

Hardware processor 302 can use the user device program to execute and/or interact with the mechanisms described herein for: requesting that content be presented by a public display device; controlling presentation of the content on the public display device; setting a control level for the content shown on the public display device; presenting a user interface on display/input device 304 (e.g., as described below in connection with FIGS. 7A-7D and 9A-9D); performing any other suitable functions in accordance with instructions received as a result of, for example, process 400 described below in connection with FIG. 4 and/or process 800 described below in connection with FIG. 8; and/or transmitting and receiving data through communications link 204. In some implementations, the user device program can cause hardware process 302 to, for example, execute at least a portion of process 400 as described below in connection with FIG. 4, at least a portion of process 800 as described below in connection with FIG. 8, at least a portion of process 1000 as described below in connection with FIG. 10, at least a portion of process 1300 as described below in connection with FIG. 13, and/or at least a portion of process 1400 as described below in connection with FIG. 14. In some implementations, hardware processor 302 can transmit and receive data through communications link 204 or any other communication links using, for example, a transmitter, a receiver, a transmitter/receiver, a transceiver, and/or any other suitable communication device, such as transmitter/receiver 308. Display/input device 304 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication (NFC) sensor, a biometric data sensor, and/or any other suitable input device. Transmitter/receiver 308 can include any suitable transmitter and/or receiver for transmitting and/or receiving, among other things, instructions for presenting content, information related to a current control level, requests for location information, etc., and can include any suitable hardware, firmware and/or software for interfacing with one or more communication networks, such as network 206 shown in FIG. 2. For example, transmitter/receiver 308 can include: network interface card circuitry, wireless communication circuitry, and/or any other suitable type of communication network circuitry; one or more antennas; and/or any other suitable hardware, firmware and/or software for transmitting and/or receiving signals.

Display device 110 can include a hardware processor 312, a display/input device 314, memory 316 and a transmitter/receiver 318, which can be interconnected. In some implementations, memory 316 can include a storage device (such as a computer-readable medium) for storing a display device program for controlling hardware processor 312.

Figure 9A:
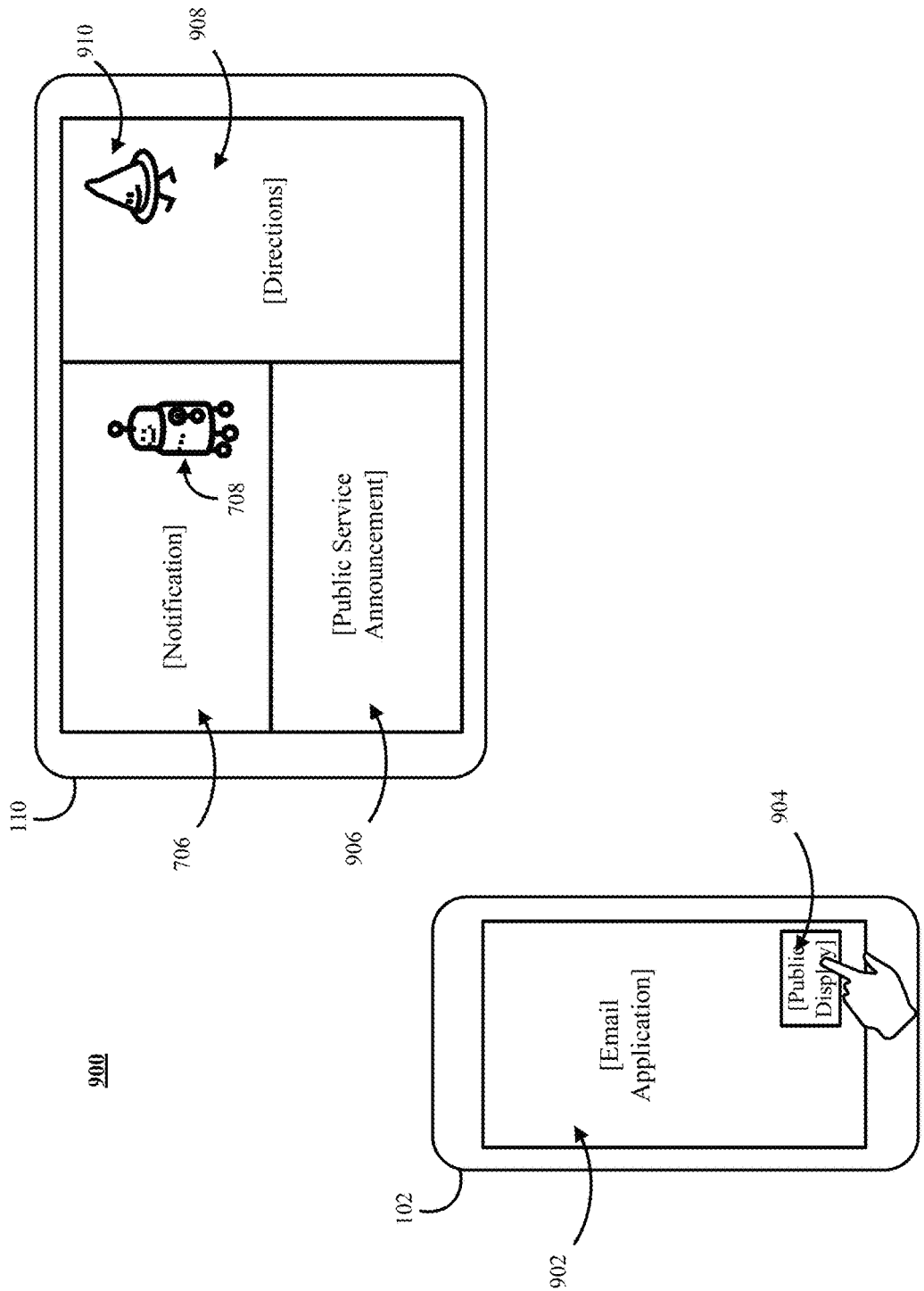
Figure 9C:
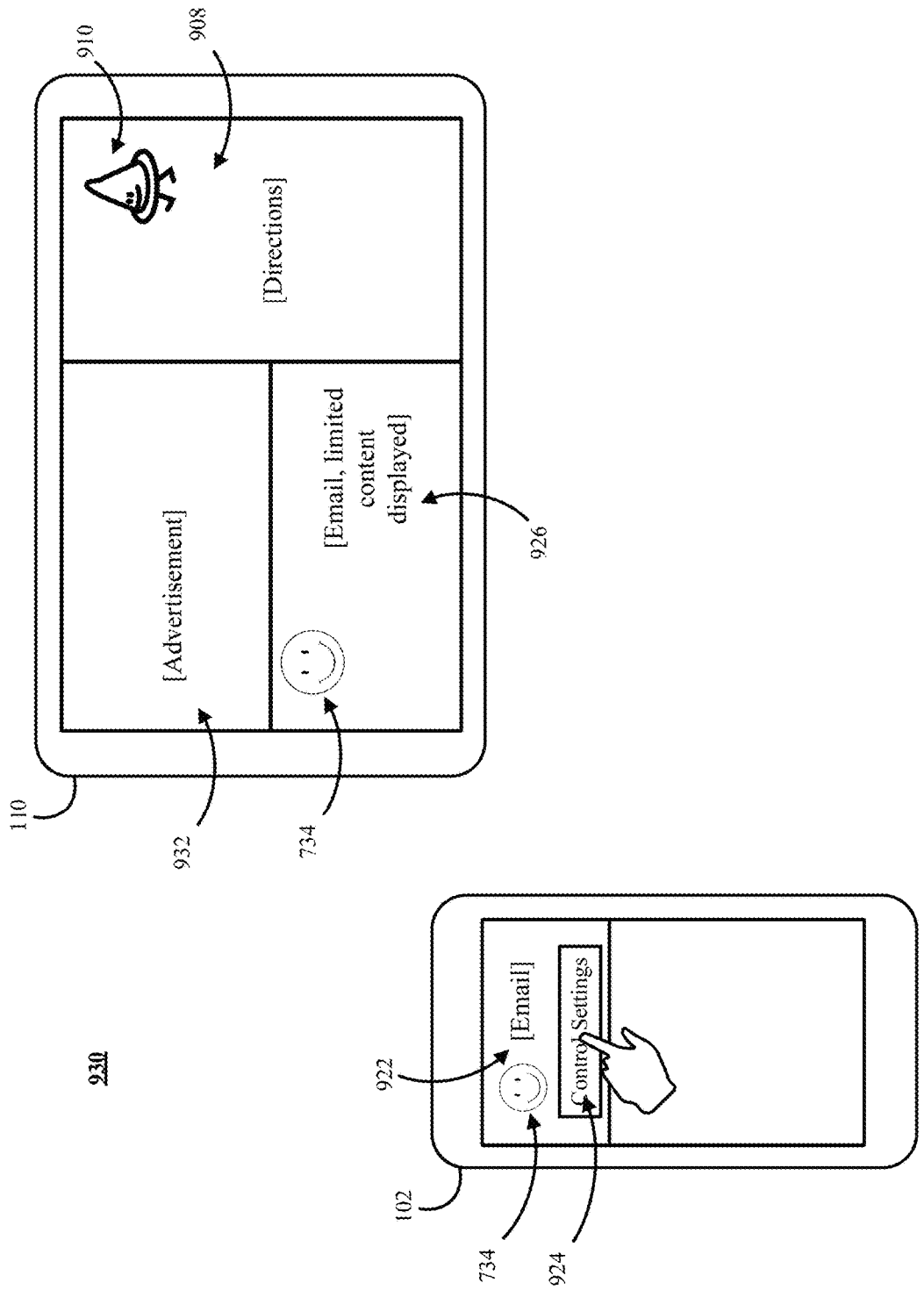
Figure 9D:
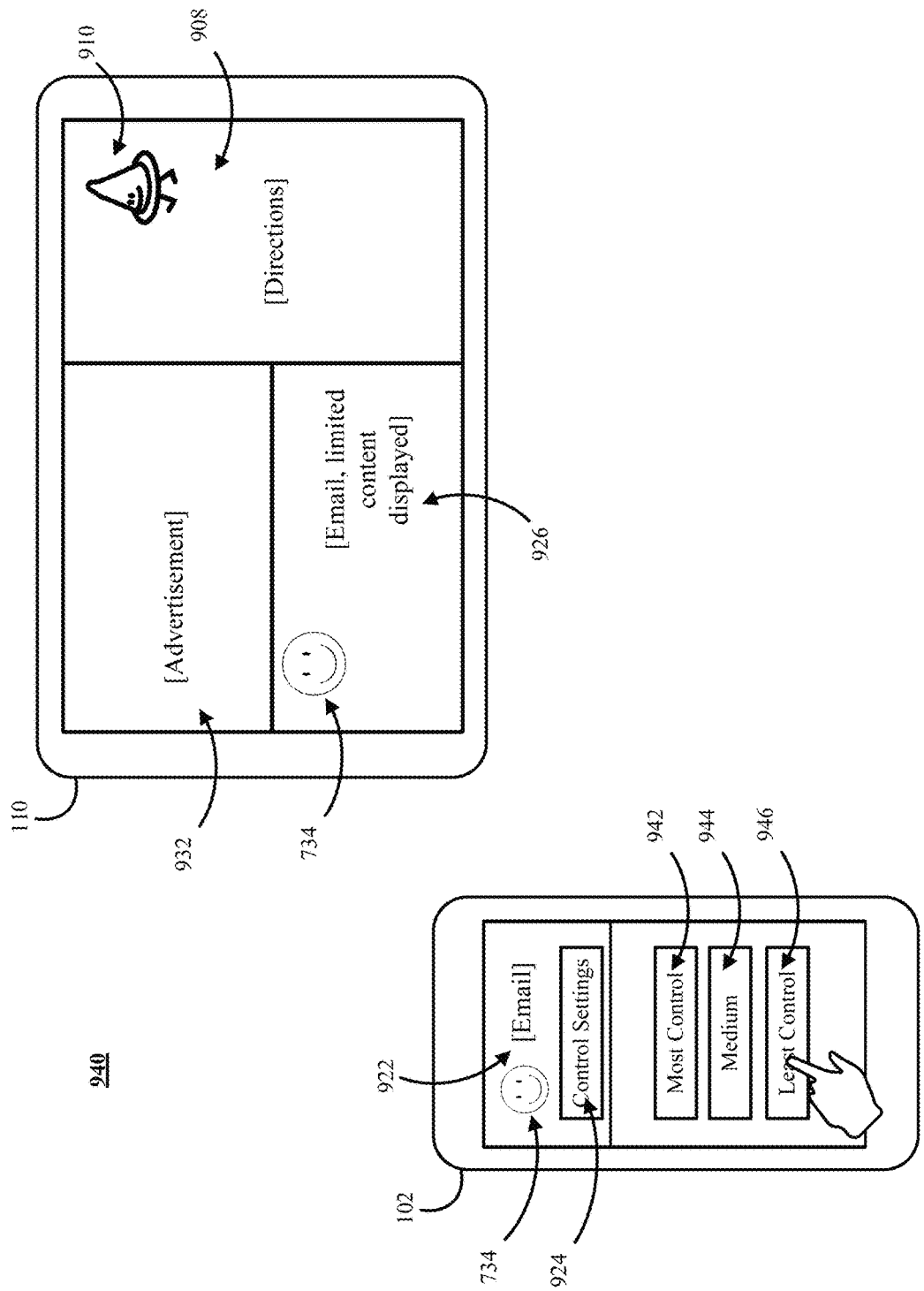
Figure 10:
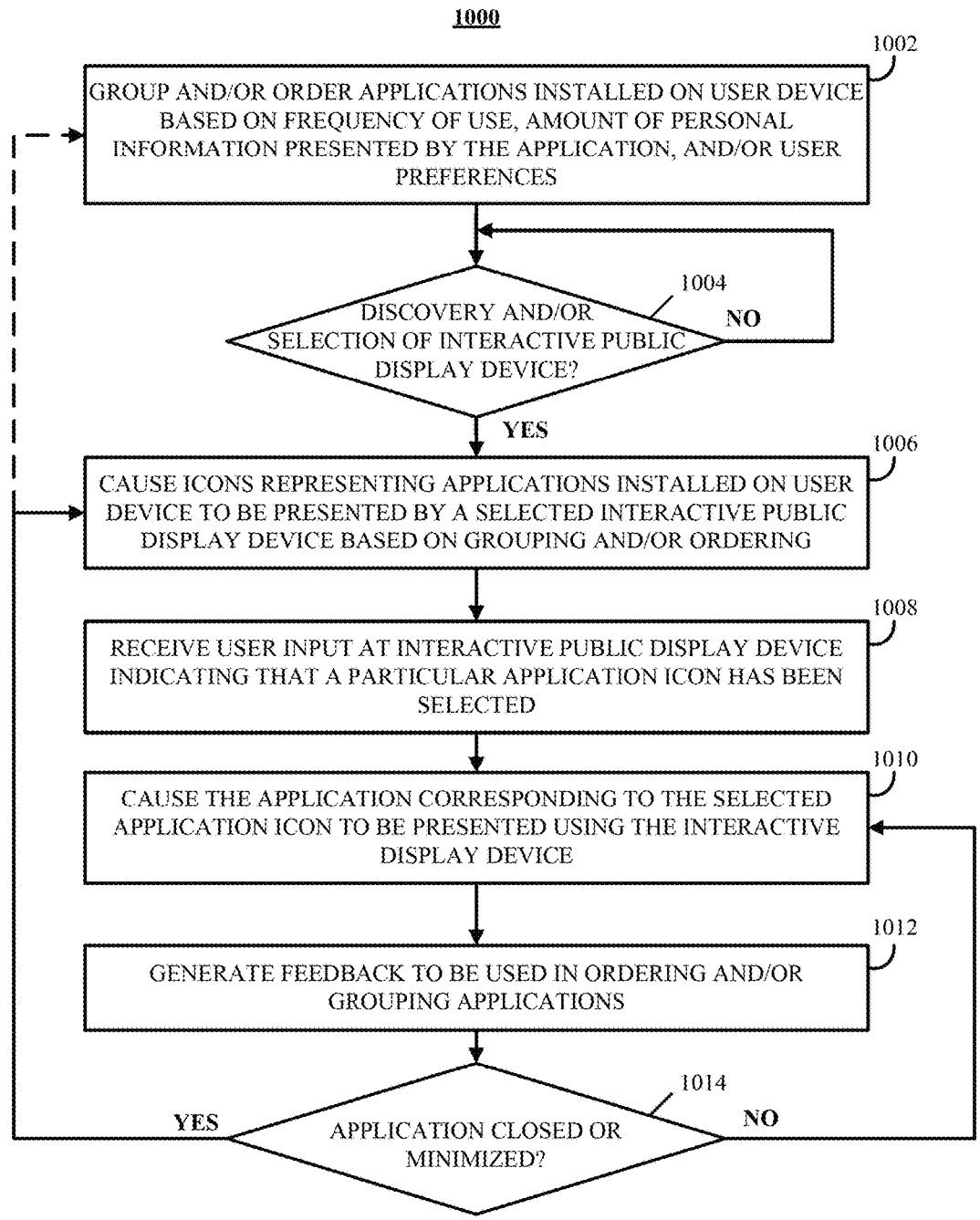
FIG. 10 shows an example of a process for launching a mobile application using a public display device in accordance with some implementations of the disclosed subject matter.
Figure 13:
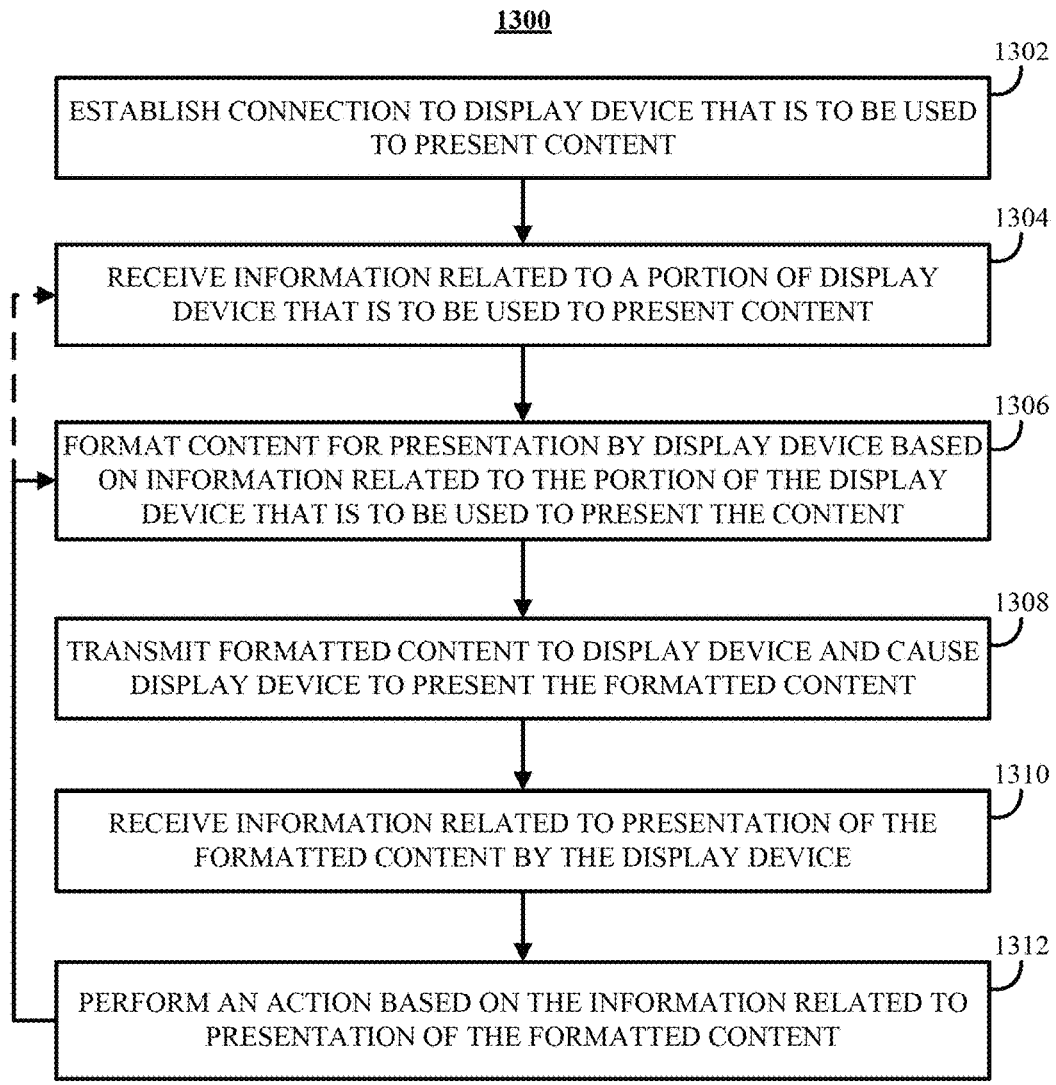
FIG. 13 shows an example of a process for presenting content using a public display device while maintaining control over the content in accordance with some implementations of the disclosed subject matter.
Figure 14:
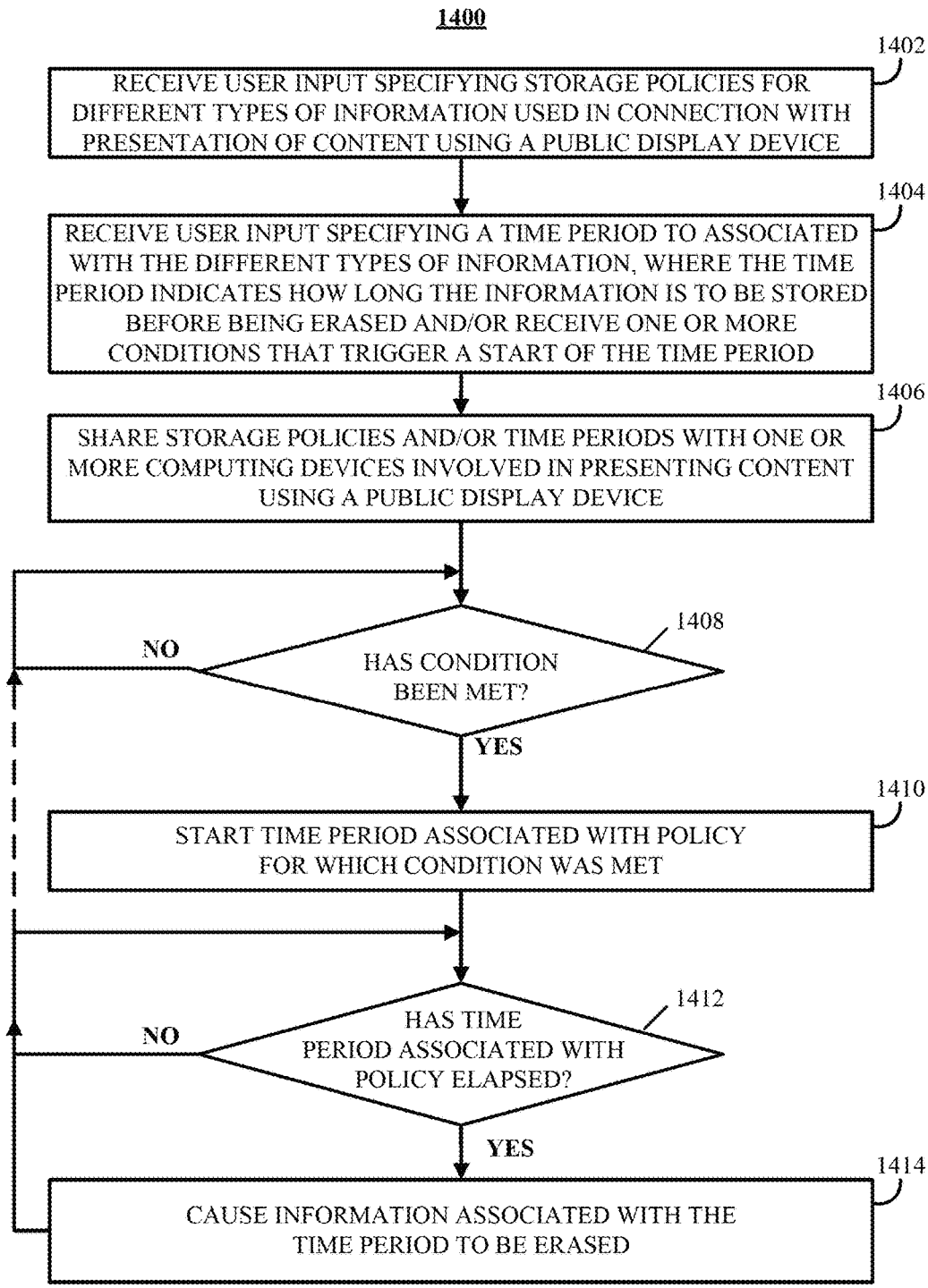
FIG. 14 shows an example of a process for controlling storage of information by a system for presenting content using a public display device in accordance with some implementations of the disclosed subject matter.

Hardware processor 312 can use the display device program to execute and/or interact with the mechanisms described herein for: receiving content to be presented by a public display device; controlling presentation of the content on the public display device (e.g., as described below in connection with FIGS. 7A-7D and 9A-9D); presenting a user interface on display/input device 314; transmitting information related to display device 110; performing any other suitable functions in accordance with instructions received as a result of, for example, process 400 described below in connection with FIG. 4, at least a portion of process 800 as described below in connection with FIG. 8, at least a portion of process 1000 as described below in connection with FIG. 10, at least a portion of process 1300 as described below in connection with FIG. 13, and/or at least a portion of process 1400 as described below in connection with FIG. 14; and/or transmitting and receiving data through communications link 208. In some implementations, the display device program can cause hardware process 312 to, for example, execute at least a portion of process 400 as described below in connection with FIG. 4 and/or at least a portion of process 800 as described below in connection with FIG. 8. In some implementations, hardware processor 312 can transmit and receive data through communications link 214 or any other communication links using, for example, a transmitter, a receiver, a transmitter/receiver, a transceiver, and/or any other suitable communication device such as transmitter/receiver 318. Display/input device 314 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 318 can include any suitable transmitter and/or receiver for transmitting and/or receiving, among other things, content to be presented, requests for status information of display device 110, requests for content, requests for location information, etc., and can include any suitable hardware, firmware and/or software for interfacing with one or more communication networks, such as network 206 shown in FIG. 2. For example, transmitter/receiver 318 can include: network interface card circuitry, wireless communication circuitry, and/or any other suitable type of communication network circuitry; one or more antennas; and/or any other suitable hardware, firmware and/or software for transmitting and/or receiving signals.

Server 220 can include a hardware processor 322, a display/input device 324, memory 326 and a transmitter/receiver 328, which can be interconnected. In some implementations, memory 326 can include a storage device for storing data received through communications link 212 or through other links. The storage device can further include a server program for controlling hardware processor 322. In some implementations, memory 326 can include information stored as a result of user activity (e.g., user preferences, content to be presented, requests for content to be presented, user credentials for use in accessing content to be presented, etc.), information stored as a result of activity related to public display devices (e.g., location information associated with one or more public display devices, status information of one or more public display devices, etc.), and/or any other suitable information. In some implementations, the server program can cause hardware process 322 to, for example, execute at least a portion of process 400 as described below in connection with FIG. 4, at least a portion of process 800 as described below in connection with FIG. 8, at least a portion of process 1000 as described below in connection with FIG. 10, at least a portion of process 1300 as described below in connection with FIG. 13, and/or at least a portion of process 1400 as described below in connection with FIG. 14.

Hardware processor 322 can use the server program to communicate with user devices 102 and/or display devices 110 as well as provide access to and/or copies of the mechanisms described herein. It should also be noted that data received through communications link 212 or any other communications links can be received from any suitable source. In some implementations, hardware processor 322 can transmit and receive data through communications link 212 or any other communication links using, for example, a transmitter, a receiver, a transmitter/receiver, a transceiver, and/or any other suitable communication device, such as transmitter/receiver 328. In some implementations, hardware processor 322 can receive commands and/or values transmitted by one or more user devices 102, display devices 110, one or more other servers 220, and/or one or more users of server 220 such as a user that makes changes to adjust settings associated with the mechanisms described herein for presenting requested content on public display devices. Display 324 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 328 can include any suitable transmitter and/or receiver for transmitting and/or receiving, among other things, content to be presented, requests for status information of display device 110, requests for content, requests for location information, etc., and can include any suitable hardware, firmware and/or software for interfacing with one or more communication networks, such as network 206 shown in FIG. 2. For example, transmitter/receiver 328 can include: network interface card circuitry, wireless communication circuitry, and/or any other suitable type of communication network circuitry; one or more antennas; and/or any other suitable hardware, firmware and/or software for transmitting and/or receiving signals.

In some implementations, server 220 can be implemented in one server or can be distributed as any suitable number of servers. For example, multiple servers 220 can be implemented in various locations to increase reliability and/or increase the speed at which the server can communicate with user devices 102 and/or display devices 110. Additionally or alternatively, as described above in connection with FIG. 2, multiple servers 220 can be implemented to perform different tasks associated with the mechanisms described herein.

FIG. 4 shows an example 400 of a process for presenting requested content on public display devices in accordance with some implementations of the disclosed subject matter. At 402, process 400 can determine that there is content associated with a user device and that the content is to be presented using a public display device. In some implementations, content that is associated with a user device can include any suitable content, such as static image data, video data, text data, formatting data, and/or any other suitable content. For example, content that is associated with a user device can include an avatar or other information associated with a user or user device to identify that the content that is being presented is directed at the user and/or a user of the user device. In a more particular example, an avatar associated with a user account authenticated on the user device can be retrieved and used by the public display device to identify content pertaining to the user device. As another example, content that is associated with a user device can include content accessible through an application installed on the user device, such as email messages, directions, notifications, personal content, text messages, etc.

As yet another example, content that is associated with a user device can include content accessible through an association with a public screen, such as an interactive catalog of products available from a nearby retail store, a map of a facility and/or area in which the public screen is located, a ticket purchasing application, etc. In some implementations, content associated with a particular public screen can be made accessible through an application program interface ("API"). Using such an API, a user device can request content associated with the public display device based on one or more received inputs and/or based on information associated with the user device such as settings, a user's history and/or revealed preferences, and/or any other suitable information. Additionally, in some implementations, the API can receive instructions initiated by the user device (and/or any other suitable device) to control presentation of the content made accessible through the API. For example, a public display device in a mall can make an interactive map available for presentation to a user associated with a particular user device. The user device can then be used to issue instructions to control presentation of the map, to search for a store in the mall, highlight the store on the map, and/or get directions to the store using the public display device and/or other public display devices. In some implementations, an owner of a public display device, an operator of a public display device, and/or any other suitable entity can designate content that is to be presented by the display device. Additionally, in some implementations, such an owner, operator, and/or any other suitable entity can design how a user interface for interacting with the content is to be presented, and/or how interaction with the content is to proceed.

In some implementations, the content that is to be presented by a public display device can be related to a user device in any suitable manner. For example, content that is to be presented by a public display device can be related to a user device because presentation of the content by the public display device was requested by the user device. In a more particular example, if a user device such as a smartphone requests that directions to a restaurant be presented by a public display device (e.g., using a map application installed on the smartphone, using a web page for requesting and/or presenting directions, etc.), directions that are to be presented on one or more public display devices can be associated with the smartphone.

As another example, content that is to be presented by a public display device can be related to a user device because a user associated with the user device is also associated with a device that requested that the content be presented by a public display device. In a more particular example, if a user device such as a tablet computer is used to request that directions to a restaurant be presented by a public display device and a particular user is associated with the tablet computer, any device associated with the user can be associated with the content to be presented. For example, a vehicle computing and/or entertainment system that is also associated with the particular user can also be associated with the content. The fact that another device (e.g., the vehicle computing and/or entertainment system) is also associated with the user can be determined based on one or more factors. In such an example, any suitable technique or combination of techniques can be used to determine that a particular user is associated with the tablet computer and/or with the vehicle computing and/or entertainment system. In a more particular example, a particular user can be determined to be associated with a user device if the particular user logged in as a user of the user device (e.g., on a log-in screen, in a settings user interface, during set-up of the device, etc.). In another more particular example, a particular user can be determined to be associated with a user device if the particular user logged in to an application used to request that the content be presented by a public display device. Any other suitable technique or combination of techniques can be used to determine that the user is associated with a particular device.

As yet another example, content that is to be presented by a public display device can be related to a user device based on a user account associated with the content being, in turn, associated with a particular user device. For example, if a notification (e.g., to inform a user about a change associated with an account) is directed at a particular user account, a device associated with that user account can also be associated with the content that is to be presented by the public display device.

In some implementations, process 400 can determine that such content associated with a user device (such as user device 102) exists based on any suitable condition or combination of conditions. For example, process 400 can determine that user device 102 has transmitted a request to present content using a public display device. As another example, process 400 can determine that content associated with user device 102 (e.g., directions) is currently being presented by a public display device and can determine that such content is to be presented on a continuing basis. In a more particular example, process 400 can determine that content associated with user device 102 is currently being presented, and can also determine that presentation of such content is to continue because at least a portion of the content associated with user device 102 has not yet been presented and/or because an instruction has not been received to inhibit presentation of the content on the public display devices. As yet another example, process 400 can determine that content associated with user device 102 is to be presented by one or more public display devices based on instructions received from a server (and/or any other suitable computing device) and/or settings associated with a user of user device 102 indicating that content associated with user device 102 is to be presented using one or more public display devices. In a more particular example, in response to a notification being directed to user device 102, process 400 can determine that content related to the notification is content that is to be presented by a public display device based on the notification itself and, in some cases, settings associated with a user of user device 102.

In some implementations, at 402, process 400 can determine whether an application and/or service associated with the content to be presented using a public display device is permitted to present content using a public display device. In some implementations, process 400 can determine whether an application is permitted to present content on a public display device based on user settings. For example, a user can provide input to any suitable application and/or service to indicate which applications and/or services are permitted to present content associated with that user. In a more particular example, the user can provide input to an operating system of a user device, to an application that controls presentation of content on public display devices, to a service associated with a user account that controls presentation of content on public display devices, and/or to any other suitable application and/or service, where the input indicates whether presentation of content associated with particular applications and/or services is permitted using a public display device. In some implementations, a user can be required to affirmatively permit content associated with a particular application and/or service to be presented before process 400 will permit content associated with that particular application and/or service to be presented by a public display device. Additionally, in some implementations, if process 400 determines that the content to be presented using a public display device is associated with an application and/or service that is not permitted to present content using a public display device, process 400 can inhibit the content from being presented using a public display device by inhibiting any suitable portion of process 400 from being carried out with respect to that content (e.g., by inhibiting discovery as described below in connection with 404, by inhibiting selection as described below in connection with 408, by inhibiting the content from being presented as described below in connection with 412, and/or by inhibiting any other suitable action from being performed). In some implementations, when process 400 inhibits the content from being presented, process 400 can cause a user device with which the content is associated to provide an indication that presentation of the content has been inhibited, information identifying which application and/or service the content is associated with, and/or instructions and/or options indicating to the user one or more actions that the user may take to permit the content to be presented using a public display device.

As another example, in some implementations, an administrator of a display device for presenting content and/or an administrator of a server that causes content to be presented using a display device, can provide input to any suitable application and/or service to indicate which applications and/or services are permitted to present content on one or more public display devices (e.g., public display devices associated with the administrator, all public display devices, public display devices in a particular area, etc.). In a more particular example, the administrator can provide input to an operating system of a server and/or display device, to an application that controls presentation of content on public display devices, to a service associated with one or more display devices that controls presentation of content on those display devices, and/or to any other suitable application and/or service, where the input indicates whether presentation of content associated with particular applications and/or services is permitted using a public display device. In some implementations, an administrator can be required to affirmatively permit presentation of content associated with a particular application and/or service before process 400 will permit content associated with that particular application and/or service to be presented using a public display device. Additionally, in some implementations, if process 400 determines that the content to be presented using a public display device is associated with an application and/or service that is not permitted to present content on a public display device, process 400 can inhibit the content from being presented on a public display device by inhibiting any suitable portion of process 400 from being carried out with respect to that content (e.g., by inhibiting discovery as described below in connection with 404, by inhibiting selection as described below in connection with 408, by inhibiting the content from being presented as described below in connection with 412, and/or by inhibiting any other suitable action from being performed). In some implementations, when process 400 inhibits the content from being presented, process 400 can cause a user device with which the content is associated to provide an indication that presentation of the content has been inhibited due to the application and/or service not being permitted to present content on public screens.

In some implementations, process 400 can determine whether the content that is to be presented is authentic content that has been requested by a valid user device. Process 400 can use any suitable technique or combination of techniques to authenticate the content such that the likelihood that presentation of the content by public display devices in response to a requested by a malware application and/or a malicious user is reduced.

At 404, process 400 can initiate device discover functions to determine which public display device or devices are near the user device associated with content that is to be presented by a public display device. In some implementations, such device discovery functions can be initiated in response to determining that content is to be presented by a public display device at 402. Additionally or alternatively, in some implementations, such device discovery functions can be initiated from any suitable device and can use any suitable information to determine which public display device or devices are near the user device.

In some implementations, the user device with which content is associated, such as user device 102 can, in response to initiating presentation of content by a public display device (e.g., in response to a user input), determine whether any public display devices are nearby. User device 102 can use any suitable technique or combination of techniques to determine whether any public display devices are nearby. For example, user device 102 can transmit a signal or signals including a message requesting that nearby public display devices (e.g., public display devices which receive the signal) to respond with a message indicating that the public display device received the signal. As another example, user device 102 can receive a signal or signals transmitted by a public display device including a message indicating that the display device is available for presentation of content. Such signals can be transmitted using, for example, peer-to-peer communication techniques such as Bluetooth, using RFID techniques, and/or using any other suitable technique or combinations of techniques for communicating between user device 102 and display device 110. As another example, user device 102 can transmit a message to a server that maintains a database and/or list of public display device locations. Such a message can include current location information associated with the user device.

In some implementations, a public display device, such as display device 110, can receive a signal indicating that a user device, such as user device 102, is requesting that content be presented by a public display device. Display device 110 can use any suitable technique or combination of techniques to determine whether a user device requesting that content be presented is nearby. For example, display device 110 can listen for a signal or signals including a message requesting that nearby public display devices (e.g., a display of display device 110) present content. As another example, display device 110 can transmit a signal or signals including a message indicating that display device 110 is available for presentation of content. Such signals can be transmitted using, for example, peer-to-peer communication techniques, such as Bluetooth, using RFID techniques, and/or using any other suitable technique or combinations of techniques for communicating between user device 102 and display device 110. As another example, display device 110 can receive a message from a server indicating that content is to be presented.

In some implementations, a server can receive a message indicating that content associated with a user device is to be presented by a public display device. Such a message can include any suitable information such as the content that is to be presented, location information associated with the user device, etc., and can be from any suitable source such as the user device, another server (e.g., a notification server, a mail server, etc.) and/or any other suitable source. In some implementations, in response to receiving such a message, the server can determine which public display devices, if any, are located in an area near the user device's location. As described above, the server can access a database and/or list of public display devices to determine which public display devices are near the user device. A public display device can be determined to be near the user device based on any suitable criteria or criterion, in some implementations. For example, the server can determine that public display devices that are less than or equal to a threshold distance to the user device are near the user device. As another example, the server can determine that public display devices for which the user device is in a viewable area (e.g., as described above in connection with FIG. 1) are near the user device. As yet another example, the server can determine that up to a predetermined number of public display devices that are closest to the user device are near the user device. As still another example, the server can transmit a message to one or more display devices that can be used as public display devices in an area near the user device (e.g., based on a location of the user device), where the message requests an indication of whether the public display device detects a signal from the user device (e.g., using any suitable type of communication). In such an example, the server can use responses to the message to determine one or more public display devices that are near the user device. As a further example, the server can determine a public display device along a route of travel of the user device (e.g., based on directions requested by the user device, a destination of the user device, an inferred route of the user device, etc.) as being a public display device that is near to the user device. As another further example, any suitable combination of techniques can be used to determine one or more public display devices that are near the user device.

At 406, process 400 can receive location information associated with the user device and/or location information associated with public display devices near the user device. In some implementations, for example as described above in connection with FIG. 1, location information can include any suitable information that can be used to determine the relative locations of the user device and one or more public display devices near the user device. For example, the location of a user device can be represented using coordinates and, in some cases, a margin of uncertainty around those coordinates. In a more particular example, coordinates can be determined using any suitable technique or combination of techniques, such as by using GPS signals, by using multilateration, trilateration, and/or any other suitable techniques. As another example, the location of a user device can be represented using a direction and/or a distance and, in some cases, a margin of uncertainty around the direction and/or distance, from a known object, such as a public display device.

In some implementations, a location of a user device can be determined by the user device using one or more sensors such as a GPS sensor, a sensor used in multilateration using multiple signal sources (e.g., signals from cellular telephone and/or data antennas, signals from one or more public display devices, etc.), and/or any other suitable sensors. In such implementations, location information associated with the user device can be transmitted to any suitable device executing at least a portion of process 400.

Additionally or alternatively, in some implementations, a location of a user device can be determined by one or more devices remote from the user device. For example, one or more public display devices can each determine an approximate distance to the user device using any suitable technique or combination of techniques. As described above in connection with FIG. 1, a remote device, such as a public display device, can use any suitable technique or combination of techniques to determine a distance to the user device.

In some implementations, the presence and/or magnitude of a margin of uncertainty in the location information associated with the user device can be based on technological limitations in how precisely the location of the user device can be determined (e.g., based on how accurately the location of the user device can be determined using a particular technique such as a technique using GPS signals, a technique using multilateration of signals, etc.). Additionally or alternatively, the presence and/or magnitude of a margin of uncertainty in the location information associated with the user device can be based on user settings regarding how precisely the location information associated with the user device is permitted to be specified. For example, the settings associated with a user device and/or a user can permit the position of the user device to be specified to within a certain area in which the user device is present. As a more particular example, with reference to environment 100 of FIG. 1, settings associated with user device 102 and/or user 104 can inhibit a relatively precise location of user device 102 from being specified. In such an example, such settings can limit the location of user device 102 to be specified based on a block of environment 100 on which user device 102 is located, a viewing area of a display device in which user device 102 is located (e.g., the location of user device 102 can be specified as within the viewing area of the south-facing screen of public display device 110-2), with any other level of specificity, and/or any suitable combination thereof.

In some implementations, process 400 can receive location information associated with one of more public display device on which content may be presented from any suitable source and/or in response to any suitable query. For example, as described above in connection with FIG. 1, a database and/or list of location information for public display devices and/or screens of public display devices can be maintained (by one or more computing devices that are part of the mechanisms described herein and/or by one or more computing devices that are maintained separately from the mechanisms described herein). In such an example, location information associated with the user device and/or any other suitable location information can be used as a query to the database and/or list of location information for public display devices. As another example, process 400 can cause messages to be transmitted to one or more particular public display devices to determine location information associated with the public display device. Such messages can be addressed, for example, by broadcasting a message to all or a subset of display devices known to be in a particular area that is near the user device. In some implementations, address information for a public display device can be assigned based on the location such that messages can be addressed to the public display device using the location-based address without querying a database to determine the location and/or address of the display device prior to sending the message.

At 408, process 400 can select one or more public display devices on which to present the content requested by the user device. In some implementations, any suitable criteria and/or criterion can be used for selecting a public display device on which to present the content. For example, based on the device discovery initiated at 404 and/or location information received at 406, one or more public display devices nearest to the user device can be selected at 408. In such an example, any suitable number of nearest display devices can be selected. As another example, based on the device discovery initiated at 404 and/or location information received at 406, one or more display devices of which process 400 determines the user is most likely to be able to view can be selected at 408. As yet another example, process 400 can select a display device based at least in part on information about a particular display device (e.g., as received at 410 as described below). In a more particular example, process 400 can select a display device that permits the requested content to be presented (e.g., as described above in connection with FIG. 1, certain display devices can inhibit particular content or particular types of content from being presented). In another more particular example, process 400 can select a display device that is being used by less than a threshold number of other users and/or user devices to present requested content.

In some implementations, process 400 can inhibit at least a portion of the requested content from being presented based on any suitable criteria or criterion being met. For example, if one or more contacts of a user associated with the user device are nearby the user device and/or the public display device that is to be used to present the content (which can be determined using any suitable technique or combination of techniques), process 400 can inhibit presentation of the content and/or presentation of an avatar associated with the user. Additionally, in some implementations, process 400 can cause an indication to be presented to the user (e.g., by user device 102) indicating that presentation of the content and/or avatar was inhibited due to the proximity of contacts of the user. In some implementations, process 400 can cause identifying information of those contacts to be presented to the user (which can be based on whether the contact has affirmatively chosen for identifying information to be presented to nearby contacts, such as the user of user device 102). Additionally, in some implementations, process 400 can cause user device 102 to prompt a user to select whether to present the content and/or avatar despite the proximity of the contacts.

As another example, process 400 can inhibit sensitive and/or personal content from being presented based on information about the public display device and/or a location of user device 102 with respect to the public display device. In a more particular example, if process 400 determines that multiple other users are using a public display device, process 400 can control the amount of personal content that is presented by the public display device. In another more particular example, as the user moves closer to the public display device more personal content can be presented, and the content can be presented at a smaller scale (e.g., to make it less likely that others will be able to view the content).

In some implementations, process 400 can select a public display device and/or determine whether to inhibit the presentation of certain content based on the type of content to be presented. For example, for content that includes personal information and/or sensitive information, process 400 can select a display device based more on which display device is likely to allow for more privacy and based less on which display device is most conveniently located. Additionally or alternatively, in some implementations, a user (e.g., via user device 102) can designate one or more display devices as being a private display device. For example, in such implementations, a private display device can be a display device that can otherwise act as a public display device, but that the user has designated as a private display device which is to be used to present content associated with the user that includes personal information and/or sensitive information. As another example, a private display device can be a display device located in a user's home, workplace, etc., that the user designates as a private display device. In some implementations, a display device designated as a private display device can be inhibited from acting as a public display device.

In some implementations, process 400 can select a display device or devices based on the location of user device 102 for content that serves a notifying function. For example, for assisting a user in finding information that is already being presented, process 400 can select a display device or devices that are determined to be most likely to be visible to the user of user device 102. In a more particular example, to assist a user in locating flight information (e.g., departure time, gate, etc.) when the user is at the airport, process 400 can cause an avatar associated with the user to be presented in proximity to such flight information on an airport monitor to assist the user in quickly locating such information. As another example, to assist the user in locating an item in a grocery store (e.g., if the user has requested the location of salad dressing), process 400 can cause an avatar associated with the user to be presented in proximity to an aisle where the salad dressing is normally stocked.

In some implementations, process 400 can select a display device or devices based on a predicted location of the user device associated with the content. For example, if the content includes directions to a particular location, process 400 can determine one or more display devices that are likely to be visible to a user associated with the user device if the user follows the directions. In a more particular example, process 400 can select one or more display device based on the progress of user device 102 along a planned route, and process 400 can anticipate a next display device to use based on the directions/route, in addition to or in lieu of the location of user device 102.

In some implementations, process 400 can select a public display device and/or determine whether to inhibit the presentation of certain content based on whether the request for content was an active request initiated by a user or a passive request initiated automatically (e.g., in response to a notification directed at the user device). For example, for an active request for content, process 400 can select a display device and/or determine whether to inhibit the presentation of certain content (e.g., personal information and/or sensitive information) with a bias toward providing more information, and can, in some cases, select to present such information using a display device that is likely to allow for more privacy. In such an example, as the user has actively requested content, process 400 can infer that the user would like to be presented with more complete content at the expense of the convenience and/or the privacy with which the content can be viewed based on the active request. As another example, for a passive request for content, process 400 can select a display device and/or determine whether to inhibit the presentation of certain content (e.g., personal information and/or sensitive information) with a bias toward providing less information, and can, in some cases, select to present such information using a display device that is more likely to be viewable by the user (e.g., based on the location of the user device).

At 410, process 400 can receive data related to the one or more public display devices selected at 408. In some implementations, such data related to the one or more public display devices can be received prior to, concurrently with, and/or after selecting one or more display devices at 408. Additionally, in some implementations, process 400 can select a display device at 406 based on the data related to the display devices that is received at 410.

In some implementations, the data related to the one or more public display devices can include any suitable data about the public display devices that may be relevant to the content that is to be presented. For example, the data related to the one or more public display devices can include a number of other users for which a particular display device is presenting data. As another example, the data related to the one or more public display devices can include data related to the surroundings of the public display device, such as an area from which the display device is viewable, which can take account of structures such as walls, floors, ceilings, pillars, stairs, etc., as well as transient structures, such as vehicles, banners, etc. As yet another example, data related to the one or more public display devices can include specifications of one or more screens of the public display device, such as a size of a screen of the display device to be used, an amount of the screen that is available for presenting content, an area of the screen that can currently be used to present content, a resolution of the screen, and/or any other suitable information about the display device and/or a screen of the display device. As still another example, data related to the one or more public display devices can include a number of people that are near the display device, which can be determined based on sensors associated with the display device. As a further example, data related to the one or more public display devices can include an indication of whether the display device is configured to act as a public display device on which any suitable content associated with any suitable user device, user and/or user account can be presented.

In some implementations, the data related to the one or more public display devices can be received from any suitable source. For example, the data can be received from one or more other processes and/or other instances of process 400 being executed concurrently to present content on public display devices. Such other processes or instances of process 400 can be executed by a computing device executing process 400 and/or by any other suitable computing device. As another example, the data can be received from the public display devices on a periodic basis and/or in response to request for such data. As yet another example, the data can be received from a database (or other data structure) that includes such data related to the public display devices. The related data can be received from any other suitable source and/or any suitable combination of sources.

In some implementations, the data related to the one or more public display devices can include one or more types of content that are permitted to be presented by the display device (e.g., based on settings that are set by an owner and/or operator of the display device). These settings can limit the types of content that can be presented using the public display device. For example, the settings can limit the types of advertisements and/or the content of advertisements that can be presented on the public display device and/or inhibit advertisements from being presented by the public display device. As another example, the settings can limit the types of content that can be presented to specified categories, such as maps and/or directions content, weather content, news content, notifications, etc. As yet another example, the settings can inhibit particular types of content from being presented such as email, text messages, images, social media, etc.

At 412, process 400 can cause an avatar associated with a user of the user device to be presented on the selected display device or devices in association with the content to be presented (e.g., the content to be presented as described above in connection with 402). In some implementations, the avatar can be any suitable graphical representation that is associated with one or more of the user device, the user of the user device and/or the content that is to be presented on one or more public display devices.

In some implementations, a user can select an avatar to be associated with the user and/or with the user device (e.g., user device 102). For example, the user can select an avatar during setup of an account associated with the user device and/or an application to be executed by the user device that is associated with content that is to be presented. As another example, the user can select an avatar to be presented during set up of a request for content (e.g., by selecting from a list of possible avatars, by inputting information identifying an avatar to be used, using any other suitable technique for selecting an avatar, and/or any combination of techniques).

In some implementations, an avatar can be assigned to a user, a user device and/or content to be presented. For example, process 400 (and/or any other suitable process) can select an avatar to be associated with a particular user, a particular user device and/or with particular content. In some implementations, an assigned avatar can be a default avatar if a user has not selected an avatar to be used. Additionally or alternatively, an assigned avatar can be used in situations where presentation of an avatar associated with the user and/or user device is to be inhibited. For example, if a user, through a user device, requests that content be presented by a public display device but wishes to not use an avatar associated with the user, an avatar can be assigned to the user for the requested content.

In some implementations, different avatars for a single user can be associated with different applications and/or different types of content. For example, a user can be associated with a first avatar for social media content and can be associated with a second avatar for directions.

In some implementations, process 400 (and/or any other suitable process) can determine which content is to be presented based on any suitable factor or factors. For example, process 400 can determine which content is to presented based on the data related to the selected display device or devices received at 410. In a more particular example, process 400 (and/or any other suitable process) can format the content to be presented based on specifications of the selected display device or devices, an amount of space available on the selected display device or devices, how much space has been allotted to the content on the selected display device or devices, and/or any other suitable factors. As another example, process 400 (and/or any other suitable process) can determine which content is to presented based on control settings associated with a user and/or a user device associated with the content. A more detailed example of determining content to be presented based on control settings is described below in connection with FIG. 8. As yet another example, process 400 (and/or any other suitable process) can determine which content is to presented based on sensitivity of at least a portion of the content to be presented. In a more particular example, process 400 (and/or any other suitable process) can determine that portions of content that include personal information of the user associated with the content and/or any other suitable user are to be inhibited from being presented. In another more particular example, process 400 (and/or any other suitable process) can determine that portions of content that include material that certain members of the public may find objectionable, such as depictions of violence, nudity, certain words or phrases, etc., are to be inhibited from being presented.

In some implementations, process 400 can cause a size at which an avatar is presented to be changed based on a distance between the user device associated with the content and a public display device presenting the content. For example, the avatar can be presented at a particular maximum size when process 400 determines that the user device is more than a threshold distance from the public display device (e.g., based on the location information received at 406). As the user device moves closer to a public display device presenting the avatar, process 400 can cause the size of the avatar to decrease, as the user can more easily perceive the avatar as they move closer. In some implementations, process 400 can cause presentation of the avatar to be inhibited in response to the user device being less than a minimum threshold distance from the public display device on which the avatar was previously presented. Additionally, in some implementations, as process 400 causes the size at which the avatar is presented to decrease, process 400 can cause a size at which the content is presented to increase. In some implementations, process 400 can cause the avatar to be presented as a background over which the content is presented.

In some implementations, as a distance between the user device and a public display device being used to present the content decreases, process 400 can cause an area of the public display device used to present the content associated with the user device to decrease. Additionally or alternatively, process 400 can cause the size at which portions of the content are presented to decrease in size as a distance between the user device and a public display device being used to present the content decreases. For example, an image in the content can be presented at an initial size (e.g., in comparison to a total screen area of the public screen) and as the user device moves closer, process 400 can cause the image to be presented at a decreasing size. As another example, text within the content can be presented using an initial font size which process 400 can cause to decrease as the user device moves closer. This can allow for content to be more visible when a user is at a greater distance from the public display device and for more content to be presented when the user is at a closer distance to the public display device.

In some implementations, process 400 can cause a message to be presented by the user device associated with the content that is being presented to inform a user as to which public display device or devices are being used to present the content. For example, user device 102 can request that email associated with a particular user account be presented by a public display device. Process 400 can cause the email content to be presented on one or more selected public display devices and can cause a message (and/or other suitable information) to be presented by user device 102 to inform the user of user device 102 of which public display device or devices are being used to present the email content.

In some implementations, information to inform a user of a public display device being used to present content can be conveyed using any suitable technique or combination of techniques. For example, process 400 (and/or any other suitable process) can cause a map to be presented by user device 102 (and/or any other suitable device), where the map includes positions of user device 102 and one or more public display devices that are being used to present the content. In a more particular example, process 400 can cause directions to the display device being used to present the content to be presented by user device 102. As another example, process 400 (and/or any other suitable process) can cause one or more arrows to be presented by a display of user device 102 pointing toward a public screen or screens that are being used to present the content. In such an example, the direction of the arrow(s) can be determined based on outputs from one or more sensors of user device 102 (e.g., an electronic compass, one or more accelerometers, etc.), and a length of the arrow can represent a distance to the corresponding public display device. As yet another example, process 400 (and/or any other suitable process) can cause a public display device being used to present the content to be highlighted in an augmented reality image produced by the user device. In a more particular example, information about a location of the user device, a location of the selected public display device or devices, and size information of the selected public display device or devices can be used by any suitable process to overlay a highlight on a location of the public display device within a field of view of a camera of user device 102 (or any other suitable device in communication with user device 102) that captures images of the surroundings of user device 102. As still another example, process 400 can cause contextual information that can be used to locate a display device that is being used to present the content to be presented by user device 102 as, for example, text and/or audio data. In a more particular example, process 400 can cause text stating "look up when you get to the corner of fifth and main" to be presented to the user. In such example, process 400 can generate such contextual information based on any suitable information, such as location information associated with user device 102, including direction information of user device 102. Additionally or alternatively, if further information about a direction in which a user is likely to be looking is known (e.g., based on eye gaze detection, based on orientation information of a wearable user device, etc.), process 400 can generate the contextual information using such further direction information of the user to provide further guidance to locate the display device that is being used to present the content. In another more particular example, process 400 can cause audio stating "turn your head left" to be presented to the user.

In some implementations, process 400 can use any suitable technique or combination of techniques to cause a message to be presented by the user device associated with the content to be presented. For example, in some implementations, process 400 can cause an application that requested that the content be presented to present a message to the user. As another example, in some implementations, process 400 can cause a notification to be transmitted to the user device associated with the content, where the notification includes a message and/or can be selected to cause a message to be presented by the user device.

In some implementations, any other suitable technique or combination of techniques can be used to draw user attention to a display device that is to be used to present the content. For example, an avatar presented in association with the content can be animated to draw the user's attention to the avatar. As another example, a portion of a screen of the display device that is being used to present the content can present a pattern of brightness and/or colors to draw the user's attention.

In some implementations, process 400 can cause presentation of the content on one or more selected public display devices to be inhibited until a user acknowledgment is received indicating that the content is to be presented. For example, process 400 can determine that content is to be presented by a public display device and can select a public display device on which to present the content, but presentation of the content can be inhibited until the user indication to present the content is received. This can, for example, facilitate the user in determining which display device is to be used to present the content and can allow the user to approach the display device prior to the content being presented.

In some implementations, process 400 can cause the user to be prompted to select a public display device from among nearby public display devices. The nearby public display devices available for selection can be presented to the user using any suitable technique or combination of techniques. For example, process 400 can cause a list of nearby public display devices to be presented by a user device associated with the user, and can receive a user selection of a public display device from the user device. As another example, process 400 can prompt the user (e.g., using a message transmitted to the user device associated with the user) to move toward a public display device to be used to present the content, and process 400 can cause the content to be presented on the public display device towards which movement (e.g., of the user device) is detected. As yet another example, process 400 can prompt the user to perform a particular action, such as a gesture, in front of a public display device to be used to present the content, and process 400 can cause the content to be presented on that public display device in response to the gesture being recognized by process 400 and/or receiving a signal from the public display device indicating that such a gesture was recognized from the user. As still another example, process 400 can prompt the user to aim a camera of a user device (e.g., a smartphone, a tablet computer, a wearable computer, etc.) associated with the user at a public display device to be used to present content. In such an example, process 400 can cause the nearby public display devices that can be selected to present the content to be highlighted in an image captured by the camera and presented by the user device. Process 400 can receive a signal indicating that a particular public display device is to be used to present content from the user device that includes the camera (and/or any other suitable device in communication with the camera). Such a signal can be based on any suitable criteria being met for a user selection based on the image data captured by the camera. In a more particular example, process 400 can receive a signal based on the camera capturing an image of a particular public display device for at least a threshold amount of time (e.g., the camera was capturing images of a particular public display device for at least two seconds, five seconds, etc.). In another more particular example, process 400 can receive a signal based on the user device receiving a selection of an area of a touchscreen associated with an image of a particular public display device (e.g., the image data captured by the camera is presented on a touchscreen and a selection corresponding to an area of the image including the particular public display device is received).

As a further example, process 400 can prompt the user to bring a particular user device within a threshold distance of a particular public display device and/or a sensor associated with the particular public display device. Any suitable technique can be used to determine the proximity of the user to the particular public display device and/or sensor associated with the public display device. In such an example, the public display device can detect that the user device is within a threshold distance of the public display device (and/or a sensor associated with the public display device) and transmit a signal to a device executing process 400 that the user device was brought within the threshold distance of the public display device. In a more particular example, the user device can include an NFC antenna and the public display device can be associated with a sensor for detecting a signal from the NFC antenna of the user device. The NFC antenna of the user device can emit a signal that can be received by the public display device's sensor when the user device is brought to within a threshold distance of the sensor. Any other suitable technique or combination of techniques can be used to determine that the user device is within a particular distance of the public display device and/or a sensor associated with the public display device. In some implementations, the user bringing the user device within the threshold distance can be used to select a particular display device and/or verify the user device's presence at the display (e.g., prior to presenting certain content in accordance with process 800 described below in connection with FIG. 8).

In some implementations, process 400 can use any suitable technique or combination of techniques to cause the avatar and/or the requested content to be presented by the one or more selected display devices. For example, process 400 can cause the content and/or avatar to be made available at one or more particular addresses, and these one or more addresses can be communicated to the public display device that is to present the requested content. In such an example, the public display device can use the one or more addresses to request the content and/or avatar to be presented, and can receive the content and/or avatar in response.

As another example, process 400 can cause the content and/or avatar to be pushed to the one or more selected display devices based on address information of the one or more selected display devices.

In some implementations, process 400 can return to 402 to determine if there continues to be content associated with a user device that is to be presented. Additionally or alternatively, process 400 can determine whether a public display device on which the content is being presented is still an appropriate display device on which to present the content. Such a determination can be based on any suitable factor or factors, such as location information received at 406, whether particular sensitive or personal information is still included in the content and/or is no longer included in the content, and/or any other suitable factors. For example, as user 104 moves through environment 100 shown in FIG. 1, process 400 can continuously and/or periodically determine which public display device or devices are to be used to present content based on the location of user 104 with respect to the public display devices, based on what information is included in the content to be presented, based on the surroundings of the display devices, based on whether a contact of the user is nearby, etc.

Figure 5A:
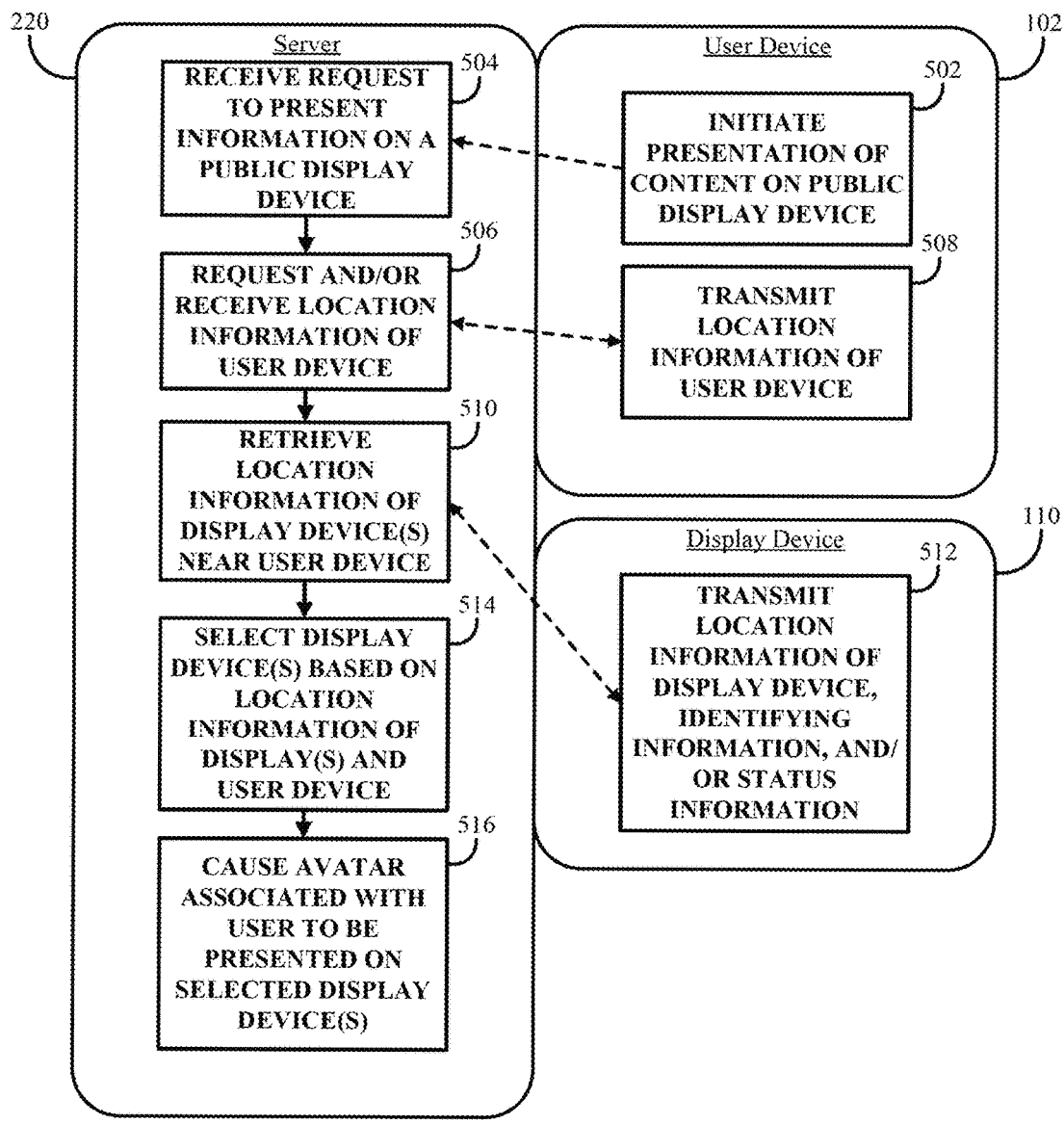
FIGS. 5A-5C show diagrams illustrating examples of data flows that can be used in conjunction with the process of FIG. 4 to discover and/or select public display devices on which to present content in accordance with some implementations of the disclosed subject matter.
Figure 5B:
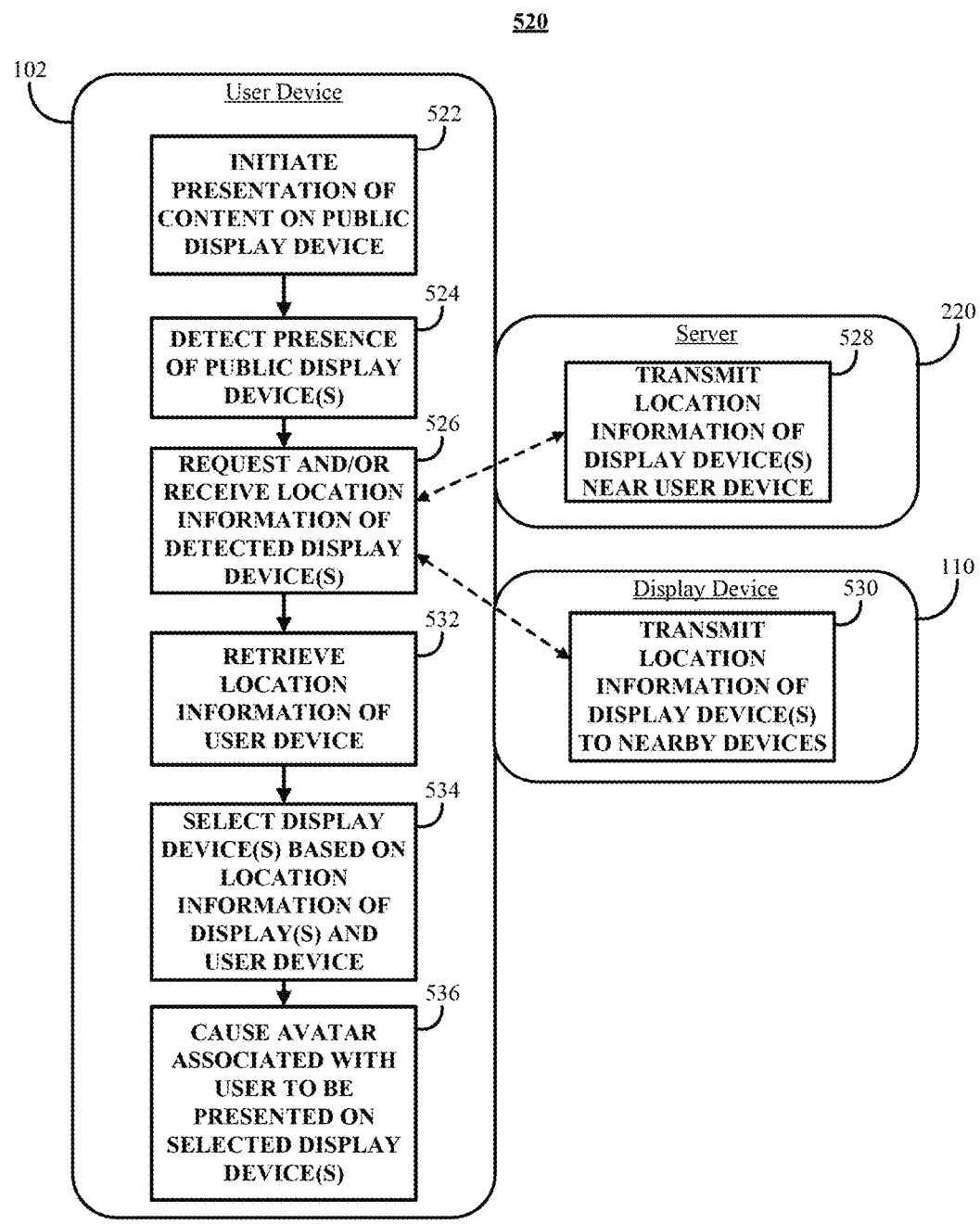
Figure 5C:
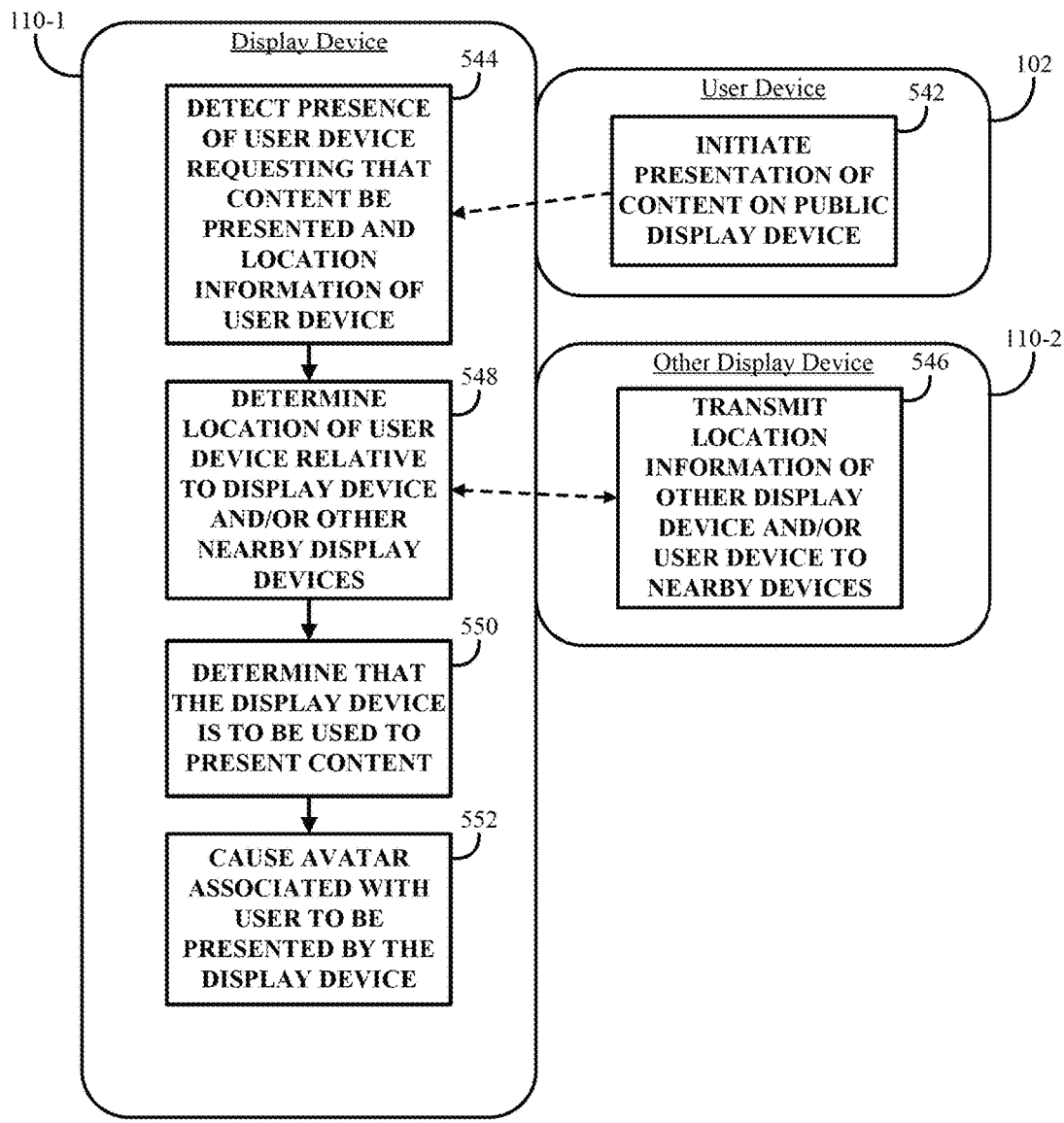

FIGS. 5A-5C show diagrams illustrating examples of data flows that can be used in conjunction with process 400 of FIG. 4 to discover and/or select public display devices on which to present content in accordance with some implementations of the disclosed subject matter.

FIG. 5A shows a diagram illustrating an example 500 of a data flow that can be used by server 220, user device 102, and display device 110 to discover and/or select one or more public display devices on which to present content in accordance with some implementations of the disclosed subject matter.

As shown in FIG. 5A, at 502, user device 102 can initiate presentation of content by a public display device. Any suitable technique or techniques can be used to initiate presentation of content by a public display device. For example, an application installed on user device 102 and being executed by user device 102 can receive an indication that content accessible by the application (or by another application installed on user device 102) is to be presented by a public display device. Such an indication can be received in response to any suitable input received by the user device and/or according to any suitable rule associated with the application. In a more particular example, the application can include a selectable user input element that, upon selection, causes content associated with the application to be presented by a public display device. In another more particular example, the user device can receive an audio signal indicating that content associated with an application that is currently being executed is to be presented by a public display device. Such an audio signal can be processed by the application and/or by another application executed by the user device. In yet another more particular example, the application can be associated with a rule specifying conditions in which content associated with the application is to be presented on one or more public display devices. Such a rule can be, for example, that certain content associated with the application is to be presented on public display devices when user device 102 is within a particular area. Such an area can be defined positively (e.g., within a particular city) or negatively (e.g., more than a threshold distance from work, school and/or home). As still another more particular example, the application can receive a signal transmitted to user device 102 from a server that indicates that content is to be presented by a public display device.

As another example, an operating system installed on, and being executed by, user device 102 can receive an indication that content associated with user device 102 (e.g., content associated with the operating system and/or with one or more applications installed on user device 102) is to be presented by a public display device. Such an indication can be received in response to any suitable input received by the user device and/or according to any suitable rule associated with the operating system. In a more particular example, the operating system can include a selectable user input element that, upon selection, causes content associated with one or more applications to be presented by a public display device. In another more particular example, the user device can receive an audio signal indicating that content associated with one or more applications is to be presented by a public display device. In yet another more particular example, the operating system can be associated with one or more rules specifying conditions in which content associated with one or more applications is to be presented by a public display device. As still another more particular example, the operating system can receive a signal transmitted to user device 102 from a server that indicates that content associated with one or more applications is to be presented by a public display device.

In some implementations, the initiation of presentation of content by a public display device can be performed by a device other than user device 102. For example, a server (such as server 220 and/or any other suitable server) can initiate presentation of content associated with user device 102. Any suitable server (or other suitable computing device) can use any suitable technique or combination of techniques to initiate presentation of content associated with user device 102. In such implementations, 502 can be omitted and/or can be performed by another device other than user device 102.

At 504, server 220 can receive a request to present content by a public display device. Such a request can be received using any suitable technique or combination of techniques and can be received from any suitable source. For example, the request received at 504 can be received from user device 102, from another server that initiated presentation of content by a public display device, and/or from another server that received a request from user device 102 to present content by a public display device.

In some implementations, such a request can include a token and/or other information that is to be used to access content that is to be presented on the public display device. For example, the token and/or other information can be used by server 220 (and/or any other suitable computing device) to access content that may not be otherwise publicly accessible and/or content that is personalized to a particular user. In a more particular example, the token and/or other information can include a username and password, an authorization code, an encryption key, identifying information of content to be accessed, an address associated with content to be accessed, and/or any other suitable information that can be used to access and/or personalize content to be presented. Additionally, in some implementations, such token and/or other information can allow server 220 limited access to content based on control settings associated with a user and/or with user device 102. For example, information included in the token and/or other information can be information that allows access to only certain information that is not personal and/or sensitive information.

At 506, server 220 can request and/or receive location information associated with user device 102. In some implementations, server 220 can request location information from user device 102 based on identifying information and/or address information of user device 102 received at 504. Additionally or alternatively, in some implementations, location information associated with user device 102 can be received without server 220 requesting such information. For example, location information associated with user device 102 can be transmitted with a request to present content that is received by server 220 at 504.

At 508, user device 102 can transmit location information associated with user device 102 to server 220 and/or to any other suitable computing device. In some implementations, user device 102 can transmit the location information in response to a request from server 220 for location information associated with user device 102. Additionally or alternatively, user device 102 can transmit location information (and/or cause such information to be transmitted) with a request that content be presented on a public screen initiated at 502. As described above in connection with 406 of FIG. 4, location information can include any suitable location information.

In some implementations, in response to a request for location information received at 508, user device 102 can prompt a user to consent to such location information being transmitted to server 220 and/or used to determine one or more public screens on which to present content.

In some implementations, location information for user device 102 can be determined by server 220 based on location information associated with user device 102 received from one or more display devices. For example, as described above in connection with 406 of FIG. 4, one or more public display devices 110 can determine location information associated with user device 102 with respect to public display device 110. In such an example, each of these one or more public display devices 110 can transmit such location information associated with user device 102 to server 220, and server 220 can use this information to determine location information associated with user device 102 and/or to select one or more public display devices on which to present content (e.g., as described above in connection with 408).

At 510, server 220 can retrieve and/or receive location information associated with one or more public display devices 110 that are near user device 102. As described above, location information for public display devices 110 can be retrieved from a database of known locations of display devices. Additionally or alternatively, server 220 can transmit a request to public display devices 110 that are known or expected to be near user device 102.

In some implementations, identifying information of public display devices 110 near user device 102 can be transmitted by user device 102. For example, user device 102 can receive signals from one or more public display devices 110 that are near user device 102 and can pass identifying information associated with the signal to server 220.

Additionally, in some implementations, server 220 can request and/or retrieve status information of one or more public display devices 110 near user device 102. Such status information can include any suitable information related to the public display device. For example, such information can include information described above in connection with 410 of FIG. 4.

At 512, public display device 110 can transmit location information associated with display device 110, identifying information of display device 110, and/or status information of display device 110 to server 220 and/or to any other suitable device (e.g., user device 102, a server maintaining a database of such display device information, etc.). As described above, in some implementations, such location information can include any suitable information, can be coordinate based, can include directionality of one or more screens of display device 110, can be relative to other structures and/or devices having a known location, etc. In some implementations, identifying information can include any suitable identifying information to allow server 220 and/or user device 102 to address display device 110 and/or cause content to be presented by a screen of display device 110. In some implementations, status information can include any suitable information such as information related to display device 110 as described above in connection with 410 of FIG. 4.

Information transmitted by display device 110 at 512 can be transmitted in response to a request from server 220 (e.g., as shown in FIG. 5), can be transmitted periodically to server 220 and/or any other suitable computing device, can be transmitted in response to a change in information about display device 110 (e.g., in response to a change in location, a change in availability, a change in terms as to what content can be presented using display device 110, etc.), and/or can be transmitted at any other suitable time or in response to any suitable event.

At 514, server 220 can select one or more display devices based at least in part on location information associated with display device 110, location information associated with user device 102, status information of display device 110, information about one or more other display devices 110, and/or any other suitable information that can be used in selecting a display device. In some implementations, server 220 can select one or more display devices using any suitable technique or combination of techniques, such as techniques described above in connection with 408 of FIG. 4.

At 516, server 220 can cause an avatar associated with a user of user device 102 to be presented on the one or more display devices selected at 514 in association with the content that was requested for presentation at 504. Examples of the presentation of content by one or more display devices 110 are described in more detail below in connection with FIGS. 6A-6C.

FIG. 5B shows a diagram illustrating another example 520 of a data flow that can be used by user device 102, server 220, and/or public display device 110 to discover and/or select one or more display devices on which to present content in accordance with some implementations of the disclosed subject matter.

As shown in FIG. 5B, at 522, user device 102 can initiate the presentation of content by a public display device. Any suitable technique or techniques can be used to initiate presentation of content by a public display device. For example, one or more techniques described above in connection with 502 can be used to initiate presentation of content by a public display device.

At 524, user device 102 can detect the presence of one or more public display devices 110. User device 102 can detect the presence of public display devices 110 using any suitable technique or combination of techniques. For example, user device 102 can use any suitable antenna and/or sensor to detect the presence of one or more public display devices. In a more particular example, user device 102 can detect one or more signals emitted by a public display device. Such signals can include peer-to-peer communication signals such as Bluetooth, RFID signals, optical signals, audio signals, and/or any other suitable signal or signals emitted by a public display device. In some implementations, user device 102 can transmit a request that nearby public display devices make their presence known, and a signal detected at 524 can be a signal emitted in response to such a request, which can be a broadcast signal, a multi-cast signal, a unicast signal, and/or any other suitable signal. Additionally or alternatively, public display device 110 can emit a broadcast signal that is directed at any nearby device. Such a broadcast signal can be emitted on any suitable basis (e.g., periodically) and/or in response to any suitable action.

In some implementations, detection of public display devices at 524 can be omitted. For example, detection of public display devices at 524 can be omitted in cases where user device 102 obtains location information from a server (e.g., server 220) that maintains a database of display device locations as described below in connection with 526 and 528.

At 526, user device 102 can request and/or receive location information associated with one or more of the public display devices whose presence was detected at 524. In some implementations, such location information can be determined based on a signal used to detect the presence of a public display device as described above at 524. For example, a signal emitted by display device 110 can include a signal indicating that display device 110 is present and/or a signal indicating location information associated with display device 110.

In some implementations, user device 102 can request location information for one or more of the display devices detected at 524 by transmitting such a request to server 220 that maintains a database (or other suitable data) of display device location information. For example, as described above in connection with 406 of FIG. 4, user device 102 can transmit location information associated with user device 102 and request location information for nearby public display devices 110 based on the location information associated with user device 102.

In some implementations, user device 102 can request location information from nearby public display devices 110 using any suitable technique or combination of techniques. For example, in some implementations, user device 102 can emit a broadcast signal directed at any and all public display devices that receive the signal, where the broadcast signal can include a request for location information associated with the public display device. As another example, in some implementations, user device 102 can emit a multi-cast signal directed to a group of public display devices (e.g., using address information of the public display devices, using a particular frequency corresponding to those public display devices, using a particular encryption key corresponding to those public display devices, etc.), such as the public display devices whose presence was detected at 524. Such a multi-cast signal can include a request for location information associated with the public display device. As yet another example, in some implementations, user device 102 can emit one or more unicast signals each directed to a particular display device 110 (e.g., using address information of the public display device, using a particular frequency, using a particular encryption key, etc.). Such a unicast signal can include a request for location information associated with a particular display device 110.

In some implementations, user device 102 can also request status information of nearby display devices 110 from server 220 and/or from display devices 110. Such status information can include, for example, information related to the display device as described above in connection with 410 of FIG. 4.

In some implementations, location information associated with detected display devices received at 526 can be stored, such that the information can be utilized when, for example, selecting one or more display devices on which to present content. For example, the location information can be cached in memory 306 of user device 102.

At 528, server 220 can transmit location information associated with one or more display devices near user device 102 in response to a request for location information for nearby display devices received from user device 102. As described above in connection with 406 of FIGS. 4 and 526, location information associated with user device 102 can be used by server 220 to retrieve location information for nearby display devices.

At 530, display device 110 can transmit location information associated with the display device (or multiple display devices) to one or more nearby devices (which can include user device 102 and/or other display devices 110, as well as any other suitable devices). As described above in connection with 524 and 526, display device 110 can transmit such location information as a response to a request from user device 102 and/or in response to any suitable criteria being met, such as passage of a particular period of time since the location information was last transmitted. Such location information can be transmitted as a broadcast signal, a multi-cast signal, a unicast signal and/or any other suitable signal.

In some implementations, display device 110 can include location information for itself and/or location information for other nearby display devices which may or may not be in range of user device 102 with the location information transmitted at 530. For example, display device 110 can transmit its location information to other display devices and vice versa. Display device 110 can cache location information for itself and/or location information received from other display devices. In some implementations, display device 110 can pass the location information for other display devices to user device 102. In such an example, this can allow location information for display devices with which user device 102 cannot directly communicate to be received by user device 102.

In some implementations, in addition to location information, server 220 and/or display device 110 can also transmit identifying information of display device 110, and/or status information of display device 110 to user device 102. As described above, identifying information can include any suitable identifying information to allow user device 102 and/or server 220 to address display device 110 and/or cause content to be presented by display device 110. As described above in connection with 410 of FIG. 4, status information can include any suitable information, such as information related to display device 110.

At 532, user device 102 can retrieve location information associated with user device 102. As described above, this information can be determined based on one or more signals received by user device 102, such as GPS signals, signals transmitted from one or more display devices 110, and/or any other suitable signals for determining the location of user device 102. In some implementations, the location information can be determined at 532 and/or can be retrieved from memory 306 of user device 102 based on a previous determination of the location of user device 102.

At 534, user device 102 can select one or more public display devices (e.g., display device 110 and/or any other suitable public display device) on which to present content based at least in part on the location information associated with the one or more display devices received at 526. For example, user device 102 can select one or more display devices as described above in connection with 408 of FIG. 4.

At 536, user device 102 can cause an avatar associated with a user of user device 102 and/or a user account associated with user device 102 to be presented on the one or more display devices selected at 534 in association with the content that was requested for which presentation was initiated at 522. Examples of presentation of content by one or more display devices 110 are described in more detail below in connection with FIGS. 6A-6C.

FIG. 5C shows a diagram illustrating an example 540 of a data flow that can be used by a first display device 110-1, user device 102 and another display device 110-2 to discover and/or select one or more display devices on which to present content in accordance with some implementations of the disclosed subject matter.

As shown in FIG. 5C, at 542, user device 102 can initiate presentation of content by a public display device. Any suitable technique or techniques can be used to initiate presentation of content by a public display device. For example, one or more techniques described above in connection with 502 can be used to initiate presentation of content on a public screen.

At 544, display device 110-1 can detect the presence of a user device (e.g., user device 102) that has initiated presentation of content by a public display device. Display device 110-1 can use any suitable technique or combination of techniques to detect the presence of user device 102. For example, techniques described above in connection with 524 of FIG. 5B for user device 102 to detect the presence of display device 110 can similarly be used by display device 110-1 to detect the presence of user device 102, with any suitable modifications that may be required.

Additionally, in some implementations, display device 110-1 can detect a location of user device 102, receive location information related to user device 102, and/or request location information for user device 102 at 544 (and/or at any other suitable time). For example, such location information can be determined, received and/or requested as described above in connection with 406 of FIG. 4, and/or using any other suitable technique or combination of techniques.

At 546, one or more other display devices 110-2 can transmit location information associated with display device 110-2, user device 102 (e.g., relative to display device 110-2), and/or any other suitable devices to nearby devices, such as display device 110-1. In some implementations, such information can be transmitted by display device 110-2 in response to a request (e.g., from display device 110-1) and/or can be transmitted on any other basis (e.g., periodically, when a nearby user device initiates presentation of content by a public display device, etc.). In some implementations, display device 110-1 can also transmit location information associated with display device 110-1 and/or user device 102 to nearby devices, such as display device 110-2.

In some implementations, display device 110-2 can also transmit identifying information of display device 110-2, and/or status information of display device 110-2 to display device 110-1. As described above, identifying information can include any suitable identifying information to allow display device 110-1 and/or user device 102 to address display device 110-2 and/or cause content to be presented by a screen of display device 110-2. As described above in connection with 410 of FIG. 4, status information can include any suitable information, such as information related to display device 110-2.

At 548, display device 110-1 can determine a location of user device 102 relative to display device 110-1, display device 110-2 and/or any other nearby public display devices. Note that in some implementations, nearby public display devices can include any public display device located within any suitable distance of display device 110-1. Additionally, in some implementations, nearby display devices can be determined based on one or more factors related to the location information associated with the user device and/or any other properties of the user device. For example, if user device 102 is located within a building, such as a mall, airport, stadium, etc., display devices located outside of the building can be considered to not be nearby. As another example, if user device 102 is moving at a speed that indicates that user 104 is walking, the distance at which a display device is considered to be a nearby display device can be smaller than in cases where user device 102 is moving at a speed that indicates that user 104 is using a vehicle (e.g., a bicycle, a bus, an automobile, etc.). In some implementations, display device 110-1 can communicate with nearby display devices using any suitable technique or combination of techniques, which can include peer-to-peer communication techniques, communication over a communication network such as a local area network, communication over the Internet, and/or using any other suitable communication technique or combination of techniques.

In some implementations, display device 110-1 can determine the location of user device 102, display device 110-1, display device 110-2, and/or any other suitable display devices using any suitable technique or combination of techniques. For example, display device 110-1 can determine the locations based only on proximity (e.g., a distance between user device 102 and display device 110-1), based on proximity and surroundings of display device 110-1 and/or user device 102, and/or based on any other suitable factor or combination of factors considered with proximity of the devices. In a more particular example, display device 110-1 can determine whether user device 102 is within a viewing area of a screen of display device 110-1. In some implementations, display device 110-1 can be programmed with one or more fixed viewing areas corresponding to one or more screens and can compare the location information associated with user device 102 with the viewing area to determine whether there is overlap.

In some implementations, display device 110-1 can determine the location of user device 102 with respect to one or more other nearby display devices, such as display device 110-2. In such implementations, multiple display devices (e.g., display device 110-1 and display device 110-2) can each determine location information for each other nearby display device and can independently determine whether to present the content initiated by user device 102. Additionally or alternatively, multiple display devices (e.g., display device 110-1 and display device 110-2) can coordinate to determine which display device is to present the content initiated by user device 102. In some implementations, multiple display devices (e.g., display device 110-1 and display device 110-2) can coordinate in a master-slave relationship such that, for example, display device 110-1 determines the location of user device 102 in relation to both display device 110-1 and display device 110-2 and determines which display device or devices are to present content. Note that, although example 540 is described in connection with two display devices, any suitable number of public display devices can communicate with display device 110-1 and display device 110-1 (and/or any other suitable display devices) can determine on which display device or devices content initiated for presentation by user device 102 is to be presented.

At 550, display device 110-1 can determine whether content initiated for presentation by user device 102 is to be presented by display device 110-1 and/or whether the content is to be presented by another display device such as display device 110-2. As described above, display device 110-1 can determine whether the content is to be presented by display device 110-1 and/or any other suitable display device based on any suitable criterion or criteria such as the proximity of display device 110-1 and user device 102, whether user device 102 is in a viewing area of display device 110-1, etc.

At 552, display device 110-1 can cause an avatar associated with a user of user device 102 to be presented by display device 110-1 (and/or by another display device, such as display device 110-2) in association with the content for which presentation was initiated at 542. Examples of presentation of content by one or more display devices 110 are described in more detail below in connection with FIGS. 6A-6C.

Figure 6A:
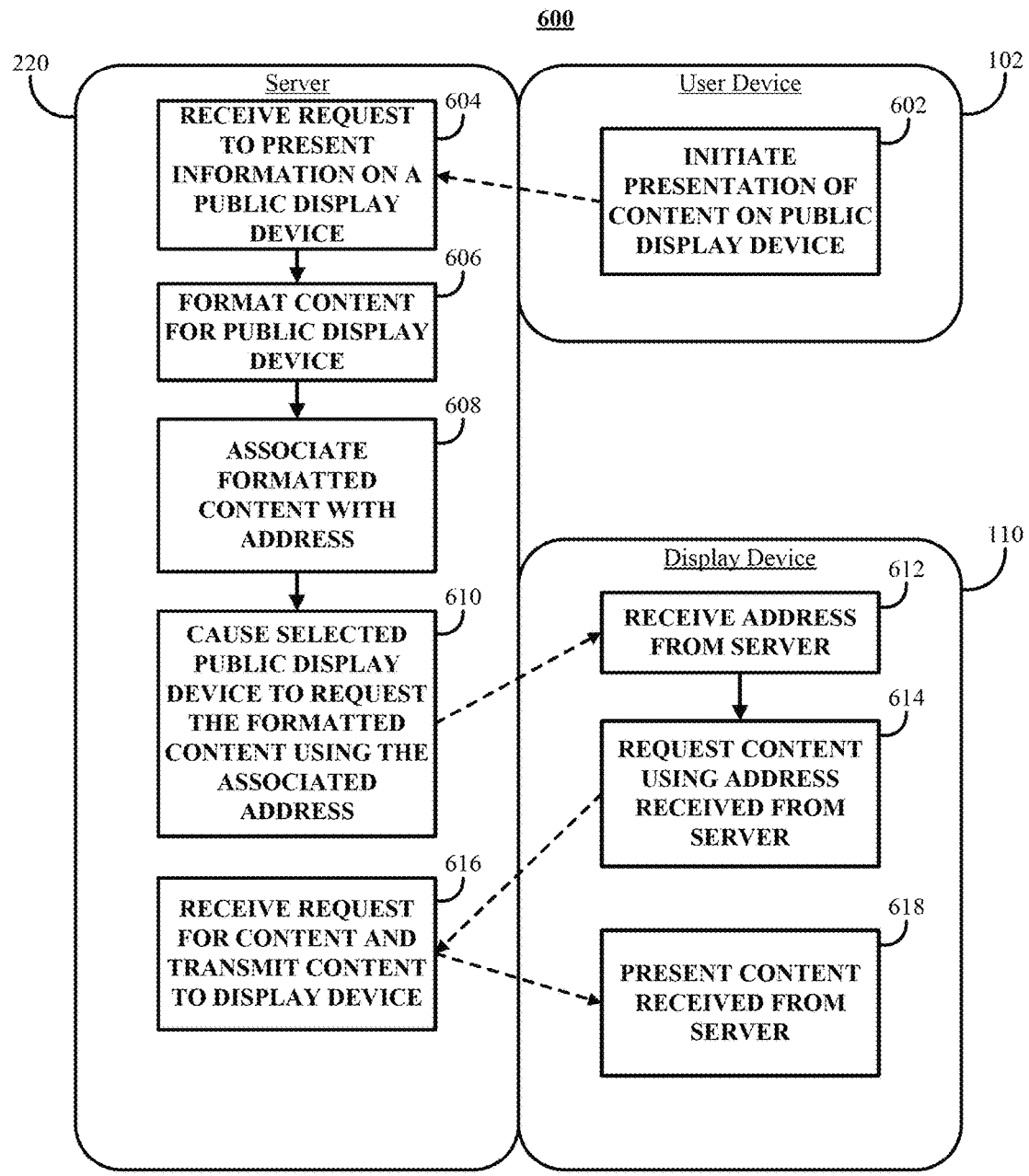
FIGS. 6A-6C show diagrams illustrating examples of data flows that can be used in conjunction with the process of FIG. 4 and data flows of FIGS. 5A-5C to cause content to be presented on a selected public display device in accordance with some implementations of the disclosed subject matter.
Figure 6B:
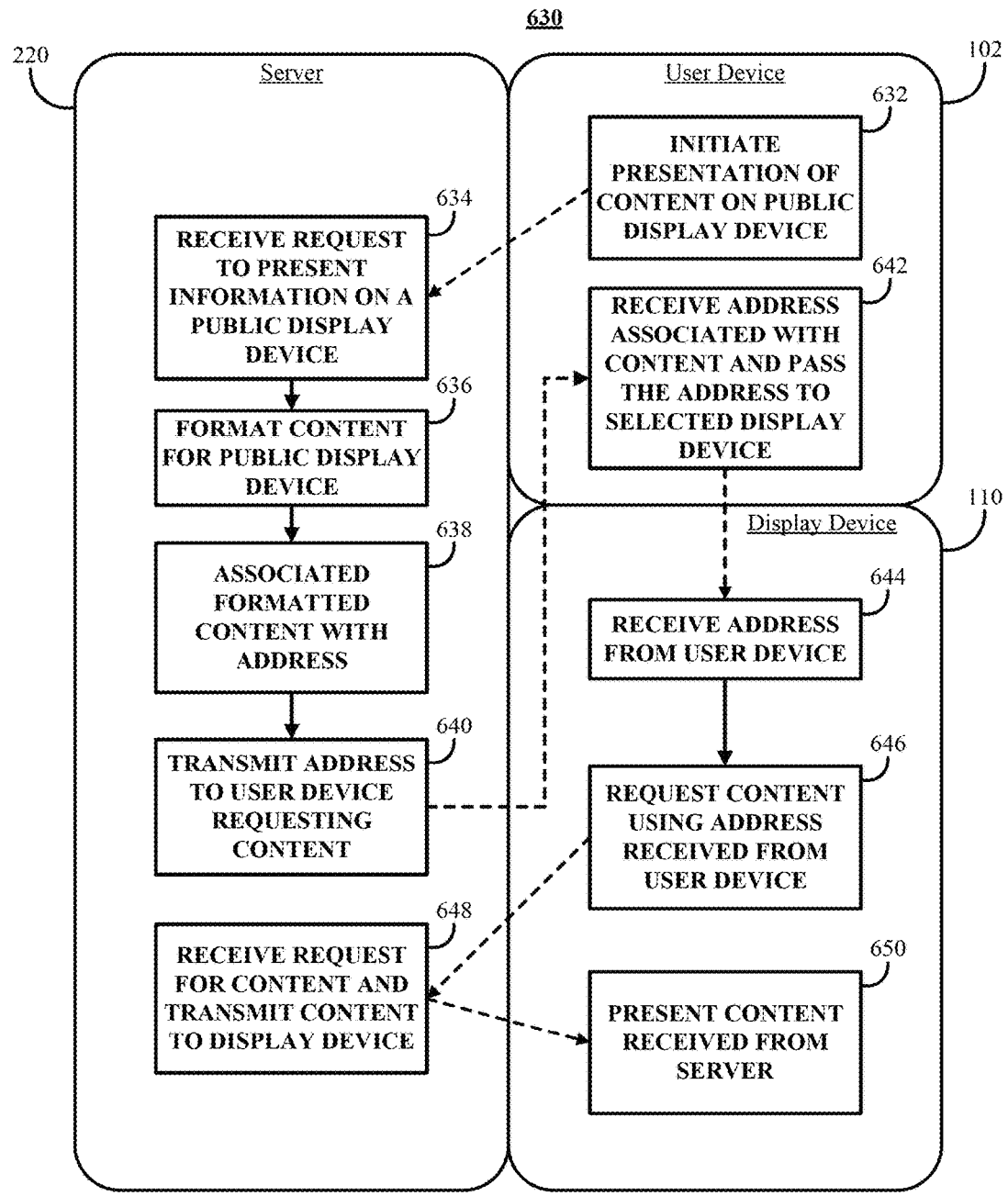
Figure 6C:
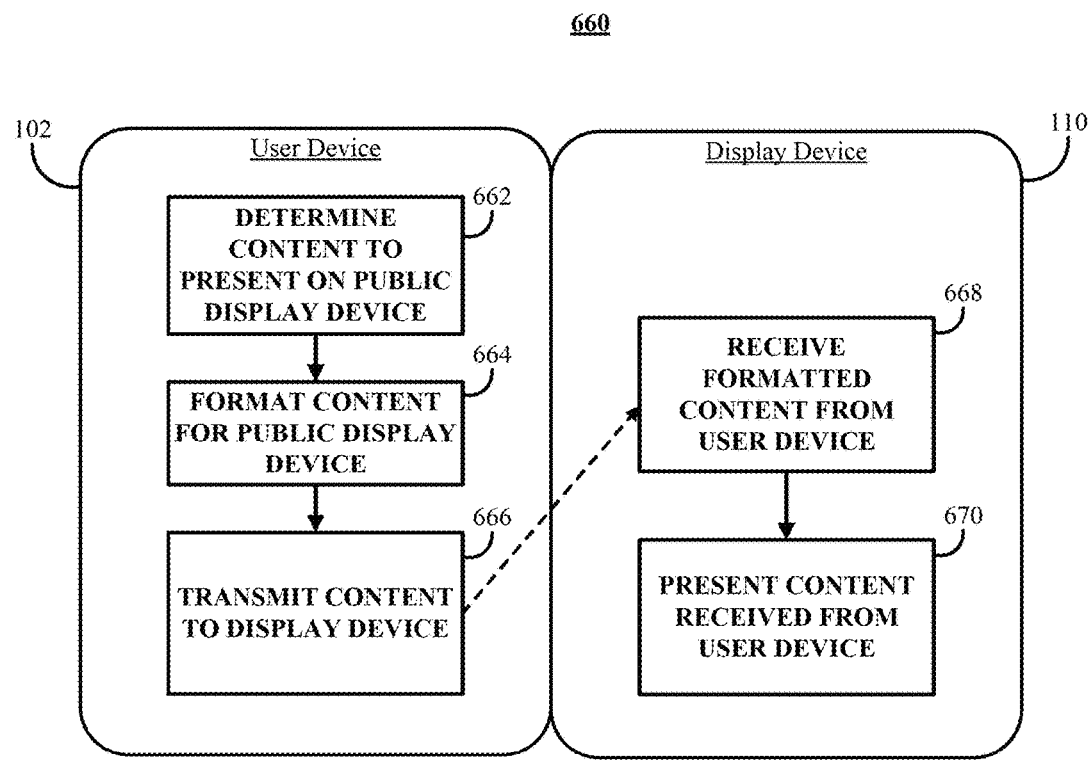

FIGS. 6A-6C show diagrams illustrating examples of data flows that can be used in conjunction with process 400 of FIG. 4 and data flows of FIGS. 5A-5C to cause content to be presented on a selected public display device in accordance with some implementations of the disclosed subject matter.

FIG. 6A shows a diagram illustrating an example 600 of a data flow that can be used by server 220, user device 102, and display device 110 to cause requested content to be presented by one or more display devices in accordance with some implementations of the disclosed subject matter.

At 602, user device 102 can initiate presentation of content by one or more public display devices. User device 102 can use any suitable technique to initiate presentation of content by one or more public display devices and can initiate such presentation in response to any suitable input. For example, user device 102 can use techniques described above in connection with 502 of FIG. 5 to initiate presentation of content by one or more public display devices in response to an input as also described above in connection with 502 of FIG. 5. As described above in connection with 502 of FIG. 5, presentation of content can be initiated by a device other than user device 102, such as by a server or other computing device (e.g., server 220 and/or any other computing device).

At 604, server 220 can receive a request to present content using a public display device. Such a request can be received using any suitable technique or combination of techniques and can be received from any suitable source. For example, such a request can be received as described above in connection with 504 of FIG. 5.

In some implementations, the request can include information that identifies the content that is to be presented. Such identifying information of the content to be presented can include any suitable information that can be used by server 220 to determine which content is to be presented by a public display device. For example, identifying information of the content can include a portion of a uniform resource identifier associated with the content. As another example, identifying information of the content can include any suitable information for identifying the information, such as an identification number associated with a request for the content. In a more particular example, information used to identify the content can include identifying information of user device 102 that requested that the content be presented and/or an application installed on and/or being executed by user device 102, where the application is associated with the content to be presented. This identifying information can be used, for example, to retrieve the content to be presented from a server associated with the content (an address of which can be included in a request for content, can be looked up based on identifying information of the application, and/or can be determined using any other suitable technique or combination of techniques). As described above in connection with 504 of FIG. 5, such identifying information can be included in, for example, a token which includes information that can be used to access the content to be presented.

In some implementations, a request to present content received at 604 can include identifying information of one or more display devices on which the content is to be presented. For example, in some implementations, user device 102, display device 110 and/or server 220 (which may or may not be the same as server 220 shown in FIG. 6A) can request that content be presented and can include identifying information (e.g., address information) of one or more display devices on which the content is to be presented.

In some implementations, any suitable technique or combination of techniques can be used by any suitable device or devices to determine which display device is to be used to present the requested content. For example, in some implementations, a determination of which display device or devices are to be used to present content can be made based on one or more of flows 500, 520, and/or 540 as described above in connection with FIGS. 5A-5C. Such a determination can be made prior to the request being issued, in parallel with a process for requesting the content, after the content is requested for presentation, and/or at any other suitable time or times.

At 606, server 220 can format content (or cause the content to be formatted) for a selected public display device (or devices) on which the content is to be presented. In some implementations, such formatting can be performed based on information about the public display device or devices on which the content is to be presented (e.g., as received at 410) and/or based on any other suitable information (e.g., how far the user is from a display device on which the content is to be presented). Formatting of the content can include any suitable formatting, such as formatting the size of a window in which the content is to be presented, formatting how large the content is to be presented within the window, colors to be used in presenting the content, how closely content is to be spaced during presentation, which content is to be presented (e.g., based on the sensitive and/or personal nature of the content), and/or any other suitable formatting.

In some implementations, server 220 can access the content that is to be presented and format the content at 606. Additionally or alternatively, server 220 can transmit instructions regarding how the content is to be formatted and/or parameters of a display device on which the content is to be presented to a server (and/or other suitable computing device) that is to transmit the content to the public display device for presentation.

At 608, server 220 can associate the content formatted at 606 with an address or location at which the content is to be retrieved. In some implementations, any suitable technique or combination of techniques can be used to associate the content with the address. For example, an association between the address and the content can be stored in memory 326 of server 220. As another example, the address can be associated with information that can be used to retrieve the content (and/or cause the content to be transmitted to a particular destination, such as display device 110).

Additionally, in some implementations, the address can be determined and/or created using any suitable techniques. For example, the address can be an address created in response to receiving the request to present content at 604. As another example, the address can be a pre-existing address associated with the content, which can be received, for example, with the request to present content at 604. In some implementations, server 220 can create the address associated with the formatted content. Additionally or alternatively, an address at which the content is to be accessed can be created by a computing device (such as a server) associated with a provider of the content (which may or may not be a third-party entity that does not own or operate server 220).

Additionally or alternatively, in some implementations, server 220 can cause the content to be stored at a location from which it can be communicated to display 110. For example, server 220 can cause the content to be pushed to one or more selected display devices 110 based on address information of the one or more selected display devices 110.

At 610, server 220 can cause one or more selected public display devices to request the formatted content using the address associated with the formatted content. For example, in some implementations, the address associated with the formatted content can be transmitted to one or more selected display devices (e.g., display device 110) based on address information associated with the selected display devices. In some implementations, information identifying which one or more screens of a particular display device are to be used to present the formatted content can be transmitted to the one or more selected display devices.

Additionally or alternatively, in some implementations, 610 can be omitted for one or more selected display devices, and server 220 can cause the formatted content to be pushed to the display device, as described above.

In some implementations, an address associated with the formatted content can be any suitable address that can be used to request content. For example, the address can include a uniform resource identifier (URI), a uniform resource number (URN), a uniform resource locator (URL), an internet protocol (IP) address, a media access control address, any other suitable address, and/or any suitable combination thereof.

At 612, display device 110 can receive the address from server 220. In some implementations, the address can include any suitable address from which the formatted content can be requested. For example, the address can include any suitable address information as described above in connection with 610.

In some implementations, instructions relating to formatting of the content can also be received at 612 (and/or can be received at any other time, such as at 618 with the formatted content). Such instructions can include a size of a window that is to be used to present the content, a screen and/or a portion of screen of display device 110 that is to be used to present the content, and/or any other suitable formatting information.

At 614, display device 110 can request the content using the address received from server 220. Display device 110 can use any suitable technique or combination of techniques to request the content. For example, display device 110 can execute a web browser (and/or any other suitable application) having a window of a particular size and/or positioned at a particular location, which can be used to request the content from the address or addresses received at 612. As another example, display device 110 can request the content from the address or addresses received at 612 using an operating system in lieu of a particular application (such as a web browser).

At 616, server 220 can receive a request for content and transmit content to display device 110. In some implementations, server 220 that receives the request for content at 616 can be a different server than a server that received the request to present content at 604, a server that formatted the content at 606, a server that associated the formatted content with an address at 608, and/or a server that caused the public display device to request the formatted content at 610.

In some implementations, for example, as described above in connection with 608 and 610, server 220 can push content to one or more selected display devices 110. In such implementations, one or more of 610-616 can be combined and/or omitted.

At 618, display device 110 can cause the content received from server 220 (or any other suitable source) to be presented. In some implementations, the content can be received and presented using any suitable technique or combination of techniques. For example, the content can be formatted as a web page, and presenting the content can include loading the web page and presenting the resultant content. As another example, the content can be formatted as a file including the content formatted as one or more media objects (e.g., image, video, text, etc.), and presenting the content can include downloading the file and presenting the media objects according to instructions included in the file and/or transmitted in association with the file. As yet another example, the content can be formatted as a stream of media content (e.g., a stream of video content), and presenting the content can include streaming the media content and using one or more applications, any other appropriate software (e.g., plug-ins, extensions, add-ons, applets, etc.), and/or any other suitable hardware to cause the content to be presented by display device 110. Any other combination of these and/or any other suitable techniques can be used to present the content.

FIG. 6B shows a diagram illustrating another example 630 of a data flow that can be used by server 220, user device 102, and display device 110 to cause requested content to be presented by one or more display devices in accordance with some implementations of the disclosed subject matter.

At 632, user device 102 can initiate presentation of content by one or more public display devices. Any suitable technique or combination of techniques can be used to initiate presentation of content, which can also be carried out by a device other than user device 102. For example, techniques described above in connection with 602 of FIG. 6A can be used to initiate presentation of content.

At 634, server 220 can receive a request to present content using a public display device. Any suitable technique or combination of techniques can be used to receive the request to present content and/or such a request can be received from any suitable source. For example, the request for content can be received in accordance with the techniques described above in connection with 604 of FIG. 6A.

At 636, server 220 can format the content (and/or can cause the content to be formatted) for a selected public display device (or devices) on which the content is to be presented. Any suitable technique or combination of techniques can be used to format the requested content. For example, the requested content can be formatted in accordance with the techniques described above in connection with 606 of FIG. 6A.

At 638, server 220 can associate the content formatted at 636 with an address or location at which the content is to be retrieved. Any suitable technique or combination of techniques can be used to associate the formatted content with the address. For example, the formatted content can be associated with the address in accordance with the techniques described above in connection with 608 of FIG. 6A. Additionally, as described above in connection with FIG. 6A, associating the formatted content with an address can be omitted in cases where the content is to be pushed to the display device.

At 640, server 220 can transmit the address to user device 102 to be relayed to a display device that is to be used to present the content. In some implementations, server 220 can use any suitable technique or combination of techniques to transmit the address to user device 102. Additionally, in some implementations, the address can be communicated to user device 102 in response to an initiation of the presentation of content on one or more public display devices, and user device 102 can cache or otherwise store the address to be communicated to one or more display devices 110 which are to be used to present the requested content. For example, as user device 102 moves through environment 100 of FIG. 1, user device 102 can communicate the address transmitted at 640 to various display devices 110-1 to 110-6 as needed.

At 642, user device 102 can receive the address associated with the formatted content and pass the address to the selected display device. For example, user device 102 can pass the address to a display device selected in accordance with process 400 and/or one or more data flows described in connection with FIGS. 5A-5C.

In some implementations, formatting information can also be passed to the selected display device at 642. Formatting information can include any suitable information to be used by the selected display device to present the content, such as information described above in connection with 606 of FIG. 6A.

At 644, display device 110 can receive the address or addresses from user device 102. As described above, in some implementations, display device 110 can also receive information related to formatting of the content associated with the address. Any suitable technique or combination of techniques can be used to receive the address from user device 102. For example, the address or addresses can be received in accordance with the techniques described above in connection with 612 of FIG. 6A for receiving such an address from server 220.

At 646, display device 110 can request content from server 220 using the address provided by user device 102. Any suitable technique or combination of techniques can be used to request content from server 220. For example, a request for content can be made to server 220 in accordance with the techniques described above in connection with 614 of FIG. 6A.

At 648, server 220 can receive a request for content and transmit content to display device 110. Any suitable technique or combination of techniques can be used by server 220 to receive the request for content and transmit content to display 110. For example, the request for content can be received by server 220 and server 220 can transmit the content in accordance with the techniques described above in connection with 616 of FIG. 6A.

At 650, display device 110 can cause the content received from server 220 (or any other suitable source) to be presented. Any suitable technique or combination of techniques can be used by display device 110 to present the content. For example, the content can be presented by display device 110 in accordance with the techniques described above in connection with 618 of FIG. 6A.

FIG. 6C shows a diagram illustrating an example 660 of a data flow that can be used by user device 102 and display device 110 to cause requested content to be presented on one or more display devices in accordance with some implementations of the disclosed subject matter.

At 662, user device 102 can determine that content is to be presented by a public display device and can determine which content is to be presented on the public display device. User device 102 can use any suitable technique or combination of techniques to determine that content is to be presented and/or determine which content is to be presented. For example, user device 102 can use techniques described above in connection with 602 of FIG. 6A for initiating presentation of content by one or more public display devices.

In some implementations, a display device on which the content is to be presented can be determined prior to determining which content is to be presented at 662, after determining which content is to be presented, and/or in parallel with determining which content is to be presented. Additionally, in some implementations, any suitable technique or combination of techniques can be used to select one or more display devices to be used to present content in accordance with, for example, process 400 and/or one or more data flows described in connection with FIGS. 5A-5C.

At 664, user device 102 can format content (and/or cause the content to be formatted) for a selected public display device (or devices) on which the content is to be presented. Any suitable technique or combination of techniques can be used to format the requested content. For example, the requested content can be formatted in accordance with the techniques described above in connection with 606 of FIG. 6A.

At 666, user device 102 can transmit the content that is to be presented to display device 110. In some implementations, user device 102 can transmit instructions to display device 110 to cause the content transmitted at 666 to be presented by display device 110. Any suitable technique or combination of techniques can be used to transmit the content and/or instructions to present the content. For example, in some implementations, user device 102 can transmit the content and/or instructions to display device 110 using peer-to-peer communication techniques (which can include intermediate devices, such as in an ad-hoc network). As another example, user device 102 can transmit the content and/or instructions to display device 110 over a network, such as a local area network, to which both user device 102 and display device 110 are connected. As yet another example, user device 102 can transmit the content and/or instructions using optical signals, audio signals, and/or any other suitable signal or signals that can be received by display device 110.

In some implementations, user device 102 can transmit formatting information to display device 110. Formatting information can include any suitable information to be used by the selected display device to present the content, such as information described above in connection with 606 of FIG. 6A.

In some implementations, user device 102 can transmit the content as media content (e.g., images, an avatar, text, etc.) or other discrete elements that can be used by display device 110 to format and present the content. For example, user device 102 can transmit the content as one or more files and/or objects and can transmit code (e.g., HTML, XML, Java, JavaScript, etc.) that is to be used to format and present the content transmitted as files and/or objects.

Additionally or alternatively, user device 102 can transmit the content as data that is to be presented by display device 110. For example, user device 102 can format the content as video data to be streamed and transmit the formatted content to display device 110 as a stream of video data that is to be presented by display device 110. As another example, user device 102 can format the content as image data and transmit the formatted content to display device 110 as an image file that is to be presented by display device 110. In such examples, the content that is to be presented can include text, images, video, an avatar associated with a user of user device 102, etc., and these individual elements can be combined and/or formatted by user device 102 as video data, image data, etc., which can then be transmitted to display device 110 for presentation. Display device 110 can receive the video data, image data, etc., and, using hardware, software and/or firmware associated with display device 110, can cause this data to be presented. Transmitting the content in this way can, for example, make it more difficult for display device 110 to extract text from the content because the text is received within video data and/or image data and not received as text data.

At 668, display device 110 can receive the formatted content from user device 102. Display device 110 can use any suitable technique or combination of techniques to receive the content from user device 102.

At 670, display device 110 can cause the content received from user device 102 (or any other suitable source) to be presented. Any suitable technique or combination of techniques can be used by display device 110 to present the content. For example, the content can be presented by display device 110 in accordance with the techniques described above in connection with 618 of FIG. 6A.

In some implementations, display device 110 can present the content based on formatting information received in connection with the content. For example, display device 110 can receive formatting information from user device 102 as described above in connection with 666. Additionally or alternatively, display device 110 can present the content as video data and/or image data received from user device 102, for example, as described above in connection with 666.

FIGS. 7A-7D show examples of a user interface for causing content to be presented by a public display device and presentation of content by a public display device in accordance with some implementations of the disclosed subject matter.

FIG. 7A shows an example 700 of a user interface 702 for presenting content by a public display device (e.g., display device 110) and content that is being presented on the public display device in accordance with some implementations of the disclosed subject matter.

As shown in FIG. 7A, user device 102 is presenting user interface 702 for providing directions to a restaurant (e.g., using a map application, a web browser application, etc.). In some implementations, user interface 702 can include a user input element 704 which, upon selection, can cause the content (in this case directions) to be presented to the user via one or more public display devices (e.g., using process 400 described above in connection with FIG. 4) and/or locally using user device 102. In some implementations, any suitable technique or combination of techniques can be used to present the directions. For example, the directions can be presented as turn-by-turn directions, a list of one or more actions to take to get to the restaurant from a current location, a map with a highlighted route, and/or using any other suitable technique or combination of techniques for presenting the directions.

In some implementations, prior to content associated with user device 102 being presented by display device 110, display device 110 can present any suitable content. For example, as shown in FIG. 7A, display device 110 is presenting content 706 that is associated with another user device (i.e., a user device other than user device 102). Avatar 708, presented with content 706, can be associated with a user associated with the other user device. Content 706 can include, for example, a notification for a user associated with avatar 708.

As another example, display device 110 can also present other content that may not be associated with a particular user and/or a particular user device. For example, as shown in FIG. 7A, display device 110 can present advertisements 710 and 712.

Additionally or alternatively, in some implementations, one or more portions of a screen of display device 110 that are not being used to present content associated with a particular user and/or a particular user device can be used to present any suitable content or no content at all. For example, a background image can be presented as content 710, the current local weather and/or a forecast of the local weather can be presented as content 712, etc. In some implementations, one or more portions of the screen of display device 110 that are not being used to present content associated with a particular user and/or a particular user device can be used to present content that changes based on any suitable criteria, such as the passage of time, one or more users being detected as being present near the screen of display device 110, etc.

In some implementations, for example, as shown in FIG. 7A, a screen of display device 110 can be partitioned into windows or areas that can each be used to present different content.

FIG. 7B shows an example 720 of user interface 702 including a query to receive user input to determine whether to present the content on a public display device in accordance with some implementations of the disclosed subject matter.

As shown in FIG. 7B, a user interface element 722 can be presented to query a user as to whether the content (e.g., the content which is to be presented in response to selecting "start" in FIG. 7A) is to be presented using one or more public display devices. User interface element 722 can be presented using any suitable technique or combination of techniques. For example, user interface element 722 can be presented as a pop-up window, a drop down list, etc. that can be used to receive input from a user regarding whether to use one or more public display devices to present the content, whether to use a display of user device 102 to present the content (and/or an audio output of user device 102), and/or an output of any other suitable device to present the content.

In some implementations, user interface element 722 can include a "No" user input element 724 and a "Yes" user input element 726. Selection of "Yes" user input 726 can cause the content to be presented by a public display device (selected, for example, using process 400 described above in connection with FIG. 4 and/or one or more flows described above in connection with FIGS. 5A-5C), while selection of "No" user input 724 can cause presentation using public display devices to be inhibited. Note that user interface element 722 is merely shown as an example and any suitable user interface can be used to determine whether to present content on one or more public display devices. Additionally, in some implementations, as described herein, a determination as to whether to present content using one or more public display devices can be made on the basis of settings associated with a user and/or a user device.

FIG. 7C shows an example 730 of display device 110 being used to present content associated with user device 102 in accordance with some implementations of the disclosed subject matter.

As shown in FIG. 7C, user interface 732 can be presented by user device 102. For example, user interface 732 can be presented by an application for presenting content (e.g., a map application in the case of directions), as a notification, and/or using any other suitable technique or combination of techniques. As shown, user interface 732 can include an avatar 734 that is associated with a user of user device 102 and/or is associated with the content presented by user interface 732. As described above, for example, in connection with 412 of FIG. 4, avatar 734 can be selected by a user and/or can be assigned. In some implementations, user interface 732 and/or avatar 734 can be presented by user device 102 for a predetermined period of time after presentation by a public display device is initiated, presented on a lock screen of user device 102 during presentation of the content by a public display device, a persistent notification in a notification manager of an operating system of user device 102, presented using any other technique or combination of techniques, and/or presented in response to any suitable criteria being met. It should be noted that the presentation of user interface 732 and avatar 734 in FIG. 7C is an illustrative example, and that user interface 732 and/or avatar 734 can be presented by user device 102 in any suitable manner. In some implementations, the presentation of user interface 732 and/or avatar 734 by user device 102 can be omitted.

In some implementations, for example as shown in FIG. 7C, display device 110 can present the requested content 736 (e.g., directions) which can correspond to user interface 732 and/or the content presented by user interface 702. Additionally, in some implementations, content 736 can be presented by display device 110 as a result of process 400 described above in connection with FIG. 4, one or more of flows described above in connection with FIGS. 5A-5C, one or more of flows described above in connection with FIGS. 6A-6C, and/or any other suitable process or data flow.

In some implementations, content 736 can be presented in association with avatar 734 which is associated with a user of user device 102, user device 102 and/or content 736 (and/or user interface 732). In some implementations, as described above in connection with 412 of FIG. 4, a size at which avatar 734 is presented (e.g., in relation to content 736, in relation to the window in which content 736 and avatar 734 are presented, etc.) can be based on a distance between display device 110 and user device 102.

FIG. 7D shows another example 740 of display device 110 being used to present content associated with user device 102 in accordance with some implementations of the disclosed subject matter. As shown in FIG. 7D, avatar 734 is presented relatively smaller than avatar 734 in FIG. 7C, which can be responsive to user device 102 moving relatively closer to display device 110. Note that distance between user device 102 and display device 110 is not represented in FIGS. 7A-7D, which show examples of content presented by user device 102 and display device 110. As another example, avatar 734 can be presented at a smaller size in response to a predetermined period of time passing since content 736 was first presented by display device 110 (e.g., after a user has had a chance to locate avatar 734). As yet another example, avatar 734 can be presented at a smaller size in response to a selection in a user interface of user device 102 acknowledging that the user has located avatar 734 as presented by display device 110.

FIG. 8 shows an example 800 of a process for determining which content is to be presented on public display devices based on control settings in accordance with some implementations of the disclosed subject matter.

At 802, process 800 can determine an initial control setting to be used to determine which content is to be presented by a public display device based on settings associated with a user of the user device requesting that the content be presented, settings associated with the user device requesting that the content be presented, and/or information about the public display device on which the content is to be presented.

In some implementations, any suitable settings can be associated with a user and/or a user device (e.g., user device 102). For example, settings can include a default control level at which to present content by a public display device. Such a default control level can include information indicating whether to present personal information and/or sensitive information, such as usernames, email addresses, account numbers, phone numbers, images, and/or any other suitable information of a personal and/or sensitive nature associated with a user and/or any other suitable entity (e.g., a contact, a business associated with the user, etc.). As another example, settings can include settings specific to an application with which the content to be presented is associated. For example, a first application, such as a map application, may not normally reveal much personal information and/or sensitive information when content associated with the application is presented by a public display device. In such an example, settings associated with the first application can permit all content associated with that application to be presented by a public display device. As another example, a second application, such as an email application, may normally reveal more personal information and/or sensitive information of a user associated with the email application and/or information of other users. In such an example, settings associated with the second application can inhibit most content associated with that application from being presented by a public display device. In some implementations, process 800 can receive input indicating what type of information is to be considered personal information. Such an indication can be a positive indication that indicates that a particular type of information is to be considered personal information, or such an indication can be a negative indication that indicates that a particular type of information is no longer to be considered personal information. Such indications of what is to be considered personal information can be pertinent to any suitable subset of applications, operating systems and/or user accounts associated with the user device and/or user. For example, a user can indicate that usernames associated with a particular application, such as a social networking service application, are not personal information. Additionally or alternatively, a user of a particular application or service can indicate an extent to which information and/or content associated with the user is personal information. For example, a user can indicate that all content and information associated with the user's account on a social networking service is to be considered personal information and not presented by a public display device.

In some implementations, process 800 can determine control settings based on information about the public display device on which the content is to be presented. For example, if information related to the public display device (e.g., received at 410 as described above in connection with FIG. 4) indicates that a viewable area of the display device is relatively public, process 800 can determine that the initial control settings are to be more stringent regarding the presentation of personal and/or sensitive information. As another example, if information related to the public display device indicates that a viewable area of the display device is relatively private, process 800 can determine that the initial control settings are to be less stringent regarding the presentation of personal information and/or sensitive information. As yet another example, if information related to the public display device indicates that content associated with one or more other users is being presented by the public display device, process 800 can determine that the initial control settings are to be more stringent regarding the presentation of personal information and/or sensitive information. As still another example, if information related to the public display device indicates that a threshold number of people are detected in proximity to the display device, process 800 can determine that the initial control settings are to be more stringent regarding the presentation of personal and/or sensitive information.

In some implementations, process 800 can determine control settings based on a distance between the user device associated with the content and the public display device being used to present the content. For example, if a user device is relatively distant from the display device, process 800 can determine that control settings are to be more stringent. As another example, if a user device is relatively closer to the display device, process 800 can determine that control settings are to be less stringent. Additionally, in some implementations, process 800 can control settings based on whether a user has brought a user device within a threshold distance of the display device that is being used to present the content, such as bringing an NFC antenna of the user device within an operational distance of an NFC antenna associated with the display device (e.g., as described above in connection with process 400 of FIG. 4). In such implementations, the user can take such an action at any suitable time and/or can be prompted to take such an action in response to a certain condition being met (e.g., if the display device may present personal information).

In some implementations, process 800 can determine control settings based on a size at which the content is to be presented by the public display device being used to present the content. For example, if the content is to be presented at a larger size, process 800 can determine that control settings are to be more stringent as the larger content may be more easily observed by people other than the user associated with the content. As another example, if the content is to be presented at a relatively small size, process 800 can determine that control settings are to be less stringent as the smaller content may be less easily observed by people other than the user associated with the content.

In some implementations, the control settings can be determined based on the settings associated with the user, settings associated with the user device, settings associated with an application with which the content is associated, information about the public display device, information about a size at which the content is to be presented, and/or any other suitable information.

In some implementations, a control level associated with the user, the user device and/or the application with which the content is associated can act as a floor such that process 800 cannot determine an initial control setting below the floor. For example, if user settings indicate that a most stringent control setting is to be used when presenting content using a public display device, process 800 can determine that the initial control setting is to be the most stringent control setting regardless of other information, such as privacy of the viewing area of the public display device.

At 804, process 800 can cause content to be presented based on the control setting determined at 802. For example, if process 800 determines that a relatively stringent control setting is to be used in presenting the content, process 800 can cause personal information and/or sensitive information to be omitted from presentation. As another example, if process 800 determines that a relatively stringent control setting is to be used in presenting the content, process 800 can cause personal information and/or sensitive information to be wholly or partially obscured or altered prior to presentation of the content. Process 800 can use any other suitable technique or combination of techniques to inhibit personal information and/or sensitive information from being presented.

In some implementations, a public display device (e.g., display device 110) and/or one or more applications executed by the public display device can be inhibited from storing certain user information that is used to request and/or receive content to be presented by the display device. For example, the public display device can be inhibited from storing a cookie or other information generated and/or received during a session in which content associated with a particular user device is presented. As another example, personal information associated with a user can be deleted after the personal information is used for a particular purpose, such as to access the content to be presented. In some implementations, other information can be retained, such as an indication that a particular user used the display device to present content related to a particular subject, a particular product, and/or any other suitable information. In such implementations, information identifying the user can be treated in one or more ways before it is stored or used, so that personal information is removed. For example, server 220 (and/or any other suitable computing device) can associate the user with identifying information that does not include personal information of the user (e.g., that does not include an email address, a username, etc.). In a more particular example, a unique random string of characters of a particular length can be associated with the user, and display device 110 can retain this number, which can later be used to determine whether the same user is interested in a certain topic based on the content that the user previously requested.

In some implementations, process 800 can cause any personal information and/or sensitive information stored by one or more computing devices involved in presenting content on a public screen to be erased from memory of the computing device (or otherwise disposed of) after a predetermined period of time has elapsed. For example, a public display device that presents the content (e.g., display device 110), a server that causes the content to be presented (e.g., server 220), and/or a user device associated with the content (e.g., user device 102) used in the process of causing content to be presented by the public display device and/or presenting the content by the public display device can store personal information during use in retrieving and/or presenting the content, and can cause that personal information to be erased (or otherwise disposed of) after the predetermined period of time has elapsed.

At 806, process 800 can determine whether user input has been received to update a user control setting. Such user input can be received using any suitable technique or combination of techniques, such as through a user interface described below in connection with FIGS. 9A-9F. If process 800 determines that user input to update user control settings has not been received ("NO" at 806), process 800 can proceed to 808.

At 808, process 800 can determine whether there has been a change in circumstances indicating that control settings are to be updated. In some implementations, any suitable change in circumstances can indicate that control settings are to be updated. For example, as described above in connection with 802, when a user device is relatively distant from a display device on which content is being presented the control setting can be set to be relatively stringent. As the user device moves closer to the display device, process 800 can determine that circumstances have changed and control settings are to be updated. As another example, as described above in connection with 802, when content associated with another user is being presented by the display device on which content is being presented, the control settings can be set to be relatively stringent. If the content associated with the other user is no longer being presented, process 800 can determine that circumstances have changed and that control settings are to be updated. Conversely, if content associated with yet another user begins to be presented by the display device, process 800 can also determine that circumstances have changed and that control settings are to be updated.

If process 800 determines that there has not been a change in circumstances to cause control settings to be updated ("NO" at 808), process 800 can return to 804 and continue to present content based on the previously determined control settings. Otherwise, if process 800 determines that user input to update control settings has been received ("YES" at 806) and/or that there has been a change circumstances to change control settings ("YES" at 808), process 800 can proceed to 810.

At 810, process 800 can determine updated control settings based on the user input (e.g., user input changing the control settings was received at 806) and/or the changed circumstances (e.g., changed circumstances that caused the control settings to be updated).

In some implementations, upon updating the control settings at 810, process 800 can return to 804 and cause content to be presented based on the updated control settings. For example, in response to the control settings being updated at 810, process 800 can cause presentation of personal information to be controlled in accordance with the updated settings. For example, if the control settings become less stringent, process 800 can cause more personal information to be presented, such as identifying information of a user from whom a message being presented by the public display device has been received. As another example, if the control settings become more stringent, personal information that was being presented can be inhibited from presentation. In a more particular example, in response to the control settings becoming more stringent, if a public display device was being used to present a feed associated with a user's social network account, images in the feed that are not publicly available (e.g., images that are not shared publicly by a user that posted the image) can be inhibited from presentation on the public screen.

FIGS. 9A-9F show examples of a user interface for setting control settings and content being presented on a public screen in accordance with the control settings in accordance with some implementations of the disclosed subject matter.

FIG. 9A shows an example 900 of a user interface 902 that includes content that can be presented using one or more public display devices. In some implementations, user interface 902 can include a user input element 904 that, when selected, can cause at least a portion of the content presented by user interface 902 to be presented by one or more public display devices. For example, selection of user input 904 can initiate presentation of at least a portion of the content presented by user interface 902 as described above in connection with 402.

Additionally or alternatively, selection of user input 904 can cause any other suitable content to be presented. For example, selection of user input 904 can cause content to be presented that is not currently presented by user interface 902 but that is associated with an application that caused user interface 902 to be presented.

As shown in FIG. 9A, display device 110 of example 900 is presenting content 706 which, as described above in connection with FIG. 7A, can include one or more notifications for a user associated with avatar 708. Additionally, display device 110 is presenting a public service announcement 906 which can include any suitable content, and directions 908 for a user associated with an avatar 910.

FIG. 9B shows an example 920 of user interface 922 that identifies content that is being presented by a public display device (e.g., as described above in connection with user interface 732 of FIG. 7C) and presents avatar 734 associated with a user of user device 102 in accordance with some implementations of the disclosed subject matter. In some implementations, example 920 shows user device 102 and display device 110 at a time after presentation of content is requested based on selection of user input 904.

In some implementations, user interface 922 can include a user input element 924 that can cause a user interface for changing control settings to be presented. As described above in connection with FIG. 8, a user selection to change the control settings can cause the content that is being presented to be changed.

As shown in FIG. 9B, display device 110 can present notification 706 and directions 908 that were being presented by display device 110 as shown in example 900 of FIG. 9A. In some implementations, display device 110 can also present content 926 and include avatar 734, in response to selection of user input element 904. As described above in connection with FIG. 8, in some implementations, the content that is presented can be limited based on control settings associated with a user of user device 102 (e.g., based on user account information of a user account associated with content 926), based on control settings associated with user device 102, based on information related to display device 110 (e.g., how many other users are using the display device to present content, how many people are around, etc.), based on a distance between display device 110 and user device 102, and/or based on any other suitable factor or combination of factors. For example, as shown in FIG. 9B, content 926 can be very limited based on the nature of the content (e.g., email can include a large amount of personal information and/or sensitive information), based on user settings, based on a distance between user device 102 and display device 110, and based on a size at which content 926 is presented. Limiting the content that is presented can, for example, include presenting only an amount of emails that are unread, a portion of the subject of a number of emails (where the number can be selected based on any suitable factor or factors), etc.

FIG. 9C shows an example 930 of user interface 922 presented by user device 102 and display device 110 presenting content associated with user interface 922 in accordance with some implementations of the disclosed subject matter. As shown in FIG. 9C, notification 706 has been replaced by an advertisement 932. Further, avatar 734 is presented at a smaller size relative to a window in which content 926 is presented (and/or relative to a size at which content 926 is presented). In some implementations, avatar 734 can be presented at a smaller size in response to any suitable change in circumstances and/or any other suitable criterion or criteria being met. For example, as described above in connection with FIG. 7D, avatar 734 can be presented at a smaller size in response to user device 102 moving closer to display device 110. As also shown in FIG. 9B, the content included in content 926 can be less limited based on the control settings having changed in response to changed circumstances (e.g., as described above in connection with process 800 of FIG. 8). In particular in FIG. 9C, the control settings may have changed based on user device 102 moving closer to display device 110 and/or based on notification 706 no longer being presented which can indicate, for example, that a user associated with notification 706 is no longer using display device 110. As also shown in FIG. 9C, a user is selecting user input 924 to cause a user interface for altering the control settings to be presented.

FIG. 9D shows an example 940 of user interface 922 including user input elements 942-946 for selection of a control level associated with user device 102 for presenting content in accordance with some implementations of the disclosed subject matter. In some implementations, a control level that is currently selected (if any) can be highlighted or otherwise indicated using any suitable technique or combination of techniques.

Although three control settings are shown in FIG. 9D, any suitable number of control settings can be presented and any suitable technique or combination of techniques can be used to adjust control settings. For example, in some implementations, control settings can be presented as one or more qualitative levels (e.g., high, medium, low), one or more quantitative levels (e.g., a number on a predetermined scale), descriptively (e.g., stating what content will be presented and what content will not be presented for each setting), using any other suitable technique or combination of techniques, or any suitable combination thereof.

In some implementations, a control level can be selected and/or adjusted using any suitable technique or combination of techniques. For example, a control level can be selected based on a selection of a user input corresponding to the control setting (which can be a software button as shown in FIG. 9D, a radio button, a check box, and/or any other suitable input). As another example, a control level can be selected based on a selection of a position of a slider corresponding to various control levels. As yet another example, a control level can be selected using a text input.

Figure 9E:
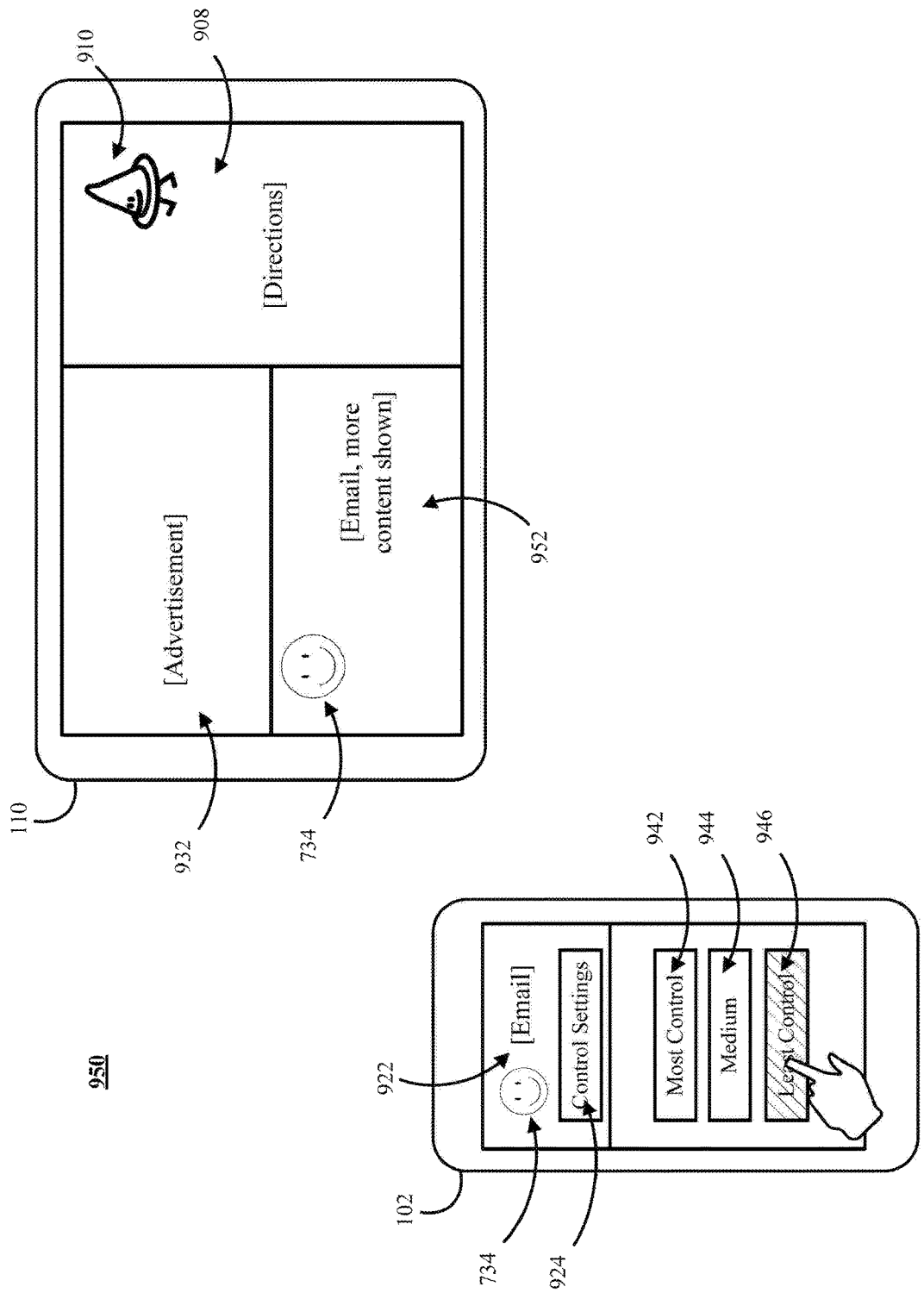

FIG. 9E shows an example 950 of user interface 922 after a particular control setting has been selected based on received input in accordance with some implementations of the disclosed subject matter. As shown in FIG. 9E, user input 946 is highlighted to indicate that it is a currently selected control level (e.g., based on a selection by a user shown in FIG. 9D). In some implementations, such as in accordance with process 800 described above in connection with FIG. 8, content 952 can include more content than is shown in example 940 of FIG. 9D. In some implementations, content 952 can still not include certain personal information and/or sensitive information despite the control level being set to the least restrictive setting by a user. For example, presentation of financial information such as account numbers can be inhibited, but an email address of a sender of an email can be presented where it would not have been presented in example 940.

Figure 9F:
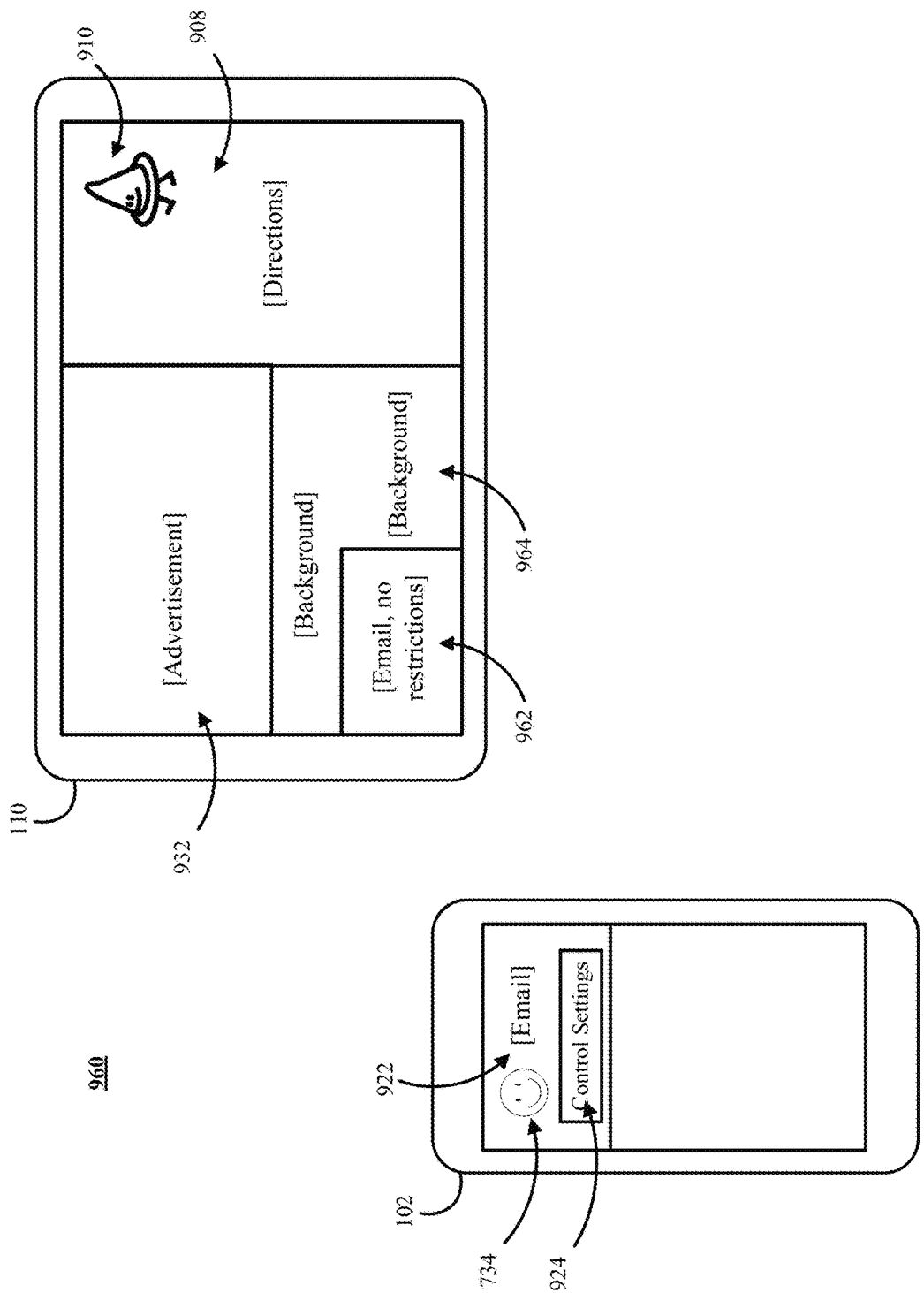

FIG. 9F shows an example 960 where display device 110 presents content associated with user interface 922 without any restrictions in accordance with some implementation of the disclosed subject matter. As shown in FIG. 9F, content 962 can include the content that was requested for presentation with no restrictions. In some implementations, a size of a window in which content 962 is presented can be smaller than a window where content is presented with at least some level of restrictions, which can, for example, make it less likely that another user will be able to perceive information presented in content 962.

In some implementations, content 962 can be presented in response to any suitable change in circumstances and/or user input (e.g., as described above in connection with process 800 of FIG. 8). For example, if a distance between user device 102 and display device 110 is less than or equal to a threshold distance (e.g., two feet, three feet, etc.), content 962 can be presented. As another example, an input can be received by user device 102 indicating that content is to be presented with no restrictions. As yet another example, user device 102 (and/or any other suitable device) can be brought into proximity to a sensor that can verify that a user of user device 102 is requesting that content be presented without restrictions. As yet another example, a touchscreen input of display device 110 can be used to indicate that content is to be presented without restriction (which can require that a user's identity be verified using any suitable technique or combination of techniques such as by using credentials, biometrics, a physical token associated with the user, etc.).

In some implementations, when the window including content 962 decreases in size a space between windows can be used to present any suitable content, such as a background image 964, an advertisement, content associated with another user, any other suitable content, no content (e.g., a blank screen), or any suitable combination thereof.

In accordance with various implementations, mechanisms for launching a mobile application using a public display device are provided. In some implementations, the mechanisms for launching a mobile application using a public display device can determine that a user device has requested that a public display device be used to launch and interact with an application installed on the user device. For example, a user can approach a public display and the user's smartphone can initiate the mechanisms described herein for launching a mobile application using a public display device in response to the user entering a threshold proximity of the public display device, and/or providing a particular input to the smartphone and/or a touchscreen of the public display device.

In some implementations, the mechanisms for launching a mobile application using a public display device can, upon establishing a connection between the user device and the public display device, cause user interface elements (e.g., icons) representing applications installed on the user device to be presented by the public display device. Additionally, in some implementations, the mechanisms can present the icons in an arrangement such that particular applications are presented more prominently. Such applications can include applications that are likely to present content that is more appropriate for presentation on a public display device and/or applications that are more frequently used on the smartphone. For example, upon a connection (e.g., a Bluetooth connection) between the user's smartphone and the public display device being established, the smartphone can cause icons representing a subset of the most frequently used applications to be presented by the public display device. In such an example, the most frequently used applications can be applications that are most frequently used by the user on the smartphone, most frequently used by the user via a public display device, most frequently used by many users (e.g., users similar to the user, a population of all users, etc.) on public display devices, etc. Further, in such an example, icons for applications that are more likely to present content that is more appropriate for presentation using the public display device such as weather applications, navigation applications, web browsing applications, etc., can be presented more prominently by the public display device. Conversely, in such an example, icons for applications that are more likely to present content that is less appropriate for presentation using the public display device such as banking applications, email applications, medical applications, etc., can be presented less prominently or can be inhibited from being presented.

In some implementations, a particular application can be selected using the public display device. This selected application can be executed by the user device, which can cause the application and corresponding application data to be presented using the public display device. For example, user input can be received by a touchscreen of the public display device at a position corresponding to an email application. This user input can be communicated to the smartphone, which can determine that the email application was selected and can launch the email application in response to the selection. The smartphone can then cause the user interface of the email application to be presented by the public display device. In some implementations, a user can interact with an application that is being presented by a public display device by, for example, using a touchscreen of the public display device. In a more particular example, a user can select a particular email to open by touching the touchscreen of the public display device at a position corresponding to that email. This user input can be communicated to the user's smartphone, which can download the email and cause the email to be presented by the public display device.

FIG. 10 shows an example 1000 of a process for launching a mobile application using a public display device in accordance with some implementations of the disclosed subject matter. As shown in FIG. 10, at 1002, process 1000 can group and/or order applications installed on and/or accessed by (e.g., as a web-based and/or otherwise remotely executed application) a user device based on any suitable factor or combination of factors. In some implementations, process 1000 can group and/or order the applications based on how often each application is used by the user device. For example, process 1000 can determine that the application is used by the user device when user input causes the application to be accessed and/or executed by the user device. In a more particular example, fetching new data for an email application in the background may not be considered to be use of the email application by the user device, but causing at least a portion of the content in one or more emails to be presented in response to user input may be considered use by the user device.

In some implementations, process 1000 can group and/or order the applications based on a duration of use of each application using the user device. For example, process 1000 can determine that a first application which is used for a prolonged period of time has a longer duration of use than a second application that is accessed more frequently than the first application, but for a shorter overall duration of time. In a more particular example, an email application that is accessed frequently but for a short period each time can be determined to have a shorter duration of use than a game that is accessed less frequently but for much longer periods of time.

In some implementations, process 1000 can group and/or order the applications based on how often each application associated with the user device is launched and/or accessed using a public display device (e.g., using process 1000).

In some implementations, process 1000 can group and/or order the applications based on a duration of use of each application using a public screen after launching and/or accessing the application using the public screen (e.g., using process 1000).

In some implementations, process 1000 can group and/or order the applications based on a likelihood that the application will present personal information and/or sensitive information. Personal information and/or sensitive information can include any suitable information that a user may prefer not be publicly disclosed, such as information described above in connection with 802 of FIG. 8. In some implementations, the likelihood that a particular application will present personal information and/or sensitive information can be based on a classification of the application. For example, email applications, messaging applications and banking applications can be classified as applications that are likely to present personal information and/or sensitive information. As another example, weather applications, gaming applications, and news applications can be classified as applications that are unlikely to present personal information and/or sensitive information. As yet another example, social networking applications and photo and/or video sharing applications can be classified as applications that are somewhat likely to present personal information and/or sensitive information.

In some implementations, the likelihood that a particular application will present personal information and/or sensitive information can be based on an analysis of the content that has been and/or is to be presented by the application to determine whether the content includes personal information and/or sensitive information. Such an analysis can be performed by any suitable computing device, such as the user device, a server, etc.

In some implementations, the likelihood that a particular application will present personal information and/or sensitive information can be based on user feedback regarding how likely the application is to present personal information and/or sensitive information. Such user feedback can include feedback from a user associated with the user device and/or from one or more users that are not associated with the user device. For example, a user of the user device that is used to access and/or execute the applications can provide feedback regarding which applications are likely to present personal information and/or sensitive information. As another example, feedback from multiple users regarding whether a particular application is likely to present personal information and/or sensitive information can be aggregated and used to determine a likelihood of the application presenting personal information and/or sensitive information.

In some implementations, process 1000 can group and/or order the applications based on received user preferences. For example, during presentation of application icons by a public display device (e.g., as described below in connection with 1006), user input can be received to move, add and/or delete an icon associated with a particular application. Such an action can be considered by process 1000 as an expression of the user's preferences regarding that application. In a more particular example, an email application can be presented in a periphery of a portion of a public display device used to launch and/or present an application (e.g., using process 1000) due to the likelihood of personal information being presented by the email application. In such an example, input can be received to move the icon of the email application to a more central location within the portion of the public display device. Such an action can be used by process 1000 in grouping and/or ordering the applications for subsequent presentation of the icons associated with the applications. Note that, although applications are generally described herein as being represented using icons, any suitable user interface element can represent an application, in some implementations. For example, an application can be represented by a tile, a selectable name, a widget that presents content related to the application, and/or any other suitable user interface element.

In some implementations, process 1000 can group and/or order the applications based on an ordering of the applications on the user device. For example, applications that can be launched from a home screen of a user device can be designated as applications that are considered to be more important than the remaining applications.

In some implementations, process 1000 can group the applications such that the applications that are to be presented most prominently are included in a first group, and such that applications that are to be featured less prominently than applications of the first group are included in a second group. Process 1000 can group the applications into any suitable number of groups, where the number can be based on how many applications and/or groups of applications are to be presented when the icons are presented by an interactive public display device. In some implementations, some applications can be included in a group of applications that are to be inhibited from being presented.

In some implementations, process 1000 can order the applications such that the applications that are to be presented most prominently are placed in the beginning of the order and applications that are to be presented less prominently are placed farther from the beginning of the order.

In some implementations, process 1000 can use a combination of factors to group and/or order the applications. For example, process 1000 can determine a grouping and/or ordering by accounting for multiple factors, such as frequency of use on the user device, frequency of use on interactive public display devices, and the likelihood of presenting personal information and/or sensitive information. Note that this is merely an example and any combination of factors can be considered when grouping and/or ordering applications.

In some implementations, in cases where process 1000 uses multiple factors to determine groups and/or an order for the applications, any suitable technique or combination of techniques can be used to combine the various factors. For example, different factors can be weighted based on how important that factor is when determining groups and/or an order for the applications. In a more particular example, if limiting presentation of personal information and/or sensitive information is considered a more important factor than frequency of use for a user of the user device, the likelihood that an application will present personal information and/or sensitive information can be weighted such that it has more influence on the determination of the groups and/or order than frequency of use. In such an example, the different factors can be weighted and combined. Any suitable technique or combination of techniques can be used to combine the individual factors. For example, in some implementations, the factors can be added and/or subtracted. As another example, the factors can be multiplied, divided, and/or combined using any other mathematical operation. Further, the factors can be normalized before weighting, in some implementations. Additionally, in some implementations, process 1000 can use certain factors as indications that the application should be presented more prominently (e.g., frequency of use), and can use other factors as indications that the application should be presented less prominently (e.g., the likelihood that the application will present personal information and/or sensitive information).

In some implementations, the likelihood that a particular application will present personal information and/or sensitive information can be represented by a personal information score. Such a personal information score can be formatted in any suitable manner. For example, in some implementations, a larger personal information score can indicate a greater likelihood that the application will present personal information. Alternatively, in some implementations, a smaller personal information score can indicate a greater likelihood that the application will present personal information.

Similarly, in some implementations, frequency of use on the user device can be represented by a frequency score, frequency of use on an interactive public display device can be represented by a display device frequency score, the privacy afforded by an environment around an interactive public display device can be represented by an environment score, etc. Any of these scores can be formatted in any suitable manner, which can be based on a technique or combination of techniques that are to be used to combine the various scores to determine the group and/or order into which a particular application is to be placed.

In some implementations, process 1000 can determine different sets of groups and/or different orders for the applications based on different situations. For example, process 1000 can determine first groupings and/or a first ordering to be used in situations where the interactive public display device is in a public space that allows for very little privacy (e.g., a display located in a public corridor of an airport terminal). In such an example, process 1000 can determine second groupings and/or a second ordering to be used in situations where the interactive public display device is in a public space that allows for more privacy (e.g., a display located in a carrel). Further, in such an example, process 1000 can determine third groupings and/or a third ordering to be used in situations where an interactive private display device is to be used. In such an example, process 1000 can determine the first groupings and/or first ordering by placing greater importance on privacy, can determine the second groupings and/or second ordering by placing equal importance on privacy and frequency of use, and can determine the third groupings and/or third ordering by placing a greater importance on frequency of use.

In some implementations, process 1000 can maintain changes to grouping and/or ordering of applications that are made by a user (e.g., as described above in connection with user preferences) regardless of where the application that was moved would otherwise be placed in the groups and/or order.

At 1004, process 1000 can determine whether discovery and/or selection of an interactive public display device for use as a second screen has been carried out. Any suitable technique or combination of techniques can be used to initiate and/or select a public display device to be used as a second screen. For example, techniques described above in connection with 402 and 404 of FIG. 4 can be used to initiate discovery of a public display device. As another example, techniques described above in connection with 408 of FIG. 4 can be used to select a public display device to be used as a second screen for the user device. As yet another example, process 1000 can receive an indication from a device executing process 1000 that an instruction to initiate discovery of an interactive public display device to be used as a second screen device has been received. In a more particular example, techniques described below in connection with 1102 of FIG. 11A can be used to initiate discovery of an interactive public display to be used as a second screen. In some implementations, a public display device that was being used to present content in accordance with the mechanisms described above in connection with FIGS. 1-9F can be selected as an interactive display to be used as a second screen device in response to a determination that one or more criteria have been met. For example, if a public display device 110 that is interactive (e.g., has an interface such as a touchscreen for receiving user input) was being used to present notifications and a user device associated with the notifications comes within a threshold proximity of public display device 110, process 1000 can determine that public display device 110 has been selected as an interactive public display device to be used as a second screen for the user device.

If process 1000 determines that discovery and/or selection of an interactive public display device has not been carried out ("NO" at 1004), process 1000 can return to 1004 and continue to determine whether discovery and/or selection of an interactive public display device has been carried out.

Otherwise, if process 1000 determines that discovery and/or selection of an interactive public display device has been carried out ("YES" at 1004), process 1000 can move to 1006.

At 1006, process 1000 can cause icons that each represent an application installed on a user device to be presented by a selected interactive public display device based on the grouping and/or ordering of the applications (e.g., determined as described above in connection with 1002). In some implementations, prior to presenting icons at 1006, process 1000 can require a user to perform an authentication action to prevent unauthorized access to a user device via an interactive public display device. For example, process 1000 can require that the user enter a password or passcode (e.g., that is associated with the user device and/or a user account), unlock the user device, speak a particular phrase, provide biometric data that can be used to authenticate the user (e.g., a fingerprint), etc.

As described above, in some implementations, process 1000 can cause the icons representing applications to be presented such that applications that are to be presented most prominently are presented at a location where the user is most likely to focus first when approaching and/or using an interactive public display device to launch and/or access applications. For example, in some implementations, process 1000 can cause an application or applications that are to be presented most prominently to be presented near a center of a portion of a screen used to launch and/or access the applications associated with the user device. As another example, process 1000 can cause an application or applications that are to be presented most prominently to be initially presented using a portion of a screen used to launch and/or access the applications associated with the user device, and can cause presentation of an application or applications that are to be presented less prominently to be initially inhibited (e.g., requiring a further action to cause the less prominent application or applications to be presented, such as a touch gesture). As yet another example, process 1000 can cause an application or applications that are to be presented most prominently to be initially presented as icons, and can cause an application or applications that are to be presented less prominently to be initially presented in a nested manner, such as in a folder that includes one or more icons that are to be presented less prominently. As still another example, process 1000 can cause an application or applications that are to be presented most prominently to be presented at an eye level of a user, and can cause an application or applications that are to be presented less prominently to be presented at a level that is above or below an eye level of the user. A more detailed example of presenting icons representing applications based on ordering and/or grouping are described below in connection with FIGS. 12A-12B.

In some implementations, where multiple different groupings and/or different orders have been determined at 1002, process 1000 can cause different options for presenting the applications to be presented to the user for selection. For example, if process 1000 has determined a first set of groups by placing greater importance on the likelihood that the applications will disclose personal information and/or sensitive information, and has determined a second set of groups by placing greater importance on the frequency of use of the applications using the user device, process 1000 can present at least those two options to the user. Such options can be identified using a semantically meaningful label or other identifier, such as "No Personal Information" and "Frequently Used Applications." The display device can receive input (e.g., via a touchscreen) indicating a selection of one of the two sets of groups, and the icons can be presented grouped according to the selected set of groups. Although in the example two groupings are described, any suitable number of groups can be presented for selection by the user.

At 1008, process 1000 can determine that user input was received at the interactive public display device indicating that a particular application icon has been selected. Any suitable technique or combination of techniques can be used to receive user input. For example, a touchscreen of the interactive public display device can receive input indicating that a particular icon has been selected. As another example, inputs to a pointing device of the interactive public display (e.g., a mouse, a trackball, a trackpad, etc.) can cause a cursor to move to coordinates associated with an icon, and further input to the pointing device and/or an associated input device (e.g., a button) can indicate that the icon has been selected.

In some implementations, user device 102 (and/or any other suitable device that caused the icons representing the applications to be presented) can receive and/or generate information mapping the icons to areas of the interactive display device that are being used to present the icons. In such implementations, when user input (e.g., a touch, a click, etc.) is received by the interactive display device, such input can be relayed to user device 102. Upon receiving such input, user device 102 can determine whether an application was selected based on a location of the input and the mapping.

At 1010, process 1000 can cause the application corresponding to the selected application icon to be presented using the interactive display device. Process 1000 can use any suitable technique or combination of techniques to cause the application to be presented, and the application can be launched and/or executed by any suitable device. For example, as described below in connection with FIG. 11A, user device 102 can launch the application and cause the content presented by the application to be presented by an interactive display device. As another example, as described below in connection with FIG. 11B, server 220 can launch the application and cause the content presented by the application to be presented by an interactive display device. As yet another example, display device 110 can launch the application and present the application's content.

In some implementations, user device 102 (and/or any other suitable device that caused the icons representing the applications to be presented) can receive and/or generate information mapping the application content to the interactive display device that is being used to present the application content. In such implementations, when user input (e.g., a touch, a click, etc.) is received by the interactive display device, such input can be relayed to user device 102. Upon receiving such input, user device 102 can use the relayed input and the mapping to cause any suitable change in the content presented by the application. For example, user device 102 can determine that a particular selectable user input element presented in the application content was selected based on input to a touchscreen at a particular location that maps to the selectable user input element. In such an example, user device 102 can take any suitable action based on the received input, and can cause updated content presented by the application in response to the action to be presented by the interactive display device.

At 1012, process 1000 can generate feedback to be used in grouping and/or ordering of the applications (e.g., as described above in connection with 1002). Such feedback can include any suitable information that can be used in determining groups and/or an order for the applications. For example, the feedback can include an amount of time that a particular application has been used on an interactive display device during a particular session. As another example, the feedback can include an indication that a particular application (e.g., the application selected at 1008) was launched using the interactive display device. As yet another example, the feedback can include an indication that an icon corresponding to a particular application has been moved using the interactive display device.

At 1014, process 1000 can determine whether an application that was being presented has been minimized or closed using any suitable technique or combination of techniques. For example, a user interface presented by the interactive display device can include a user input element that, when selected, causes a currently presented application to be closed and/or minimized (e.g., to run in a background mode). If a currently presented application has not been minimized or closed ("NO" at 1014), process 1000 can return to 1010 and continue to present one or more applications that were being presented.

Otherwise, if process 1000 determines that a currently presented application has been minimized or closed ("YES" at 1014) process 1000 can return to 1006, where process 1000 can cause the icons representing the applications to be presented using the interactive public display. Additionally or alternatively, process 1000 can return to 1002 to group and/or order the applications based on feedback generated at 1012.

Figure 11A:
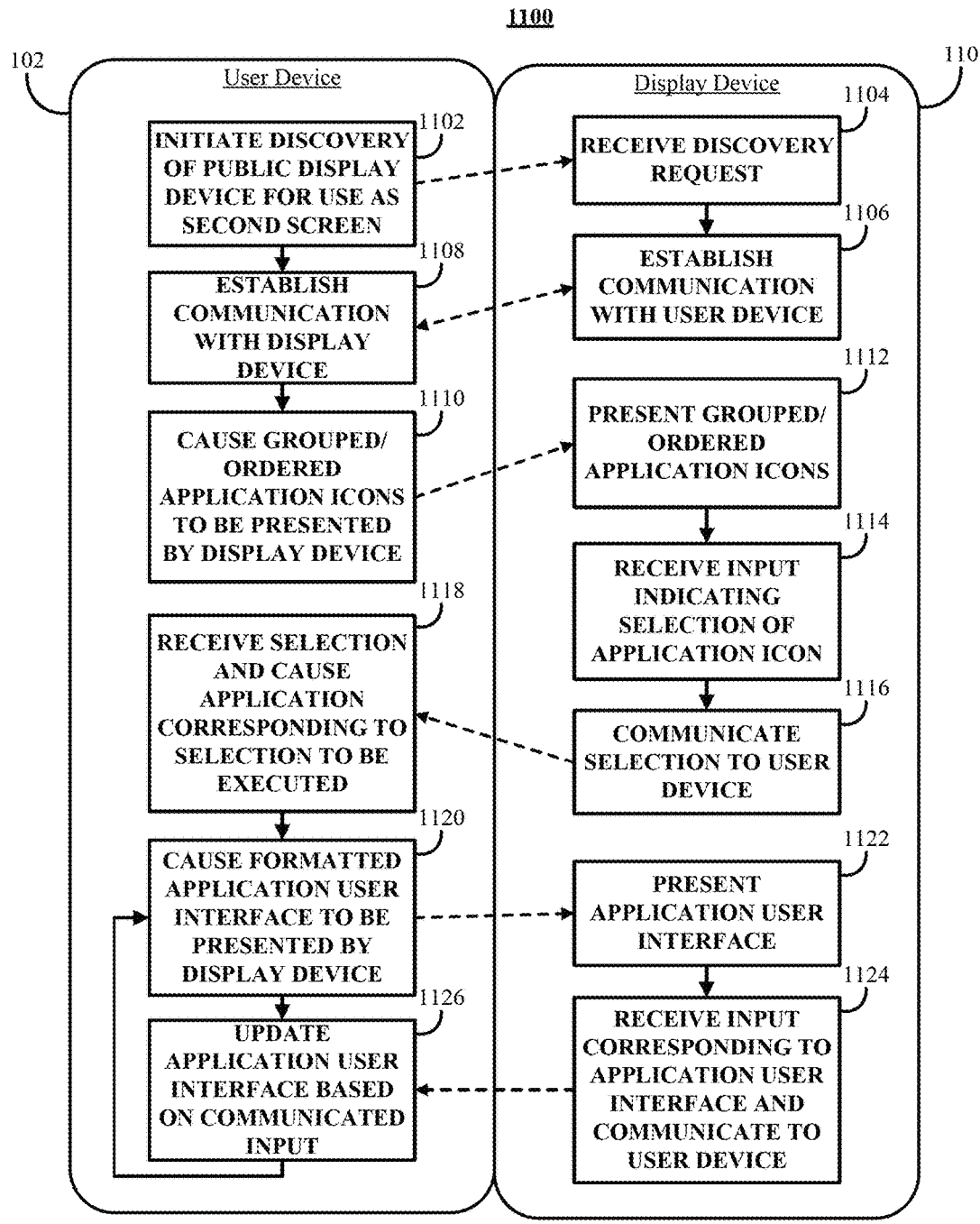
FIGS. 11A-11B show diagrams illustrating examples of data flows that can be used in conjunction with the process of FIG. 10 to launch a mobile application using a public display device in accordance with some implementations of the disclosed subject matter.
Figure 11B:
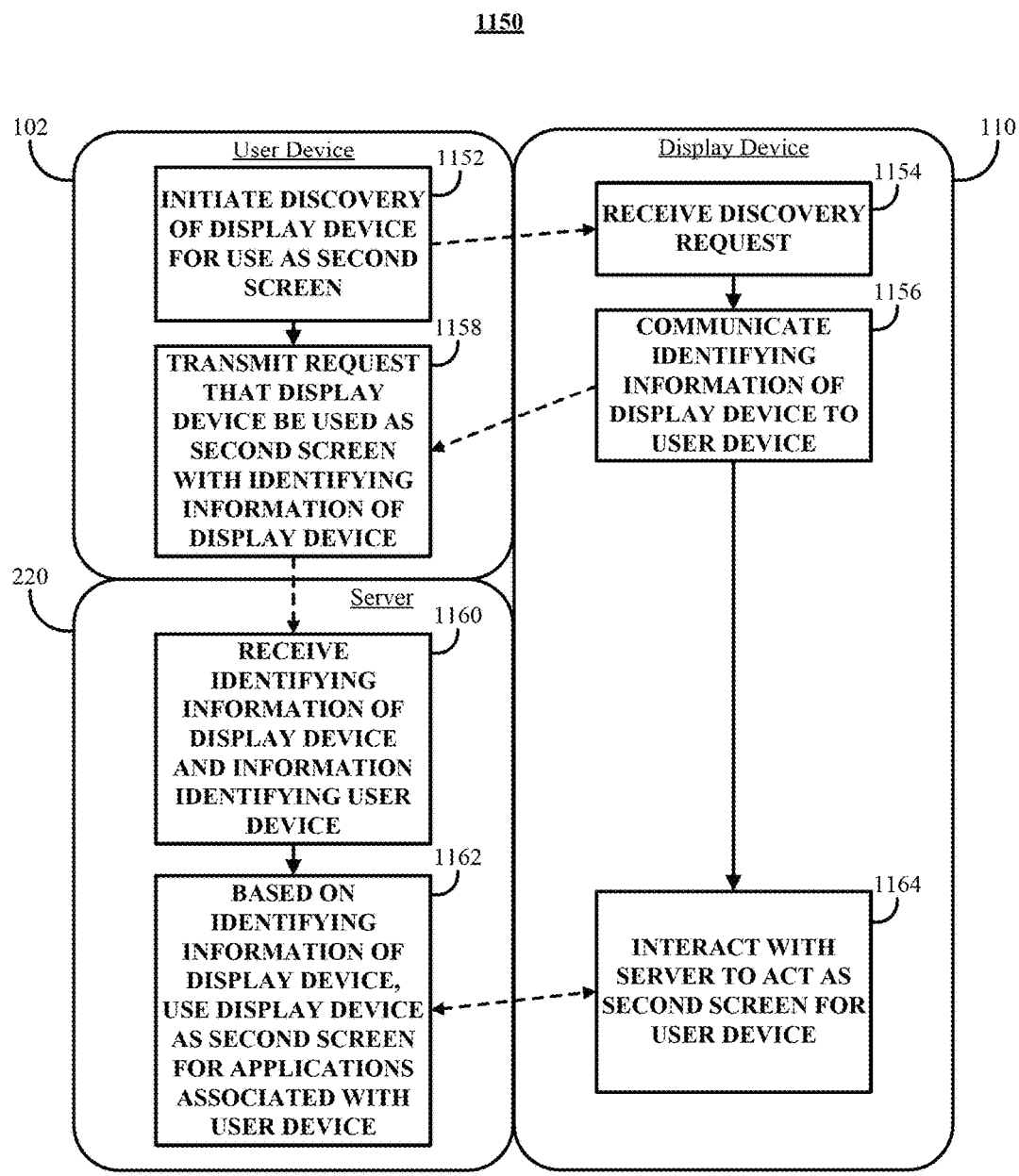

FIGS. 11A-11B show diagrams illustrating examples of data flows that can be used in conjunction with process 1000 of FIG. 10 to launch a mobile application using a public display device in accordance with some implementations of the disclosed subject matter.

FIG. 11A shows a diagram illustrating an example 1100 of a data flow that can be used by user device 102 and display device 110 to launch a mobile application using display device 110 in accordance with some implementations of the disclosed subject matter.

At 1102, user device 102 can initiate discovery of a public display device for use as a second screen. In some implementations, user device 102 can initiate discovery in response to any suitable criteria or criterion being met. For example, user device 102 can receive input indicating that such discovery is to be initiated. As another example, user device 102 can initiate discovery in response to being within a threshold proximity of an interactive public display device (e.g., based on one or more signals emitted by the display device). In some implementations, 1102 can be omitted, such as in cases where use of display device 110 as a second screen is initiated by display device 110 (and/or any other suitable device).

In some implementations, such a discovery request can be formatted and/or transmitted using any suitable technique or combination of techniques. For example, one or more techniques described above in connection with 404 of FIG. 4 can be used to discover any suitable interactive display device nearby.

At 1104, display device 110 can receive the discovery request. In some implementations, such a discovery request can be received in any suitable format and using any suitable technique or combination of techniques. For example, one or more techniques described above in connection with 404 of FIG. 4 can be used by display device 110 to receive the discovery request.

At 1106, display device 110 can establish communication with user device 102 such that user device 102 can present information on at least a portion of a screen of display device 110. In some implementations, in the process of establishing communication (and/or at any other suitable time), display device 110 can determine a portion of a screen of display device 110 that is to be used in association with user device 102. In some implementations, display device 110 can use any suitable technique or combination of techniques to determine a portion of the screen that is to be used in association with user device 102. For example, display device 110 can determine a relative position of user device 102 with respect to the screen and determine the portion of the screen based on the relative position. In a more particular example, display 110 can determine that the portion of the screen to be used to present content is a portion of the screen that is near user device 102 and that is not being used to present content associated with another user device 102. Additionally, in some implementations, display device 110 can communicate to user device 102 information related to a portion of a screen of display device 110 that is to be used in association with user device 102, such as a size of the portion, a resolution of the portion, a location of the portion with respect to a reference location (e.g., ground level), and/or any other suitable information about the portion of the screen.

At 1108, user device 102 can establish a communication channel with display device 110 such that user device 102 can present information on at least a portion of a screen of display device 110. In some implementations, in the process of establishing communication (and/or at any other suitable time), user device 102 can receive information related to a portion of a screen of display device 110 that is to be used in association with user device 102, such as a size of the portion, a resolution of the portion, a location of the portion with respect to a reference location (e.g., ground level), and/or any other suitable information about the portion of the screen.

In some implementations, communication established between user device 102 and display device 110 at 1106 and/or 1108 can be established using any suitable technique or combination of techniques. For example, user device 102 and display device 110 can communicate using peer-to-peer communication techniques (e.g., using a Bluetooth connection, using one or more wireless ad-hoc connections, using one or more NFC connections, and/or using any other suitable technique or combination of techniques). As another example, user device 102 and display device 110 can communicate using an ad-hoc network where one or more intermediate devices (e.g., one or more other displays and/or user devices) form a part of the ad-hoc network between user device 102 and display device 110. As yet another example, user device 102 and display device 110 can be coupled to a local area network over which display 110 and user device 102 can communicate. In some implementations, display 110 can include a wireless access point to which a user device 102 can be coupled for communication with display device 110 and/or for communication over a local network and/or a non-local network (e.g., the Internet) to which display device 110 is connected.

At 1110, user device 102 can cause grouped and/or ordered application icons (e.g., based on a grouping and/or ordering determined as described above in connection with 1002 of FIG. 10) to be presented by the display device. For example, user device 102 can format content, including the icons, as video data and/or image data for presentation on a portion of a screen of display device 110 that is to be used to present the icons and/or application content. Additionally, in some implementations, user device 102 can cause any suitable background content and/or any other suitable content (e.g., the current time, the current weather, a number of notifications associated with each application, etc.) to be presented by display device 110 in association with the icons.

At 1112, display device 110 can receive and present the grouped and/or ordered application icons using the portion of a screen that is designated for user device 102. Any suitable technique or combination of techniques can be used to present such content, in some implementations, such as techniques described above in connection with FIG. 6B.

At 1114, display device 110 can receive input indicating selection of an application icon. As described above in connection with 1008, such input can be received using any suitable technique or combination of techniques.

At 1116, display device 110 can communication information to user device 102 indicating that an application has been selected. As described above in connection with 1008, such information can indicate a position that was selected within the portion of the screen of display device 110 that is being used to present the application, and user device 102 can use a mapping between positions of the icons within that portion of the screen and the position at which the selection occurred to determine that a particular application has been selected.

At 1118, user device 102 can receive information indicating that a particular application icon has been selected and can cause the application represented by that icon to be executed by user device 102. In some implementations, upon execution of the application, user device 102 can present a user interface of the application using a display of user device 102. Alternatively, in some implementations, upon execution of the application in response to selection of the icon using display device 110, user device 102 can inhibit presentation of a user interface of the application using a display of user device 102, and can present any other suitable content or, alternatively, no content (e.g., by inhibiting a display of user device 102 from presenting content).

At 1120, user device 102 can cause a user interface of the application to be presented by display device 110. Such a user interface for display by display device 110 can be formatted for a portion of a screen of display device 110 on which the user interface is to be presented. In some implementations, user device 102 can format the user interface as video data and/or image data for presentation on a portion of a screen of display device 110 that is to be used to present the icons and/or the application user interface. In some implementations, user device 102 can transmit the user interface over a communication link between user device 102 and display device 110 (e.g., established as described above in connection with 1106 and 1108).

At 1122, display device 110 can receive and present the application user interface. Any suitable technique or combination of techniques can be used to present the application user interface. In some implementations, user device 102 can continuously and/or periodically communicate with display device 110 to indicate whether the currently presented content and/or user interface is to be changed, and/or can transmit content that is to be presented.

At 1124, display device 110 can receive input corresponding to the application user interface and communicate the input to user device 102. Such input can be received using any suitable technique or combination of techniques, for example, as described above in connection with 1008 and 1010.

At 1126, user device 102 can receive information indicating that a particular user input was received in relation to the user interface of the application and can cause the application interface to change (or remain unchanged) based on the input. User device 102 can return to 1120, and cause the updated application user interface (or the unchanged application user interface) to be presented. In some implementations, user device 102 can receive user input that can cause the application user interface to be updated at 1126. For example, upon selection of a text input box in the application user interface, user device 102 can present a keyboard that can be used to enter text. As another example, if the application is a game, a touchscreen of user device 102 can be used as an input device (e.g., a gamepad) for the game and can cause corresponding changes to the application user interface to be presented by display device 110 at 1122.

FIG. 11B shows a diagram illustrating an example 1150 of a data flow that can be used by user device 102, display device 110, and server 220 to launch a mobile application using display device 110 in accordance with some implementations of the disclosed subject matter.

At 1152, user device 102 can initiate discovery of an interactive display device to be used as a second screen for user device 102. Any suitable technique or combination of techniques can be used to initiate discovery of an interactive public display (which can also be carried out by a device other than user device 102, such as by display device 110). For example, techniques described above in connection with 1102 of FIG. 11A can be used to initiate discovery of an interactive display.

At 1154, display device 110 can receive the discovery request. In some implementations, such a discovery request can be received in any suitable format and using any suitable technique or combination of techniques. For example, techniques described above in connection with 1104 of FIG. 11A can be used to receive the discovery request.

At 1156, display device 110 can communicate identifying information to user device 102. In some implementations, identifying information can include any suitable identifying information to allow server 220 to address display device 110 and/or cause content to be presented by a screen of display device 110. In some implementations, such identifying information can be communicated using any suitable technique or combination of techniques. For example, techniques described above in connection with 410 of FIG. 4 and/or 512 of FIG. 5A can be used to communicate identifying information.

At 1158, user device 102 can transmit a request to server 220 that display device 110 be used as a second screen for user device 102. In some implementations, user device 102 can also transmit the identifying information which was communicated to user device 102 at 1156. Any suitable technique or combination of techniques can be used to request that display 110 be used as a second screen for user device 102.

At 1160, server 220 can receive the identifying information of display device 110 to be used as a second screen device and the request transmitted by user device 102 at 1158. The request can include information identifying user device 102 as a user device for which display device 110 is to be used as a second screen.

At 1162, server 220 can cause display device 110 to be used as a second screen for an application or applications associated with user device 102 that requested the content. In some implementations, server 220 can cause icons representing the applications associated with user device 102 to be presented by display device 110. For example, server 220 can receive information identifying such applications in association with the request transmitted at 1158 and/or can use information identifying user device 102 to determine applications associated with user device 102 from a database (and/or other suitable information) that indicates which applications are associated with user device 102. In some implementations, server 220 can execute an application that is selected at display device 110 and cause a user interface of that application to be presented by display device 110.

In some implementations, server 220 can perform one or more actions that are performed by user device 102 as described in connection with FIG. 11A in lieu of or in addition to such actions being performed by user device 102.

In some implementations, server 220 can cause the application user interface to be presented using any suitable techniques, such as techniques described above in connection with 412 of FIG. 4, 610 of FIG. 6A, and/or any other suitable techniques.

At 1164, display device 110 can interact with server 220 to act as a second screen for user device 102. For example, display device 110 can receive input and can communicate that input to server 220. Server 220 can use (e.g., at 1162) such input in a similar fashion as such input is described as being used by user device 102 in connection with 1118 and 1126 of FIG. 11A.

Figure 12A:
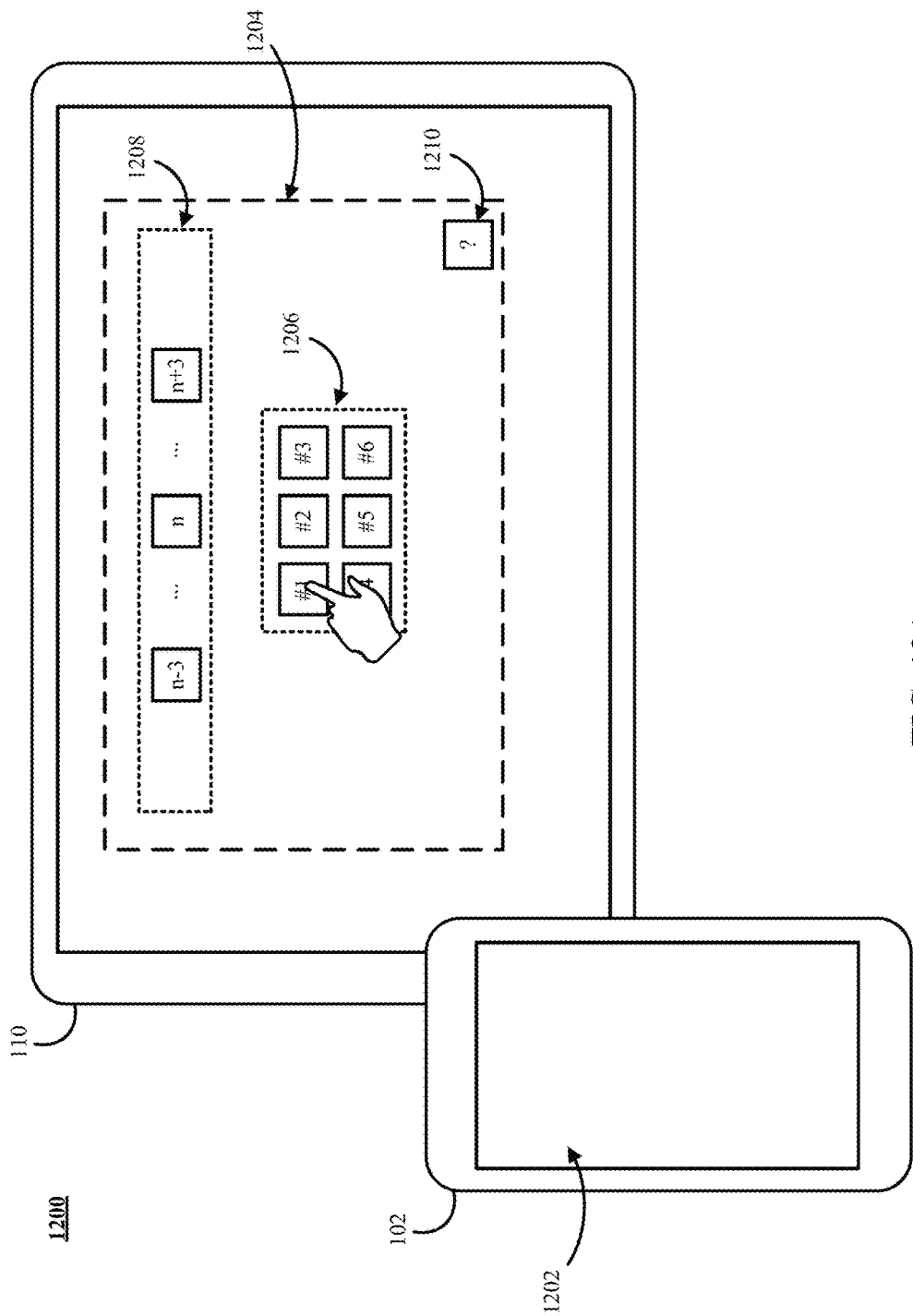
FIGS. 12A-12B show examples of a user interface for launching and interacting with a mobile application using a public display device in accordance with some implementations of the disclosed subject matter.
Figure 12B:
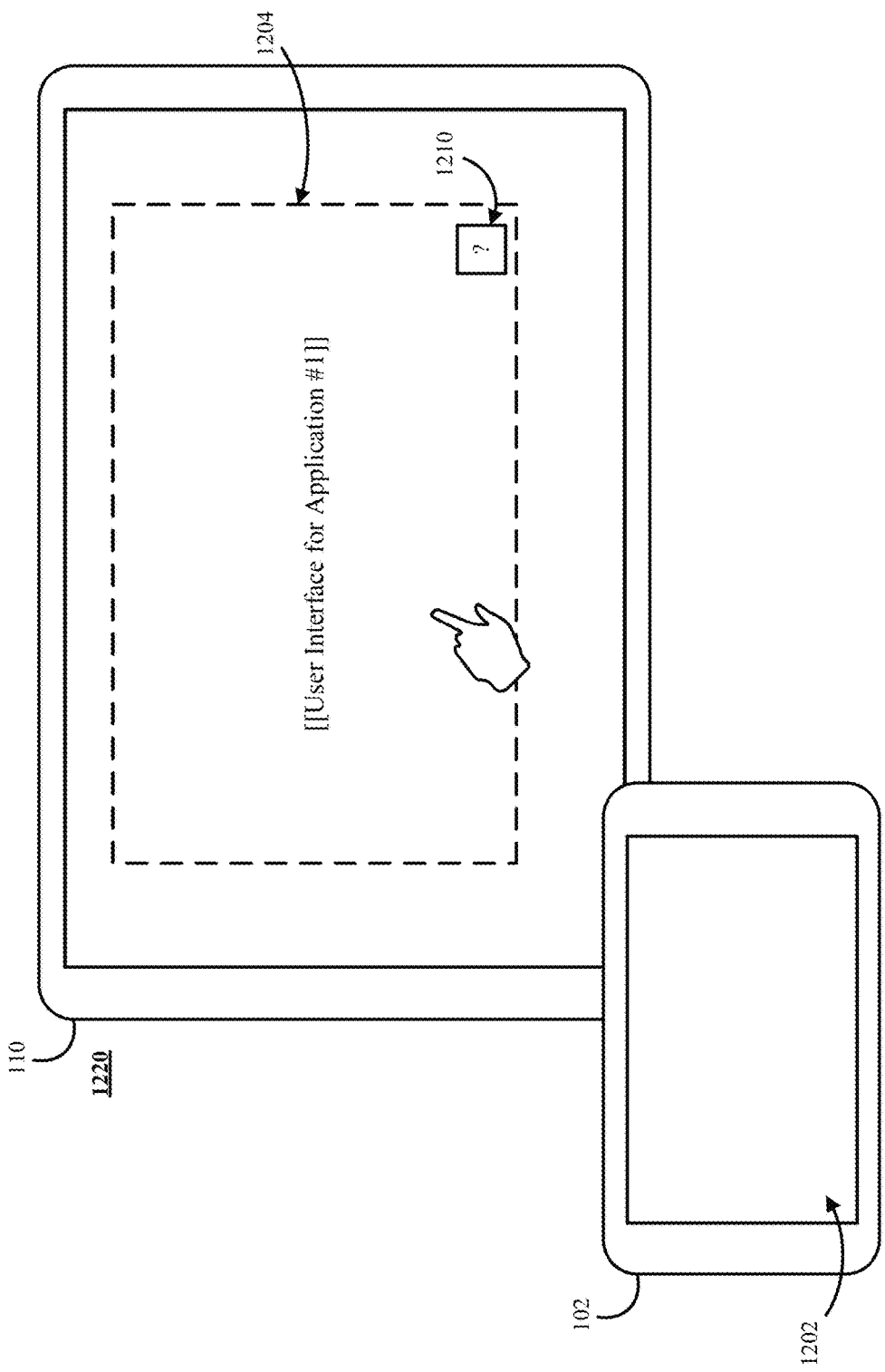

FIGS. 12A-12B show examples of a user interface for launching and interacting with a mobile application using a public display device in accordance with some implementations of the disclosed subject matter.

FIG. 12A shows an example 1200 of a user interface 1202 presented by user device 102 during use of display device 110 as a second screen for user device 102 to present a second user interface 1204. In some implementations, user interface 1202 can be inhibited from presenting any output from user device 102 during at least a portion of time during which display device 110 is being used as a second screen. Additionally or alternatively, user interface 1202 can present any suitable content during at least a portion of time during which display device 110 is being used as a second screen. For example, user interface 1202 can replicate user interface 1204 that is presented by display device 110. As another example, user interface 1202 can include a user interface for receiving input in connection with content that is presented by user interface 1204.

As shown in FIG. 12A, user interface 1204 can present icons that represent applications associated with user device 102. In some implementations, these icons can be presented such that a first group of icons 1206 is presented in a central portion of user interface 1204, and a second group of icons 1208 is presented in a more peripheral portion of user interface 1204. In some implementations, first group of icons 1206 can represent applications that were associated with a group of icons that are to be presented more prominently, for example as described above in connection with 1002 of FIG. 10. Additionally, in some implementations, second group of icons 1208 can represent applications that were associated with a group of icons that are to be presented less prominently. In some implementations, user interface 1204 can include a user interface element 1210 for requesting assistance in navigating user interface 1204. Additionally or alternatively, in some implementations, user interface element 1210, upon selection, can cause a menu of commands to be presented, such as a command to close and/or minimize a current application, a command to discontinue a current session, and/or any other suitable commands. Although user interface 1204 is shown as occupying a large portion of a screen of display device 110, this is an example and user interface 1204 can occupy any suitable portion of a screen of display device 110 and can be presented adjacent to any other suitable content (e.g., content described in connection with FIGS. 1-9F).

As shown in FIG. 12A, a user is touching a touchscreen of display 110 to select the icon in first group of icons 1206 that is labeled "#1." In response, as described above in connection with, for example, 1008 of FIG. 10, user device 102 can execute the application corresponding to the icon "#1," and cause a user interface of the application to be presented in user interface 1204.

FIG. 12B shows an example 1220 of user interface 1204 presenting an application user interface in response to user device 102 receiving an indication that the application was selected for presentation. As shown in FIG. 12B, upon user device 102 executing the application corresponding to the icon labeled as "#1" in FIG. 12A, user device 102 can cause user interface 1204 to present the application user interface for that application. The application user interface can, for example, include content, which can include selectable items and/or non-selectable items, images, video, text, and/or any other suitable content.

Note that although the examples of FIGS. 10-12B are generally described as presenting a user interface for a single application using an interactive display device, any suitable number of applications can be launched and their user interfaces presented by the interactive display device. These multiple application user interfaces can be presented using any suitable technique or combination of techniques, such as by subdividing a portion of the screen of the display device designated to the user device, presenting the different application user interfaces in windows that can placed anywhere in the portion of the application user interface (e.g., by dragging the window), and/or using any other suitable technique or combination of techniques. Note also that although the examples described herein are generally described as receiving a single point of input (e.g., a touch, a selection using a button, etc.), any suitable input can be received, such as through the use of a touchscreen that can sense multiple simultaneous points of contact.

In accordance with various implementations, mechanisms for controlling information used to present content on a public display device are provided. In some implementations, the mechanisms for controlling information used to present content on a public display device can establish a connection between a user device and a public display device that is to be used to present content. For example, a connection can be established to a particular public display device as described above in connection with FIGS. 4, 11A and/or 11B.

In some implementations, the mechanisms for controlling information used to present content on a public display device can receive information related to an area of a screen of the public display device that is to be used to present content received from the user device over the connection that has been established. Additionally, in some implementations, the user device can use the information (e.g., size, resolution, etc.) to format any content that is to be presented. In some implementations, the user device can transmit the formatted content to the display device as image data and/or video data using the established connection. For example, as described above in connection with 666 of FIG. 6, user device 102 can transmit image data and/or video data such that individual parts of the content (e.g., text, images, html code, etc.) are not stored by display device 110 that is to be used to present the content.

In some implementations, the public display device can present the formatted content such that the content is not readily visible in an entire viewing area associated with the public display device (e.g., the content is directed in a particular direction) and/or such that the content is obscured to users without information required to view the information. In such implementations, the display device can communicate information to a computing device (e.g., a user device) that facilitates the user of the computing device viewing the content. For example, the public display device can communicate information on an area for a user to go to view the content is viewable (e.g., based on a viewing angle to the display device) and/or can communicate information that can be used by a wearable device (e.g., active shutter glasses) to allow the user to view otherwise obscured content.

In some implementations, the mechanisms for controlling information used to present content on a public display device can control how long certain types of information are stored by a computing device (e.g., user device 102, display device 110, server 220, etc.) involved in presenting content using a public display device. For example, the mechanisms for controlling information used to present content on a public display device can use one or more periods of time associated with different types of information to determine when to cause information to be erased from computing devices that were associated with presenting content. In a more particular example, the mechanisms for controlling information used to present content on a public display device can cause account information used to access media content (e.g., images, video, etc.) from an account to be erased from a user device, server and/or display device after a first period of time, and can cause the media content to be erased from a user device, server and/or display device after a second period of time.

FIG. 13 shows an example 1300 of a process for controlling storage of information by a system for presenting content using a public display device in accordance with some implementations of the disclosed subject matter. As shown in FIG. 13, at 1302, process 1300 can establish a connection to a public display device that is to be used to present content. Process 1300 can use any suitable technique or combination of techniques to establish a connection with the public display device. For example, process 1300 can use techniques described above in connection with 1108 to establish a connection with the public display device.

At 1304, process 1300 can receive information related to a portion of the display device (up to and including the entire screen area of the display device) that is to be used to present content. In some implementations, the information related to the portion of the display device that is to be used to present the content can include any suitable information. For example, the information can include information related to a size and/or a resolution of the portion of the display device. As another example, the information can include information related to a location of the portion with respect to a reference location (e.g., a center of the display device, a particular corner of the display device, etc.). As yet another example, the information can include information related to surroundings of the display device (e.g., as described above in connection with FIGS. 1 and 410 of FIG. 4) and/or whether a viewable area of the portion of the display device is relatively private or relatively public (e.g., as described above in connection with 802 of FIG. 8). As still another example, the information can include information related to whether the display device is capable of obscuring the content from people other than the user associated with the content that is to be presented.

At 1306, process 1300 can format content for presentation by the display device based on information related to the portion of the display device that is to be used to present the content. In some implementations, the content that is to be formatted and presented can be content that was selected using any suitable technique or combination of techniques. For example, content that is to be presented can be selected as described above in connection with 402 of FIG. 4, 804 of FIG. 8 and/or FIG. 10.

In some implementations, process 1300 can format the content using any suitable technique or combination of techniques. For example, process 1300 can format the content based on the size and/or resolution of the portion of the display device. As another example, process 1300 can format the content based on information related to surroundings of the display device and/or whether a viewable area of the portion of the display device is relatively private or relatively public, such as by inhibiting certain information from being included in the formatted content (e.g., as described above in connection with FIG. 8). As yet another example, process 1300 can format the content based on the information related to whether the display device is capable of obscuring the content from people other than the user associated with the content that is to be presented, such as by including content that may otherwise be inhibited from being included (e.g., as described in connection with FIG. 8).

In some implementations, process 1300 can format the content as image data and/or video data that is to be presented by the display device (e.g., as described above in connection with 666 of FIG. 6C).

At 1308, process 1300 can transmit the formatted content to the display device (e.g., using the connection established at 1302), and cause the display device to present the formatted content. Process 1300 can use any suitable technique or combination of techniques to transmit the content and/or to cause the display device to present the content. For example, process 1300 can use techniques described above in connection with 666 of FIG. 6C to transmit the formatted content.

At 1310, process 1300 can receive information related to presentation of the formatted content by the display device. In some implementations, the information related to presentation of the content by the display device can include any suitable information. For example, the information can include information indicating that the formatted content has been received and/or is being received by the display device. As another example, the information can include information indicating that the formatted content is being presented by the display device. As yet another example, the information can include information indicating where a viewable area for the formatted content is located with respect to the display device. As a more particular example, the display device can indicate that the formatted content is being presented such that the formatted content can be viewed only from a particular angle (e.g., based on light representing the content being directed in a particular direction with respect to the display device). As still another example, the information can include information indicating a frequency and/or polarization with which frames including the formatted content will be presented, and any suitable timing information for synchronizing the frequency with another device. In such an example, the frequency with which frames including the formatted content will be presented can be a set frequency or a frequency that changes among various frequencies according to a pattern. The pattern can be communicated using any suitable technique or combination of techniques, such as through a code, an algorithm, a standard, etc. As a further example, the information can include information indicating any other suitable information that can be used by a computing device executing at least a portion of process 1300 (e.g., user device 102) to allow a user to view the formatted content that would otherwise be obscured. In some implementations, 1310 can be omitted. For example, in cases where the formatted content is presented by the display device without being obscured from other users.

At 1312, process 1300 can cause one or more actions to be performed that are related to presentation of the formatted content. For example, process 1300 can continue to transmit content in response to receiving information indicating that the formatted content has been received and/or is being presented by the display device. As another example, process 1300 can cause information to be presented to the user that instructs the user to move to a certain position in relation to the display device (e.g., to a left side of the display device, to a right side of the display device, to a position that is about two feet left of the center of the display, to a position in front of the display that is highlighted by a particular color of light, etc.) in order to view the formatted content presented by the display device based on the information received at 1310. As yet another example, process 1300 can cause a device associated with the user, such as active shutter glasses, to operate at a particular frequency and/or with particular polarization and/or combinations of polarization based on information received at 1310. As still another example, process 1300 can cause content to be presented using a portion of the screen of the display device that is relatively near to the user (e.g., as described above in connection with 1106 of FIG. 11A). In some implementations, 1312 can be omitted. For example, in cases where no action is required to view the formatted content as it is presented by the display device.

In some implementations, process 1300 can return to 1306 and continue to format content for presentation. Additionally or alternatively, process 1300 can return to 1304 and receive information related to a portion of the display device that is to be used to present the content, such as in cases where the portion may change during presentation of the formatted content. In some implementations, process 1300 can cease presenting content using a public display device when one or more conditions are met. For example, if a user device executing process 1300 becomes disconnected from the public display device that is being used to present the content, process 1300 can stop formatting content for that public display device and/or stop transmitting formatted content to the public display device. As another example, if a different public display device is selected to be used to present content (e.g., as described above in connection with process 400 of FIG. 4), process 1300 can stop formatting content for the public display device and/or stop transmitting formatted content to the public display device and begin formatting and/or transmitting content to the newly selected public display device.

FIG. 14 shows an example 1400 of a process for controlling storage of personal information by a system for presenting content using a public display device in accordance with some implementations of the disclosed subject matter. As shown in FIG. 14, at 1402, process 1400 can receive user input specifying storage policies for one or more types of information that are to be used in connection with presentation of content using a public display device. Process 1400 can receive user input specifying storage policies using any suitable technique or combination of techniques. For example, process 1400 can receive user input via a graphical user interface (e.g., as shown in, and described in connection with, FIG. 15). As another example, process 1400 can receive user input via a voice recognition circuit. Additionally or alternatively, in some implementations, process 1400 can receive information specifying default storage policies for one or more of the types of information.

In some implementations, storage policies can be specified for any suitable type of information that is associated with presenting content using a public display device. For example, a storage policy can be established for account information, such as usernames, passwords, tokens, and/or any other suitable information that is used to access information associated with a user account. As another example, a storage policy can be established for personal content (e.g., as described above in connection with FIG. 8) associated with the user that is using the public display device. As yet another example, a storage policy can be established for an avatar associated with the user (e.g., as described above in connection with FIG. 4). As still another example, a storage policy can be established for content that was downloaded to a computing device as part of a process of using the public display device to present the content that has been downloaded. As a further example, a storage policy can be established for content that was uploaded by a user for presentation using the public display device.

In some implementations, the storage policy for a particular type of information can apply to any suitable computing device involved in using a public display device to present content. For example, a storage policy can apply to the public display device and/or any computing device(s) associated with the public display device. As another example, a storage policy can apply to a server that is involved in retrieving and/or transmitting content that is to be presented using the public display device (e.g., as described above in connection with FIGS. 6A and 6B). As yet another example, a storage policy can apply to a user device that is involved in requesting that content be presented using a public display device and/or retrieving and/or transmitting content that is to be presented using the public display device.

At 1404, process 1400 can receive user input specifying a period of time that is to be associated with one or more of the types of information for which a storage policy is specified. In some implementations, this period of time can indicate how long information is allowed to be stored by a computing device (e.g., a public display device, a server, a user device, etc.) before being erased. Additionally, in some implementations, process 1400 can receive one or more conditions that are to be used to determine when to start the period of time. In some implementations, different types of information can be associated with different periods of time and/or different conditions.

In some implementations, any suitable condition can be used in determining when to start the period of time. For example, the period of time can be started in response to content associated with a user is first presented using a particular public display device. As another example, the period of time can be started in response to a connection between a user device associated with the user and the public display device being disconnected. As yet another example, the period of time can be started in response to determining that the user device associated with the user has moved at least a threshold distance from the public display device (e.g., based on location information received as described above in connection with 406 of FIG. 4). As still another example, the period of time can be started in response to one or more sensors associated with the public display device determining that the user has left a viewable area of the display device. As a further example, the period of time can be started in response to determining (e.g., based on sensor information and/or location information) that a person other than the user associated with the user device has entered a viewable area of the display device. As another further example, the period of time can be started in response to determining that another user is using the public display device to present content.

At 1406, process 1400 can share the storage policies, time periods and/or conditions with one or more computing devices involved in presenting the content using a public display device. For example, process 1400 can cause the storage policies, time periods and/or conditions to be communicated to one or more servers that are involved in presenting content using a public display device. As another example, process 1400 can cause the storage policies, time periods and/or conditions to be communicated to a public display device that is to be used in presenting content. As yet another example, process 1400 can cause the storage policies, time periods and/or conditions to be communicated to one or more user devices associated with the user.

At 1408, process 1400 can determine whether one or more conditions have been met. Process 1400 can use any suitable technique or combination of techniques for determining whether a condition has been met, and process 1400 can evaluate any suitable condition such as conditions described above in connection with 1404.

If no condition associated with the one or more storage policies has not been met ("NO" at 1408), process 1400 can return to 1408 and continue to determine whether a condition has been met. Otherwise, if a condition associated with one or more storage policies has been met ("YES" at 1408), process 1400 can proceed to 1410.

At 1410, process 1400 can start the period(s) of time associated with the condition that has been met. Process 1400 can start measuring the period of time using any suitable technique or combination of techniques, and the period of time can be measured using any suitable computing device (e.g., a user device, a server, the public display device, etc.) which may or may not be a device that caused the period of time to start at 1410.

At 1412, process 1400 can determine whether the period of time associated with the policy for which the condition was met at 1408 has elapsed. Process 1400 can use any suitable technique or combination of techniques to determine whether the period of time has elapsed, and any suitable computing device can determine that the period of time has elapsed. For example, a computing device executing at least a portion of process 1400 can measure the time since the period of time began at 1410, and directly determine based on the measurement that the time period has elapsed. As another example, process 1400 can receive an indication from another device that the period of time has elapsed.

If the period of time has not elapsed ("NO" at 1412), process 1400 can return to 1412 and continue to determine whether the period of time has elapsed. Additionally, in some implementations, process 1400 can return to 1408 to determine whether another condition has been met for the same storage policy and/or whether a condition associated with a different storage policy has been met.

Otherwise, if the period of time has elapsed ("YES" at 1412), process 1400 can proceed to 1414. At 1414, process 1400 can cause the content associated with the period of time to be erased by any suitable device or devices involved in presenting content using the public display device. For example, process 1400 can cause the content associated with the period of time (e.g., account information) to be erased from the computing devices involved with presenting content (e.g., content from the account associated with the account information). In a more particular example, the content that is to be erased can be cleared from a cache of the computing device that was storing it, overwritten, and/or otherwise made unavailable for use by the computing device.

In some implementations, process 1400 can use any suitable technique or combination of techniques to cause the information to be erased. For example, a computing device executing process 1400 can erase any content stored by the computing device in compliance with the storage policy for that information. As another example, a computing device executing process 1400 can transmit instructions to a computing device (e.g., a server, a display device) that stored the information that is to be erased, where the instructions can cause the computing device to erase that information. As yet another example, a computing device executing at least a portion of process 1400 can cause information that is saved by a computing device (including the computing device executing at least a portion of process 1400) to include a flag or other information that designates the information for removal at a particular time. In a more particular example, when the information (e.g., account information, an avatar, personal content, etc.) is shared with a computing device and/or created by a computing device, the information can be associated with timing information that indicates to the device that is storing the information when that information is to be erased. In such an example, the computing device storing the information can determine at regular and/or irregular intervals whether the information is to be erased based on the associated timing information, and the computing device can act accordingly. In some implementations, after causing information to be erased at 1414, process 1400 can return to 1408 and/or 1412.

Figure 15:
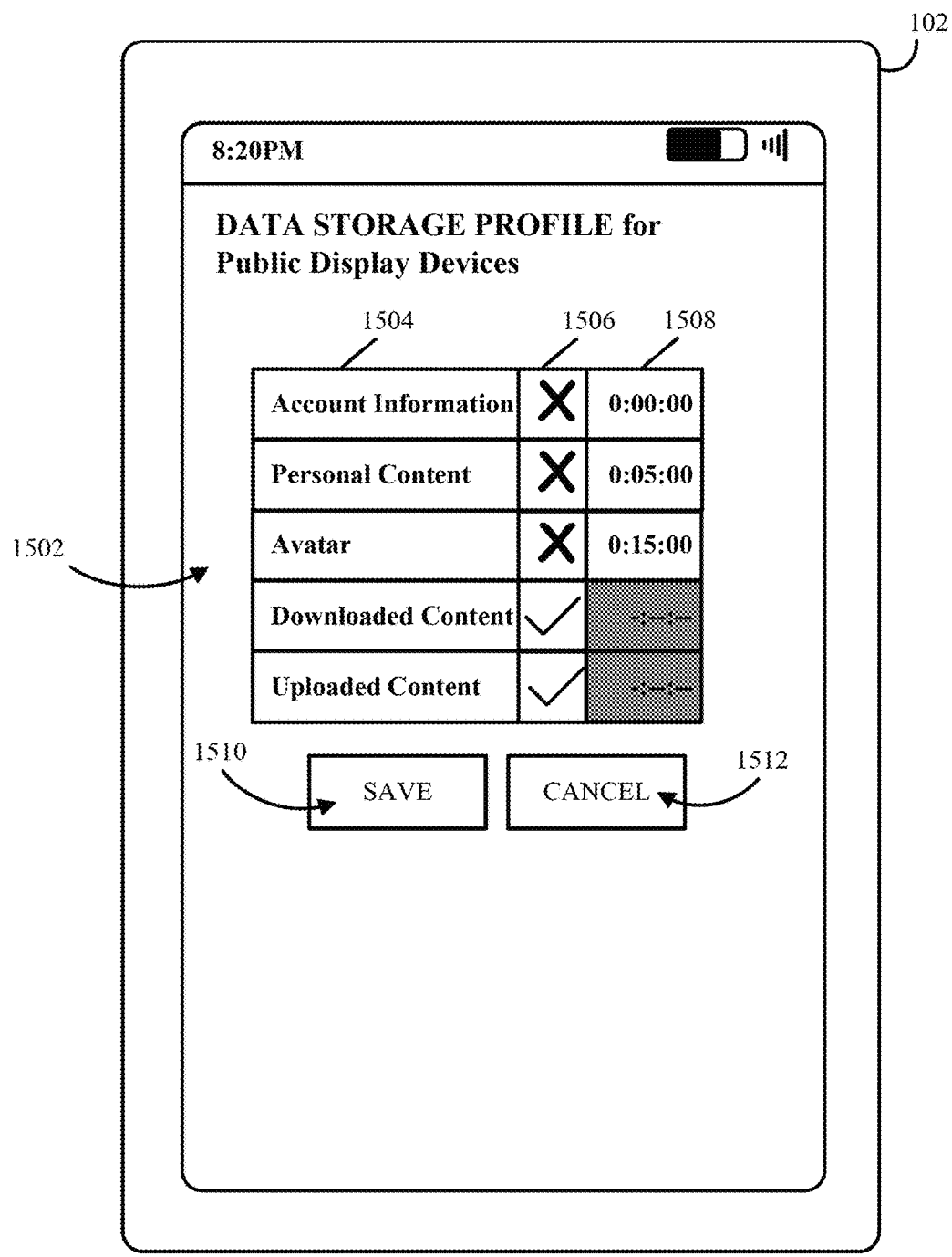
FIG. 15 shows an example of a user interface for setting one or more data storage policies in accordance with some implementations of the disclosed subject matter.

FIG. 15 shows an example 1500 of a user interface 1502 for setting one or more data storage policies in accordance with some implementations of the disclosed subject matter. In some implementations, user interface 1502 can include one or more types of information for which data storage policies can be specified. These types of information can be identified using semantically meaningful labels 1504. For example, label 1504 can indicate to which type(s) of information a particular data storage policy is applicable. As a more particular example, label 1504 can describe the type of information to which the data storage policy is applicable. Additionally, in some implementations, a portion of label 1504 can be selectable and/or a selectable user interface element can be associated with label 1504. In such implementations, selection of label 1504 and/or the selectable user interface element can cause additional information about the type(s) of information associated with a particular label 1504 to be presented.

In some implementations, user interface 1502 can include an indicator 1506 corresponding to each type of information (e.g., each label 1504). In some implementations, a state of indicator 1506 can be set based on user input, and the state of indicator 1506 can indicate, for example, one or more properties of a storage policy associated with the type of information corresponding to the indicator. For example, a first state of indicator 1506 can indicate that the storage policy associated with information corresponding to indicator 1506 specifies that the information is to be erased after a time corresponding to time period 1508. In a more particular example, the labels 1504 for "Account Information," "Personal Content," and "Avatar" are associated with indicator 1506 in the first state. As another example, a second state of indicator 1506 can indicate that the storage policy associated with information corresponding to indicator 1506 can be stored indefinitely. In a more particular example, the labels 1504 for "Downloaded Content," and "Uploaded Content," are associated with indicator 1506 in the second state. Although two states are described herein, in some implementations, any suitable states can be associated with indicator 1506.

In some implementations, user interface 1502 can include time periods 1508. These time periods can indicate a period of time after one or more conditions have been met (e.g., as described above in connection with 1408) that the information of the type corresponding to the data storage policy can be stored before being erased. In some implementations, time periods 1508 can be set to any suitable amount of time using any suitable input technique. For example, as shown in connection with label 1504 for "Account Information," period of time 1508 can be set to zero hours, zero minutes and zero seconds. In such an example, this setting can indicate that account information is to be erased as soon as the account is accessed. As another example, as shown in connection with label 1504 for "Downloaded Content," period of time 1508 can be greyed out to indicate that publicly accessible content that is downloaded (e.g., movie times, maps information, restaurant reviews, etc.) is permitted to be stored indefinitely (which may be until the downloaded content is no longer relevant). In such an example, any information linking the downloaded content to the user associated with user device 102 can be personal content, which is to be erased after five minutes (e.g., as indicated by period of time 1508 corresponding to the storage policy for "Personal Content").

In some implementations, if a user makes changes to one or more storage policies using user interface 1502, these changes can be saved without user input and/or the changes can be saved or discarded according to input received using user interface 1502. For example, user interface 1502 can include a save user interface element 1510 and a cancel user interface element 1512. In such an example, when user input is received corresponding to save element 1510, user device 102 that is presenting user interface 1502 can cause the data storage policies represented by user interface 1502 to be saved. Conversely, when user input is received corresponding to cancel element 1512, user device 102 that is presenting user interface 1502 can cause any changes to the data storage policies represented by user interface 1502 to be discarded.

In some implementations, although not shown in FIG. 15, the mechanisms described herein can receive input via a user interface to control whether the processes described in connection with FIG. 13 are used when presenting content on a public display device. For example, if period of time 1508 is set to zero for all types of information, a computing device that is involved with presenting content on a public display device can determine that process 1300 is to be used to present content on a public display device. As another example, user interface 1502 (and/or any other suitable user interface) can include a user interface element (not shown) that can be used to indicate whether process 1300 or process 1400 is to be used to present content on the public display device. In a more particular example, the user interface element can be an option for operating in a "private" mode, which can cause content that is to be presented by a public screen to be presented using process 1300 or process 1400. Additionally or alternatively, in some implementations, the mechanisms described herein can use process 1300 when presenting content on a public display device based on any suitable factor or factors. For example, if an owner and/or operator of a public display device cannot be authenticated, the mechanisms described herein can determine that process 1300 or process 1400 is to be used to present content on that public display device. As another example, if the security of a public display device cannot be authenticated, the mechanisms described herein can determine that process 1300 or process 1400 is to be used to present content on that public display device. As yet another example, if a public display device is being used by a relatively large number of people, the mechanisms described herein can determine that process 1300 or process 1400 is to be used to present content on that public display device. As still another example, if a computing device that would execute process 1300 (e.g., a user device) and a public display device are connected on a connection having a threshold bandwidth between the two devices, the mechanisms described herein can determine that process 1300 is to be used to present content on that public display device.

In some implementations, the mechanisms described herein can include server-side software, client-side software, server-side hardware, client-side hardware, firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor (such as hardware processor 302, hardware processor 312 and/or hardware processor 322) to execute the mechanisms described herein. In a more particular example, these mechanisms can encompass one or more computer programs written in a programming language recognizable by user device 102, display 110 and/or server 220 that is executing at least a portion of the mechanisms (e.g., a program written in a programming language, such as Java, C, Objective-C, C++, C#, JavaScript, Visual Basic, HTML, XML, ColdFusion, any other suitable approaches, or any suitable combination thereof).

In situations in which the mechanisms described herein record personal information about users, or can make use of personal information, the users can be provided with an opportunity to control whether programs or features record user information (e.g., information about user actions stored on a user device 102, information about user actions stored on a remote device such as server 220, information about content presented stored by display 110, etc.), and/or to control whether and/or how much personal information is presented and/or shared. In addition, certain data can be treated in one or more ways before it is stored or used, so that personal information is removed. For example, a user's identity can be treated so that no personal information can be determined for the user, or a user's geographic location can be generalized where location information is obtained (such as to a city block, a city, ZIP code, or state level), so that a particular location of a user cannot be determined. Thus, the user can have control over how information is recorded about the user and used by a content server.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some implementations of the disclosed subject matter, the above described steps of the processes of FIGS. 4, 5A-5C, 6A-6C, 8, 10, 11A-11B, 13 and 14 can be executed or performed in any order or sequence not limited to the order and sequence shown and described in the figures. Also, some of the above steps of the processes of FIGS. 4, 5A-5C, 6A-6C, 8, 10, 11A-11B, 13 and 14 can be executed or performed substantially simultaneously where appropriate or in parallel to reduce latency and processing times. Furthermore, it should be noted that FIGS. 4, 5A-5C, 6A-6C, 8, 10, 11A-11B, 13 and 14 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for controlling information utilized to present content using a public display device are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for presenting content on a public display device, the method comprising:
   (a) initiating, using a hardware processor of a user device, communication with one or more display devices;
   (b) selecting a display device of the one or more display devices based on locations of the one or more display devices and a location of the user device, wherein selecting the display device comprises identifying the display device likely to be visible to a user of the user device based on the locations of the one or more display devices and the location of the user device;
   (c) establishing a communication channel with the selected display device;
   (d) receiving information related to an area of a screen of the selected display device that is allocated for use by the user device;

(e) identifying content that is to be presented using the selected display device based on a location of the selected display device;

(f) generating formatted content from the content that is to be presented based on the area of the screen allocated for use by the user device;

(g) transmitting the formatted content to the display device using the communication channel;

repeating at least (e) to (g) until (h) determining that presentation of content using the selected display device is to be inhibited; and (i) causing an indication that presentation of the content using the selected display device has been inhibited to be presented on the user device.

2. The method of claim 1, wherein establishing the communication channel with the selected display device comprises establishing a Bluetooth connection with the selected display device.

3. The method of claim 1, wherein establishing the communication channel with the selected display device comprises establishing a Wi-Fi connection with the selected display device without establishing a Wi-Fi connection with an intermediary device.

4. The method of claim 1, wherein determining that presentation of content using the selected public display device is to be inhibited comprises determining that the communication channel has been disconnected.

5. The method of claim 1, further comprising:

receiving, from the selected display device, information related to presentation of the formatted content by the selected public display device; and performing an action based on the information related to presentation of the formatted by the selected display device.

6. The method of claim 5, wherein the information related to presentation of the formatted content includes information related to a frequency at which frames including the formatted content are to be presented by the selected display device and synchronization information, and wherein the action is setting active shutter glasses to the frequency based on the synchronization information.

7. The method of claim 5, wherein the information related to presentation of the formatted content includes information related to a viewing area in which the formatted content is viewable, and wherein the action is causing information to be presented to a user of the user device informing the user of a location of the viewing area.

8. A system for presenting content on a public display device, the system comprising:

a user device comprising a hardware processor that is programmed to:

(a) initiate communication with one or more display devices;

(b) select a display device of the one or more display based on locations of the one or more display devices and a location of the user device, wherein selecting the display device comprises identifying the display device likely to be visible to a user of the user device based on the locations of the one or more display devices and the location of the user device;

(c) establish a communication channel with the selected display device;

(d) receive information related to an area of a screen of the selected display device that is allocated for use by the user device;

(e) identify content that is to be presented using the selected display device based on a location of the selected display device;

(f) generate formatted content from the content that is to be presented based on the area of the screen allocated for use by the user device;

(g) transmit the formatted content to the display device using the communication channel;

repeat at least (e) to (g) until (h) determining that presentation of content using the selected display device is to be inhibited; and (i) causing an indication that presentation of the content using the selected display device has been inhibited to be presented on the user device.

9. The system of claim 8, wherein establishing the communication channel with the selected display device comprises establishing a Bluetooth connection with the selected display device.

10. The system of claim 8, wherein establishing the communication channel with the selected display device comprises establishing a Wi-Fi connection with the selected display device without establishing a Wi-Fi connection with an intermediary device.

11. The system of claim 8, wherein determining that presentation of content using the selected public display device is to be inhibited comprises determining that the communication channel has been disconnected.

12. The system of claim 8, wherein the hardware processor is further programmed to:

receive, from the selected display device, information related to presentation of the formatted content by the selected public display device; and perform an action based on the information related to presentation of the formatted by the selected display device.

13. The system of claim 12, wherein the information related to presentation of the formatted content includes information related to a frequency at which frames including the formatted content are to be presented by the selected display device and synchronization information, and wherein the action is setting active shutter glasses to the frequency based on the synchronization information.

14. The system of claim 12, wherein the information related to presentation of the formatted content includes information related to a viewing area in which the formatted content is viewable, and wherein the action is causing information to be presented to a user of the user device informing the user of a location of the viewing area.

15. A non-transitory computer-readable medium containing computer executable instructions that, when executed by a processor, cause the processor to perform a method for presenting content on a public display device, the method comprising:

(a) initiating communication with one or more display devices;

(b) selecting a display device of the one or more display devices based on locations of the one or more display devices and a location of the user device, wherein selecting the display device comprises identifying the display device likely to be visible to a user of the user device based on the locations of the one or more display devices and the location of the user device;

(c) establishing a communication channel with the selected display device;

(d) receiving information related to an area of a screen of the selected display device that is allocated for use by a user device;
(e) identifying content that is to be presented using the selected display device based on a location of the selected display device;
(f) generating formatted content from the content that is to be presented based on the area of the screen allocated for use by the user device;
(g) transmitting the formatted content to the display device using the communication channel;
repeating at least (e) to (g) until (h) determining that presentation of content using the selected display device is to be inhibited; and
(i) causing an indication that presentation of the content using the selected display device has been inhibited to be presented on the user device.

16. The non-transitory computer-readable medium of claim 15, wherein establishing the communication channel with the selected display device comprises establishing a Bluetooth connection with the selected display device.

17. The non-transitory computer-readable medium of claim 15, wherein establishing the communication channel with the selected display device comprises establishing a Wi-Fi connection with the selected display device without establishing a Wi-Fi connection with an intermediary device.

18. The non-transitory computer-readable medium of claim 15, wherein determining that presentation of content using the selected public display device is to be inhibited comprises determining that the communication channel has been disconnected.

19. The non-transitory computer-readable medium of claim 15, wherein the method further comprises:
    receiving, from the selected display device, information related to presentation of the formatted content by the selected public display device; and
    performing an action based on the information related to presentation of the formatted by the selected display device.

20. The non-transitory computer-readable medium of claim 19, wherein the information related to presentation of the formatted content includes information related to a frequency at which frames including the formatted content are to be presented by the selected display device and synchronization information, and
    wherein the action is setting active shutter glasses to the frequency based on the synchronization information.

21. The non-transitory computer-readable medium of claim 19, wherein the information related to presentation of the formatted content includes information related to a viewing area in which the formatted content is viewable, and
    wherein the action is causing information to be presented to a user of the user device informing the user of a location of the viewing area.

\* \* \* \* \*